(12) United States Patent
Furukawa et al.

(10) Patent No.: US 8,161,339 B2
(45) Date of Patent: Apr. 17, 2012

(54) CONTENT PLAYBACK APPARATUS, CONTENT PLAYBACK METHOD, AND STORAGE MEDIUM

(75) Inventors: Hirofumi Furukawa, Chiba (JP); Masafumi Hirata, Tokyo (JP); Soichi Nitta, Narashino (JP); Aya Enatsu, Chiba (JP); Tatsuo Sudo, Chiba (JP); Masafumi Takahashi, Sakura (JP); Kiyotaka Kashito, Kobe (JP); Takuya Kinoshita, Chiba (JP); Azusa Umemoto, Kizugawa (JP); Katsuo Doi, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1263 days.

(21) Appl. No.: 11/889,221

(22) Filed: Aug. 9, 2007

(65) Prior Publication Data
US 2008/0040642 A1 Feb. 14, 2008

Related U.S. Application Data

(60) Provisional application No. 60/842,982, filed on Sep. 8, 2006.

(30) Foreign Application Priority Data

Aug. 11, 2006 (JP) ................................. 2006-220568

(51) Int. Cl.
*G06F 11/00* (2006.01)
(52) U.S. Cl. ....................................................... 714/746
(58) Field of Classification Search ................... 714/746
See application file for complete search history.

(56) References Cited

U.S. PATENT DOCUMENTS

| | | | |
|---|---|---|---|
| 5,909,215 A | 6/1999 | Berstis et al. | |
| 6,185,526 B1* | 2/2001 | Kato et al. | 704/228 |
| 6,269,460 B1 | 7/2001 | Snover et al. | |
| 6,526,529 B1 | 2/2003 | Miksovsky et al. | |
| 6,594,697 B1 | 7/2003 | Praitis et al. | |
| 2002/0101829 A1 | 8/2002 | Murai et al. | |
| 2002/0135621 A1 | 9/2002 | Angiulo et al. | |
| 2002/0184589 A1 | 12/2002 | Eatough et al. | |
| 2003/0009567 A1 | 1/2003 | Farouk | |

(Continued)

FOREIGN PATENT DOCUMENTS

JP 63-270183 A 11/1988
(Continued)

OTHER PUBLICATIONS

Xaxon R&D NetRecorder 6, IE to togo shita Web pe-ji rokuga sofuto (Xaxon R&D NetRecorder 6, Web page recording software integrated with IE), DOS/V SPECIAL, vol. 5, #5, pp. 201, Mainichi Communications Inc. Japan, May 2000.

*Primary Examiner* — James C Kerveros
(74) *Attorney, Agent, or Firm* — Birch, Stewart, Kolasch & Birch, LLP

(57) ABSTRACT

When a content playback apparatus has detected a content data acquisition error in a process of acquiring title screen content serving as next content that is to be reproduced after top screen content, the content playback apparatus reproduces sub-content contained as error-handling information in the top screen content, and then displays an error screen. The error screen is contained as sub-content in the top screen content, and therefore can be changed flexibly. This makes it possible to provide a content playback apparatus capable of performing error handling flexibly in accordance with the content being reproduced.

14 Claims, 33 Drawing Sheets

U.S. PATENT DOCUMENTS

| | | |
|---|---|---|
| 2003/0090497 A1 | 5/2003 | Yoshioka |
| 2003/0197784 A1 | 10/2003 | Bae |
| 2003/0214529 A1 | 11/2003 | Martin, Jr. et al. |
| 2004/0145764 A1 | 7/2004 | Machida et al. |
| 2004/0177327 A1 | 9/2004 | Kieffer |
| 2004/0210845 A1 | 10/2004 | Paul et al. |
| 2005/0210414 A1 | 9/2005 | Angiulo et al. |
| 2006/0023720 A1 | 2/2006 | Ido et al. |
| 2006/0053468 A1 | 3/2006 | Sudoh et al. |
| 2006/0164441 A1 | 7/2006 | Wada et al. |
| 2006/0187331 A1 | 8/2006 | Watanabe et al. |
| 2006/0188237 A1 | 8/2006 | Watanabe et al. |
| 2006/0265669 A1 | 11/2006 | Lee |
| 2006/0268121 A1 | 11/2006 | Watanabe |
| 2007/0088784 A1 | 4/2007 | Chiba et al. |

FOREIGN PATENT DOCUMENTS

| | | |
|---|---|---|
| JP | 06-169453 A | 6/1994 |
| JP | 2002-132768 A | 5/2002 |
| JP | 2003-163899 A | 6/2003 |
| JP | 2004-215203 A | 7/2004 |
| JP | 2004-280665 A | 10/2004 |
| JP | 2004-334726 A | 11/2004 |
| JP | 2004-334992 A | 11/2004 |
| JP | 2004-342015 A | 12/2004 |
| JP | 2006-53765 A | 2/2006 |
| JP | 2006-058964 A | 3/2006 |

\* cited by examiner

FIG. 7(a)                                                                 1011

```
<body>
    <wizard>
        <step id="top" app="svg-viewer" param="file=top.svg"
              target-name="albumid.txt" target-type="text/plain"/>  } 1011a <step id="cpm"
            connector="CpmConnector"
            param="uri=@uri.txt,method=method-getTitle.txt,albumId=albumid.txt"  } 1011b
            target-name="error.txt" target-type="text/plain"/>

<switch id="errorcheck" target-name="error.txt">
            <nextstep xlink:href="title.mtd" when="200"/>
            <nextstep xlink:href="#servererror" when="400"/>       } 1011c
            <nextstep xlink:href="#localerror" when="500"/>
        </switch>

<step id="servererror" app="svg-viewer" param="file=servererror.svg"
              target-name="null" target-type="null" xlink:href="#top"/>   } 1011d
        <step id="localerror" app="svg-viewer" param="file=localerror.svg"
              target-name="null" target-type="null" xlink:href="#top"/>
    </wizard>
</body>
```

FIG. 7(b)                                                                 1011

```
<body>
    <wizard>
        <step id="top" app="svg-viewer" param="file=top.svg"
              target-name="albumid.txt" target-type="text/plain"/>  } 1011a <step id="cpm"
            connector="CpmConnector"
            param="uri=@uri.txt,method=method-getTitle.txt,albumId=albumid.txt"  } 1011b
            target-name="error.txt" target-type="text/plain"/>

<switch id="errorcheck" target-name="error.txt">
            <nextstep xlink:href="title.mtd" when="200"/>
            <nextstep xlink:href="error.mtd" when="300"/>          } 1011c'
            <nextstep xlink:href="#localerror" when="500"/>
        </switch>

<step id="localerror" app="svg-viewer" param="file=localerror.svg"
              target-name="null" target-type="null" xlink:href="#top"/>   } 1011d'
    </wizard>
</body>
```

FIG. 7(c)                                                                 1011

```
<body>
    <wizard>
        <step id="top" app="svg-viewer" param="file=top.svg"
              target-name="albumid.txt" target-type="text/plain"/>  } 1011a <step id="cpm"
            connector="CpmConnector"
            param="uri=@uri.txt,method=method-getTitle.txt,albumId=albumid.txt"  } 1011b
            target-name="error.txt" target-type="text/plain"/>

<switch id="errorcheck" target-name="error.txt">
            <nextstep xlink:href="title.mtd" when="200"/>
            <nextstep xlink:href="error.mtd" when="300"/>
            <nextstep xlink:href="#servererror" when="400"/>       } 1011c"
            <nextstep xlink:href="#localerror" when="500"/>
        </switch>

<step id="servererror" app="svg-viewer" param="file=servererror.svg"
              target-name="null" target-type="null" xlink:href="#top"/>   } 1011d"
        <step id="localerror" app="svg-viewer" param="file=localerror.svg"
              target-name="null" target-type="null" xlink:href="#top"/>
    </wizard>
</body>
```

```
<svg id="svg" width="1920" height="1080">
  <rect x="740" y="417" width="454" height="310" fill="#5F5F5F" rx="5" ry="5" />
  <rect x="733" y="410" width="454" height="310" fill="#DDDDDD" rx="5" ry="5" />
  <rect x="733" y="410" width="454" height="10" fill="#003399" rx="5" ry="5" />
  <rect x="733" y="415" width="454" height="34" fill="#003399" />
  <text x="765" y="444" font-size="28" fill="#FFFFFF"> SERVER ERROR HAS OCCURRED </text>
  <rect stroke="#000000" fill="#FFFFFF" x="760" y="670" height="35" width="85" rx="20" ry="20" />
  <text x="775" y="702" font-size="28" fill="#000000"> DECIDE </text>
  <text x="850" y="702" font-size="28" fill="#000000"> PRESS BUTTON </text>
</svg>
```

FIG. 22

```
<body>
  <wizard>
    <step id="test" app="svg-viewer" param="file=test.svg" target-name="error.txt" target-type="text/plain"/>    } 1901

<switch id="errorcheck" target-name="error.txt">
      <nextstep xlink:href="#success" when="200"/>
      <nextstep xlink:href="#sizeerror" when="300"/>                                                              } 1902
      <nextstep xlink:href="#fomaterror" when="400"/>
    </switch>

<step id="success" app="svg-viewer" param="file=success.svg" target-name="null" target-type="null" />
    <step id="sizeerror" app="svg-viewer" param="file=sizeerror.svg"
          target-name="null" target-type="null" xlink:href="#test"/>                                              } 1903
    <step id="fomaterror" app="svg-viewer" param="file=fomaterror.svg"
          target-name="null" target-type="null" xlink:href="#test"/>
  </wizard>
</body>
```

```
<body>
<wizard>
<step id="slide1" app="svg-viewer" param="file=slide1.svg" target-name="null" target-type="null"/>

<step id=" cpm"
    connector="CpmConnector"
    param="uri=@uri.txt,method=getNextSlide.txt,slideId=slideid.txt"
    target-name="error.txt" target-type="text/plain"/>        } 2201

<switch id=" errorcheck" target-name="error.txt">
    <nextstep xlink:href="slide2.mtd" when="200"/>
    <nextstep xlink:href="#servererror" when="400"/>
    <nextstep xlink:href="#localerror" when="500"/>
</switch>                                                     } 2202

<step id="servererror" app=" svg-viewer" param="file=servererror.svg"
    target-name="null" target-type="null" xlink:href="top.mtd"/>      } 2203
<step id="localerror" app=" svg-viewer" param="file=localerror.svg"
    target-name="null" target-type="null" xlink:href="thumbnail.mtd"/> } 2204

</wizard>
</body>
```

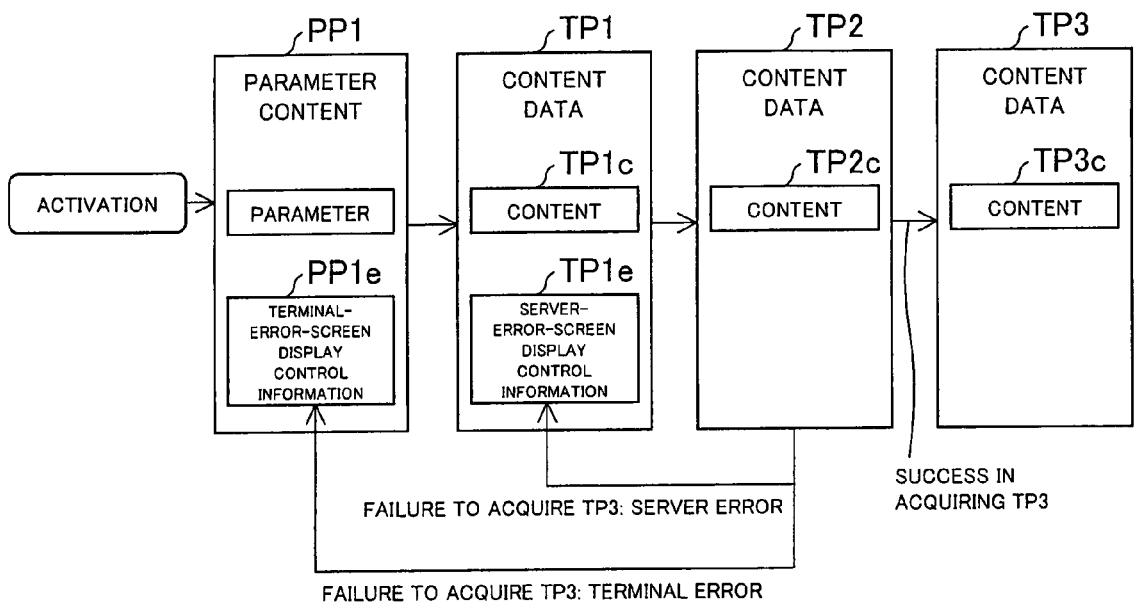

FIG. 30

```
<body>
    <wizard>
        <step id="top" app="svg-viewer" param="file=top.svg"
                target-name="albumid.txt" target-type="text/plain"/>

<step id="cpm"
            connector="CpmConnector"
            param="uri=@uri.txt,method=method-get_tp3,
            target-name="error.txt" target-type="text/plain"/>

<switch id="errorcheck" target-name="error.txt">
            <nextstep xlink:href="tp3.mtd" when="200"/> } 3001
            <nextstep xlink:href="tp1.mtd#servererror" when="400"/> } 3002
            <nextstep xlink:href="parameter.mtd#localerror" when="500"/> } 3003
        </switch>

<step id="servererror" app="svg-viewer" param="file=servererror2.svg"
                target-name="null" target-type="null" xlink:href="#top"/>
        <step id="localerror" app="svg-viewer" param="file=localerror2.svg"
                target-name="null" target-type="null" xlink:href="#top"/>
    </wizard>
</body>
```

FIG. 32

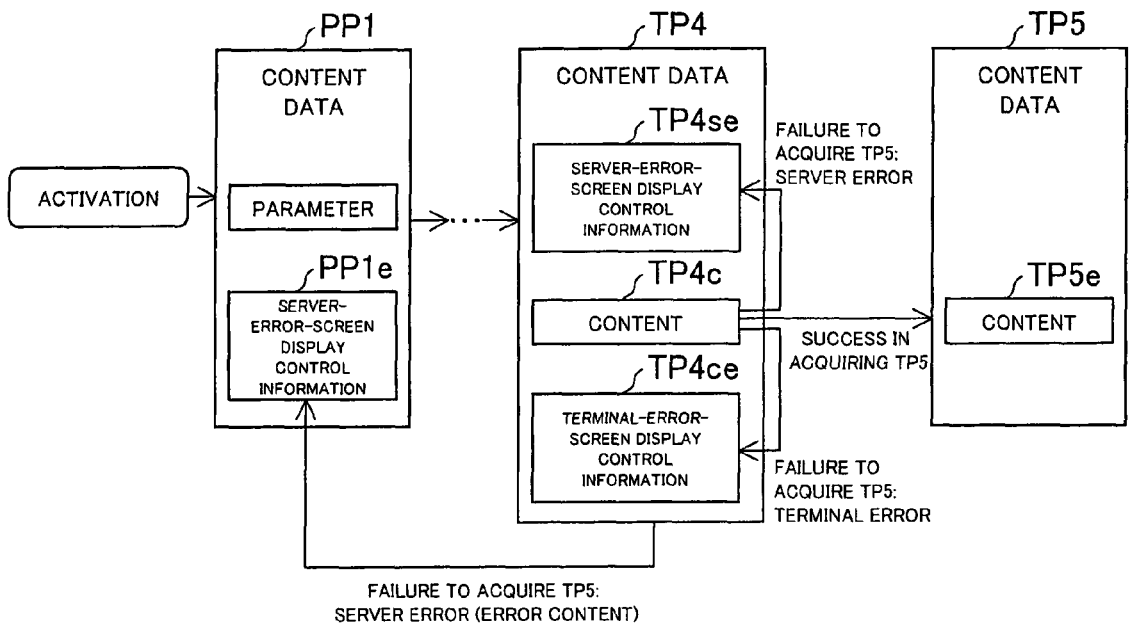

FIG. 33

```
<body>
  <wizard>
    <step id="top" app="svg-viewer" param="file=top.svg"
          target-name="albumid.txt" target-type="text/plain"/>

<step id="cpm"
        connector="CpmConnector"
        param="uri=@uri.txt,method=method-get_tp5,
        target-name="error.txt" target-type="text/plain"/>

<switch id="errorcheck" target-name="error.txt">
      <nextstep xlink:href="tp5.mtd" when="200"/> }4001
      <nextstep xlink:href="parameter.mtd#servererror" when="300"/> }4002
      <nextstep xlink:href="#servererror" when="400"/> }4003
      <nextstep xlink:href="#localerror" when="500"/> }4004
    </switch>

<step id="servererror" app="svg-viewer" param="file=servererror4.svg"
          target-name="null" target-type="null" xlink:href="#top"/>
    <step id="localerror" app="svg-viewer" param="file=localerror4.svg"
          target-name="null" target-type="null" xlink:href="#top"/>
  </wizard>
</body>
```

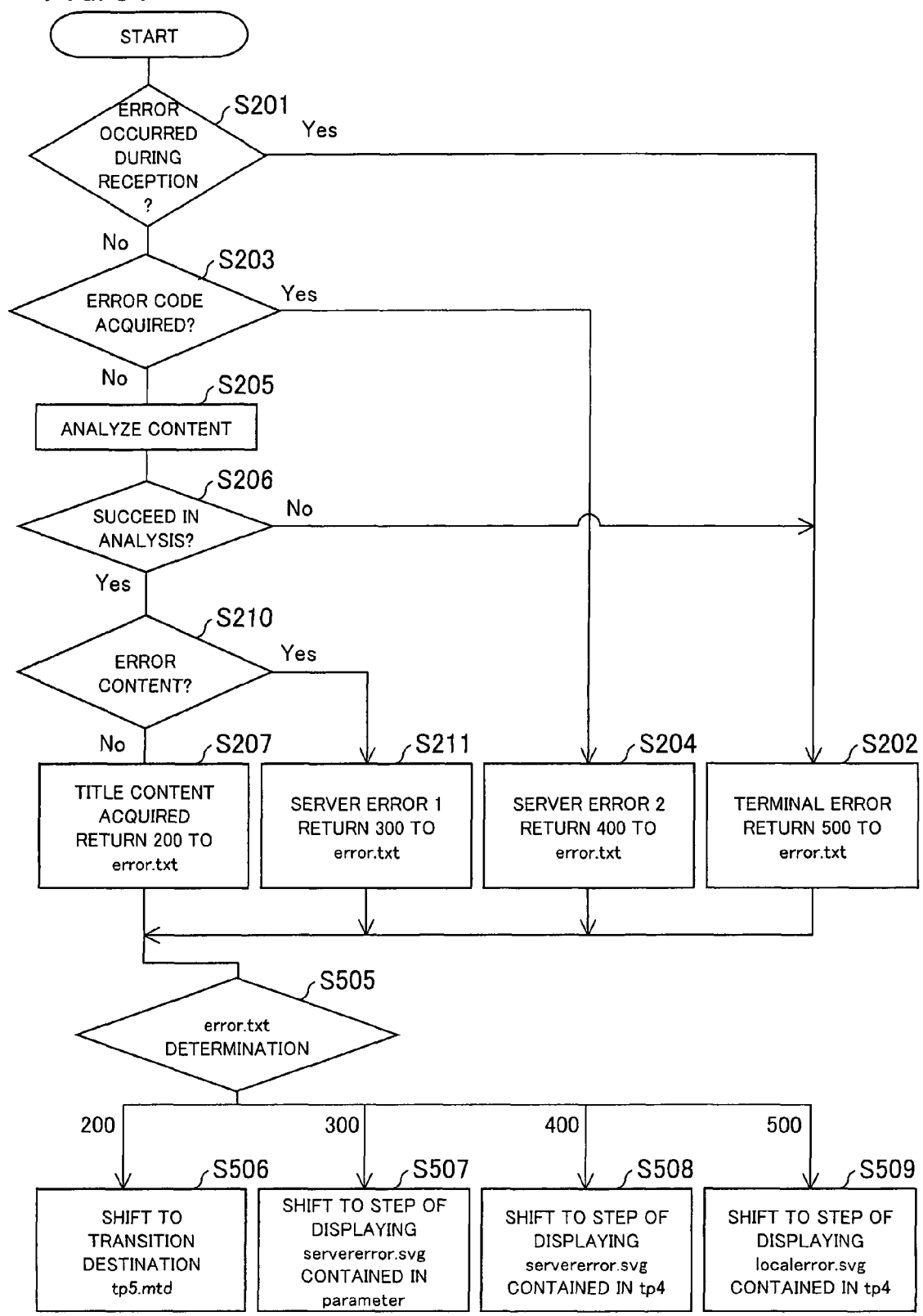

FIG. 35

| CONTENT NAME | SAVE MODE |
|---|---|
| parameter | static |
| tp1 | normal |
| tp2 | normal |
| tp3 | normal |

FIG. 36(a)

```
<body>
    <switch id="errorcheck" target-name="error.txt">
        <nextstep xlink:href="tp3.mtd" when="200"/>
        <nextstep xlink:href="#deletecheck_for servererror" when="400"/>  } 5001
        <nextstep xlink:href="parameter.mtd#localerror" when="500"/>
    </switch>
        <step id="deletecheck_for tp1" app="ContentsCheck"
            param="contents=tp1"                                          } 5002
target-name="tp1delete.txt" target-type="text/plain"/>
        <switch id="deletecheck" target-name="tp1delete.txt">
            <nextstep xlink:href="tp1.mtd#servererror" when="200"/>       } 5003
            <nextstep xlink:href="parameter.mtd#deleteerror" when="400"/>
        </switch>
</body>
```

FIG. 36(b)

```
<body>
    <wizard>
        <step id="servererror" app="svg-viewer" param="file=servererror1.svg"
            target-name="null" target-type="null" xlink:href="#top"/>
    </wizard>
</body>
```

FIG. 36(c)

```
<body>
    <wizard>
        <step id="deleteerror" app="svg-viewer" param="file=deleteerror.svg"
            target-name="null" target-type="null" xlink:href="#top"/>
    </wizard>
</body>
```

CONTENT PLAYBACK APPARATUS, CONTENT PLAYBACK METHOD, AND STORAGE MEDIUM

This nonprovisional application claims the benefit under 35 USC Section 119(e) of U.S. Provisional Application No. 60/842,982 filed on Sep. 8, 2006, and claims priority under 35 USC Section 119(a) of Patent Application No. 220568/2006 filed in Japan on Aug. 11, 2006, the entire contents of all of which are hereby incorporated by reference.

FIELD OF THE INVENTION

The present invention relates to a content playback apparatus, method, and system for reproducing externally-acquired content data. Further, the present invention relates to a content data providing apparatus and method for providing content data to a content playback apparatus. Furthermore, the present invention relates to a program for causing a computer to function as these apparatuses and to a storage medium in which the program is stored.

BACKGROUND OF THE INVENTION

Content playback apparatuses which reproduce content such as still images or moving images are in widespread use. Especially in recent years, the widespread use of the Internet and web services provided by using the Internet has given rise to the use of network-type content playback apparatuses which acquire content data from an external server apparatus via a network and reproduce content contained in the acquired content data. Examples of the network-type content playback apparatuses include a slide-show display apparatus that reproduces, as a slide show, a plurality of slides including photographs.

Such a network-type content playback apparatus makes it necessary to handle various errors that occur in a communication process for acquiring content data. For example, when a server apparatus has no content data that is to be provided to the content playback apparatus, the server apparatus cannot provide any content data to the content playback apparatus. In such a case, it is preferable that the content playback apparatus notify the user that a so-called server error has occurred. Further, even when the server apparatus sends out content data, the content playback apparatus may not be able to complete the acquisition of the content data due to a network failure or the like. In such a case, it is preferable that the content playback apparatus notify the user that a so-called terminal error has occurred. This is because without such notification, the user feels stressed from not being notified why no content can be reproduced.

Usually, when a conventional general-purpose web server has no content data that is to be transmitted to a content playback apparatus, the conventional general-purpose web server transmits, to the content playback apparatus into which a web browser or the like is loaded, an error code 404 indicating that there exists no required content data. The web browser shows the user an error screen indicating "404 NOT FOUND" or the like, thereby notifying the user that an error has occurred in the server. Further, in cases where an error has occurred in the terminal, the content playback apparatus shows the user a predetermined error screen indicating that the terminal error has occurred, thereby notifying the user that the terminal error has occurred.

For example, Japanese Unexamined Patent Application Publication No. 53765/2006 (Tokukai 2006-53765; published on Feb. 23, 2006) discloses a network complex machine which transmits an error message ("404 (Not Found)" according to HTTP) in cases where no required web page is saved.

The conventional content playback apparatus has difficulty in flexibly performing error handling when an error has occurred, e.g., in causing the error screen to vary according to the content being reproduced.

The foregoing problem will be described below in a little more detail.

When such an error has occurred that content to be reproduced next cannot be acquired, the conventional content playback apparatus performs error handling in accordance with a program stored in advance therein. Even in cases where error handling according to the type of error that has occurred is performed, for example, by referring to an error code provided from a server apparatus, each process that is performed according to the type of error is determined in accordance with the program. Therefore, variations of error handling that can be performed by the content playback apparatus are determined at a point of time where the program is stored in the content playback apparatus. For this reason, it has been difficult for the content playback apparatus to flexibly perform error handling when an error has occurred, e.g., to display an error screen that varies according to the content being reproduced.

Such a problem may be solved by arranging for the content playback apparatus to acquire, from a server apparatus, error-handling data, such as error-handling content data containing an error screen as content, for performing error handling. However, the need to perform error handling arises under such conditions that content to be reproduced next cannot be acquired. Under such conditions, it is highly possible that the content playback apparatus cannot acquire error-handling data. Therefore, it is not feasible to arrange for the content playback apparatus to acquire error-handling data from a server apparatus when an error has occurred.

SUMMARY OF THE INVENTION

The present invention has been made in view of the foregoing problems, and it is an object of the present invention to provide a content playback apparatus capable of performing error handling flexibly in accordance with the content being reproduced.

In order to solve the foregoing problems, a content playback apparatus according to the present invention includes: main-content reproducing means for reproducing main content contained in reproduction target content data; error detecting means for detecting an error having occurred during a process specified by process specifying information, contained in the reproduction target content data, which specifies the process that is to be performed in the content playback apparatus; and sub-content reproducing means for, when the error detecting means has detected an error, reproducing sub-content contained in the reproduction target content data.

In order to solve the foregoing problems, a content playback method according to the present invention is a content playback method for causing a content playback apparatus to reproduce content, and includes: a main-content reproducing step of reproducing main content contained in reproduction target content data; an error detecting step of detecting an error having occurred during a process specified by process specifying information, contained in the reproduction target content data, which specifies the process that is to be performed in the content playback apparatus; and a sub-content reproducing step of, when an error has been detected in the error detecting step, reproducing sub-content contained in the reproduction target content data.

According to the foregoing arrangement, the sub-content contained in the reproduction target content data is reproduced when an error is detected during the process specified by the process specifying information contained in the reproduction target content data. For example, if error-screen-display content for displaying an error screen is contained as sub-content in the reproduction target content data, the error screen is displayed when the error is detected.

Note that the sub-content to be reproduced upon error detection is contained in the reproduction target content data. That is, the sub-content is neither (i) data stored in advance in the content playback apparatus nor (ii) data that is newly acquired from outside by the content playback apparatus upon error detection.

The former feature brings about such an effect that a provider who provides the reproduction target content data to the content playback apparatus can flexibly change, by changing the sub-content contained in the reproduction target content data, the content (e.g., an error screen) that is reproduced by the content playback apparatus upon error detection. On this occasion, the content that is reproduced by the content playback apparatus upon error detection can be changed without needing to change data stored in advance in the content playback apparatus or needing to add a change to an algorithm for operating the content playback apparatus. That is, the provider who provides the reproduction target content data to the content playback apparatus can easily handle, via the reproduction target content data, the content that is reproduced by the content playback apparatus upon error detection.

Further, the latter feature brings about such an effect that the sub-content (e.g., an error screen) contained in the reproduction target content data can be immediately reproduced by the content reproducing apparatus without needing to spend time newly acquiring external data upon error detection.

Note that the content playback apparatus can be arranged as an image display apparatus that displays an image in accordance with content data. Examples of the content data that is reproduced by the content playback apparatus realized as the image display apparatus include display data that contains image data serving as main content, image data serving as sub-content, and process specifying information.

In order to solve the foregoing problems, a content data providing apparatus according to the present invention is a content data providing apparatus for providing content data to a content playback apparatus, and includes: first content data providing means for providing the content playback apparatus with first content data containing content that is to be reproduced by the content playback apparatus; and second content data providing means for providing the content playback apparatus with second content data containing next content that is to be reproduced by the content playback apparatus after the content, the first content data containing sub-content that is to be reproduced by the content playback apparatus when the content playback apparatus is unable to reproduce the next content contained in the second content data.

Further, a content data providing method according to the present invention is a method for providing content data to a content playback apparatus, and includes: a first content data providing step of providing the content playback apparatus with first content data containing main content that is to be reproduced by the content playback apparatus; and a second content data providing step of providing the content playback apparatus with second content data containing next content that is to be reproduced by the content playback apparatus after the main content, the first content data containing sub-content that is to be reproduced by the content playback apparatus when the content playback apparatus is unable to reproduce the next content contained in the second content data.

According to the foregoing arrangement, the first content data that is provided to the content playback apparatus contains sub-content that is to be reproduced by the content playback apparatus when the next content cannot be reproduced. Therefore, the foregoing arrangement makes it possible to allow the content playback apparatus to reproduce the sub-content when the next content cannot be reproduced.

Therefore, by providing the content playback apparatus with the first sub-content data containing desired content, an effect of making it possible to allow the content playback apparatus to reproduce the desired content when the next content cannot be reproduced is brought about. For example, by providing the content playback apparatus with first-content data containing content for displaying a desired error screen, it is possible to allow the content playback apparatus to reproduce the desired error screen when the next content cannot be reproduced.

In order to solve the foregoing problems, a content playback system according to the present invention includes such a content playback apparatus as described above and such a content data providing apparatus as described above.

According to the foregoing arrangement, the first content data that is provided to the content playback apparatus by the content data providing apparatus contains, in addition to main content that is to be reproduced by the content playback apparatus, sub-content that is to be reproduced by the content playback apparatus when the content data providing apparatus cannot provide the second content data to the content playback apparatus, i.e., when the content playback apparatus cannot acquire the second content data externally from the content data providing apparatus. Therefore, the foregoing arrangement makes it possible to allow the content playback apparatus to reproduce the sub-content when the second content data cannot be provided from the content data providing apparatus to the content playback apparatus.

Therefore, by providing the content playback apparatus with the first content data containing desired content, the content data providing apparatus brings about an effect of making it possible to allow the content playback apparatus to reproduce the desired content when the second content data cannot be provided. For example, by providing the content playback apparatus with first content data containing content for displaying a desired error screen, it is possible to allow the content playback apparatus to reproduce the desired error screen when the second content data cannot be provided.

A data structure of content data according to the present invention includes: main content which is reproduced by a content playback apparatus; process specifying information which specifies a process that is to be performed in the content playback apparatus; and sub-content which is reproduced by the content playback apparatus when an error has occurred during the process specified by the process specifying information.

According to the foregoing arrangement, the content playback apparatus that reproduces the content data can reproduce, when an error has occurred during the process specified by the process specifying information, the sub-content contained in the content data. Therefore, by using, as the sub-content of the content data, error-handling content that is to be reproduced when an error has occurred during the process specified by the process specifying information, an effect of making it possible to allow the content playback apparatus to perform error handling that is based on the error-handling content is brought about.

Note that examples of a process that can be specified by the process specifying information include a process of reproducing the main content and a process that is to be performed while the main content is being reproduced. Examples of the process that can be specified by the process specifying information and that is to be performed while the main content is being reproduced include a process of acquiring content data containing next content that is to be reproduced after the main content.

In order to solve the foregoing problems, a content playback apparatus according to the present invention includes: content reproducing means for reproducing content contained in reproduction target content data; error detecting means for detecting an error having occurred during a process specified by process specifying information, contained in the reproduction target content data, which specifies the process that is to be performed in the content playback apparatus; and error-content reproducing means for, when the error detecting means has detected an error, reproducing error content specified by error-content specifying information, contained in the reproduction target content data, which specifies the error content that is to be reproduced upon error detection.

In order to solve the foregoing problems, a content playback method according to the present invention is a content playback method for causing a content playback apparatus to reproduce content, and includes: a content reproducing step of reproducing content contained in reproduction target content data; an error detecting step of detecting an error having occurred during a process specified by process specifying information, contained in the reproduction target content data, which specifies the process that is to be performed in the content playback apparatus; and an error-content reproducing step of, when an error has been detected in the error detecting step, reproducing error content specified by error-content specifying information, contained in the reproduction target content data, which specifies the error content that is to be reproduced upon error detection.

According to the foregoing arrangement, by specifying, as the error content, content that can be read out immediately, i.e., sub-content contained in the reproduction target content data or content already stored in the content playback apparatus at a point of time where the reproduction target content data starts to be reproduced, the content playback apparatus and method can bring about the same effects as those of the content playback apparatus and method described thus far, respectively. Further, the foregoing arrangement brings about such a further effect that (i) a content data provider who provides the content data to the content playback apparatus or (ii) the content data providing apparatus can set, with a high degree of freedom, content that is reproduced by the content playback apparatus upon error detection.

A content data providing apparatus according to the present invention includes: first content data providing means for providing a content playback apparatus with first content data containing content that is to be reproduced by the content playback apparatus; and second content data providing means for providing the content playback apparatus with second content data containing next content that is to be reproduced by the content playback apparatus after the content, the first content data containing error-content specifying information specifying error content that is to be reproduced by the content playback apparatus when the content playback apparatus is unable to reproduce the next content contained in the second content data.

Further, in order to solve the foregoing problems, a content data providing method according to the present invention is a content data providing method for providing content data to a content playback apparatus, and includes: a first content data providing step of providing the content playback apparatus with first content data containing main content that is to be reproduced by the content playback apparatus; and a second content data providing step of providing the content playback apparatus with second content data containing next content that is to be reproduced by the content playback apparatus after the main content, the first content data containing error-content specifying information specifying error content that is to be reproduced by the content playback apparatus when the content playback apparatus is unable to reproduce the next content contained in the second content data.

According to the foregoing arrangement, by specifying, as the error content, content that can be read out immediately, i.e., sub-content contained in the reproduction target content data or content already stored in the content playback apparatus at a point of time where the reproduction target content data starts to be reproduced, the content data providing apparatus and method can bring about the same effects as those of the content data providing apparatus and method described thus far, respectively. Further, the foregoing arrangement brings about such a further effect that (i) a content data provider who provides the content data to the content playback apparatus or (ii) the content data providing apparatus can set, with a high degree of freedom, content that is reproduced by the content playback apparatus upon error detection.

In order to solve the foregoing problems, a data structure of content data according to the present invention includes: content which is reproduced by a content playback apparatus; process specifying information which specifies a process that is to be performed in the content playback apparatus; and error-content specifying information which specifies error content that is to be reproduced when an error has occurred during the process specified by the process specifying information.

According to the foregoing arrangement, by specifying, as the error content, content that can be read out immediately, i.e., sub-content contained in the reproduction target content data or content already stored in the content playback apparatus at a point of time where the reproduction target content data starts to be reproduced, the same effects are brought about as those of the content data providing method.

Note that examples of a process that can be specified by the process specifying information include a process of reproducing the content and a process that is to be performed while the content is being reproduced. Examples of the process that can be specified by the process specifying information and that is to be performed while the content is being reproduced include a process of acquiring content data containing next content that is to be reproduced after the content.

Note that the content playback apparatus may be realized by a computer. In this case, a content playback program that realizes the content playback apparatus in a computer by causing the computer to operate as each of the means and a computer-readable storage medium in which the program is stored are also encompassed in the scope of the present invention.

Note that the content data providing apparatus may be realized by a computer. In this case, a content data providing program that realizes the content data providing apparatus in a computer by causing the computer to operate as each of the means and a computer-readable storage medium in which the program is stored are also encompassed in the scope of the present invention.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2(a) is a block diagram showing a structure of the content playback system. FIG. 2(b) is a screen structure diagram showing a screen structure of a top screen. FIG. 2(c) is a screen structure diagram showing a screen structure of a title screen.

FIG. 3(a) is a block diagram showing a structure of the content playback system. FIG. 3(b) is a screen structure diagram showing a screen structure of a terminal error screen.

FIG. 4(a) is a block diagram showing a structure of the content playback system. FIG. 4(b) is a screen structure diagram showing a screen structure of a server error screen.

FIG. 5(a) is a block diagram showing a structure of the content playback system. FIG. 5(b) is a screen structure diagram showing a screen structure of a server error screen.

FIGS. 7(a) through 7(c) show an embodiment of the present invention, and are diagrams showing an example of state transition definition information contained in the content data shown in FIG. 6. FIG. 7(a) shows state transition definition information that is suitable in cases where an error code is transmitted from a relay server. FIG. 7(b) shows state transition information suitable for a case where error content is transmitted from the relay server. FIG. 7(c) shows state transition definition information suitable for a case where both the error code and the error content are transmitted from the relay server.

FIG. 8 shows an embodiment of the present invention, and is a diagram showing an example of display control information contained in the content data shown in FIG. 6.

FIG. 22 shows an embodiment of the present invention, and is a diagram showing another example of the state transition definition information contained in the content data.

FIG. 25 shows an embodiment of the present invention, and is a diagram showing another example of the state transition definition information contained in the content data.

FIG. 29 shows an embodiment of the present invention, and is a diagram showing a feasible example of content transition.

FIG. 30 shows an embodiment of the present invention, and is a diagram showing a specific example structure of state transition definition information that realizes the example of content transition shown in FIG. 29.

FIG. 32 shows an embodiment of the present invention, and is a diagram showing another feasible example of content transition.

FIG. 33 shows an embodiment of the present invention, and is a diagram showing a specific example structure of state transition definition information that realizes the example of content transition shown in FIG. 32.

FIG. 34 shows an embodiment of the present invention, and is a flow chart showing a flow of a process that is performed in accordance with the state transition definition information shown in FIG. 33.

FIG. 35 shows an embodiment of the present invention, and is a diagram showing a content management table for use in management of content data stored in a storage section provided in the content playback apparatus.

FIGS. 36(a) through 36(c) show an embodiment of the present invention. FIG. 36(a) is a diagram showing an example structure of state transition definition information of reproduction target content. FIG. 36(b) is a diagram showing an example structure of a portion of state transition definition information of content data that may be deleted, which portion handles a server error. FIG. 36(c) is a diagram showing an example structure of a portion of state transition definition information of parameter content, which portion handles a case where content data that needs to be referred to has been deleted.

DESCRIPTION OF THE EMBODIMENTS (Content Playback System)

First, a structure of a content playback system 1 according to the present embodiment will be described with reference to FIG. 1.

Figure 1:
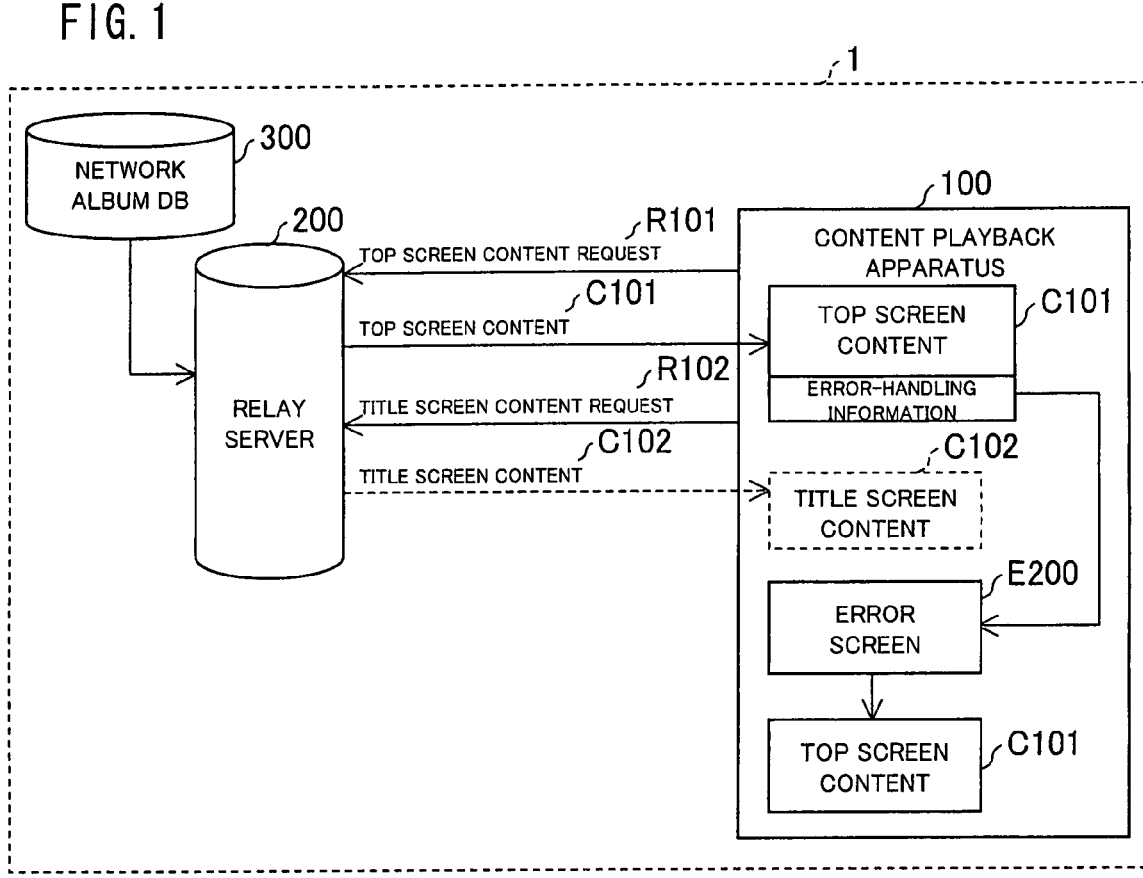
FIG. 1 shows an embodiment of the present invention, and is a block diagram showing a structure of a content playback system 1.

FIG. 1 is a block diagram showing the structure of the content playback system 1. As shown in FIG. 1, the content playback system 1 includes at least one content playback apparatus 100, a relay server (content data providing apparatus) 200, and a network album database (DB) 300. The apparatuses are communicably connected to one another via a network such as the Internet.

The content playback apparatus 100 is an apparatus for acquiring content data from the relay server 200, and for reproducing content contained in the acquired content data. The content playback apparatus 100 is realized, for example, as a television receiver installed in the user's home. In FIG. 1, the content playback system 1 includes a single content playback apparatus 100. However, the content playback system 1 may include a plurality of content playback apparatuses arranged in the same manner as the content playback apparatus 100.

The relay server 200 is an apparatus for providing content data to the content playback apparatus 100. Further, the network album DB 300 is an apparatus for providing the relay server 200 with various types of data necessary for synthesizing content data in the relay server 200. The relay server 200 and the network album DB 300 are installed, for example, in a business office of a person who manages the content playback system 1. In FIG. 1, the relay server 200 and the network album DB 300 are arranged to be separated from each other. However, they may be combined with each other to form a single apparatus that is mounted in a single housing.

The following schematically explains operation of the content playback system 1 with reference to FIGS. 1 through 5.

First, a case where the content playback system 1 operates properly without error is explained with reference to FIGS. 2(a) through 2(c).

Figure 2A:
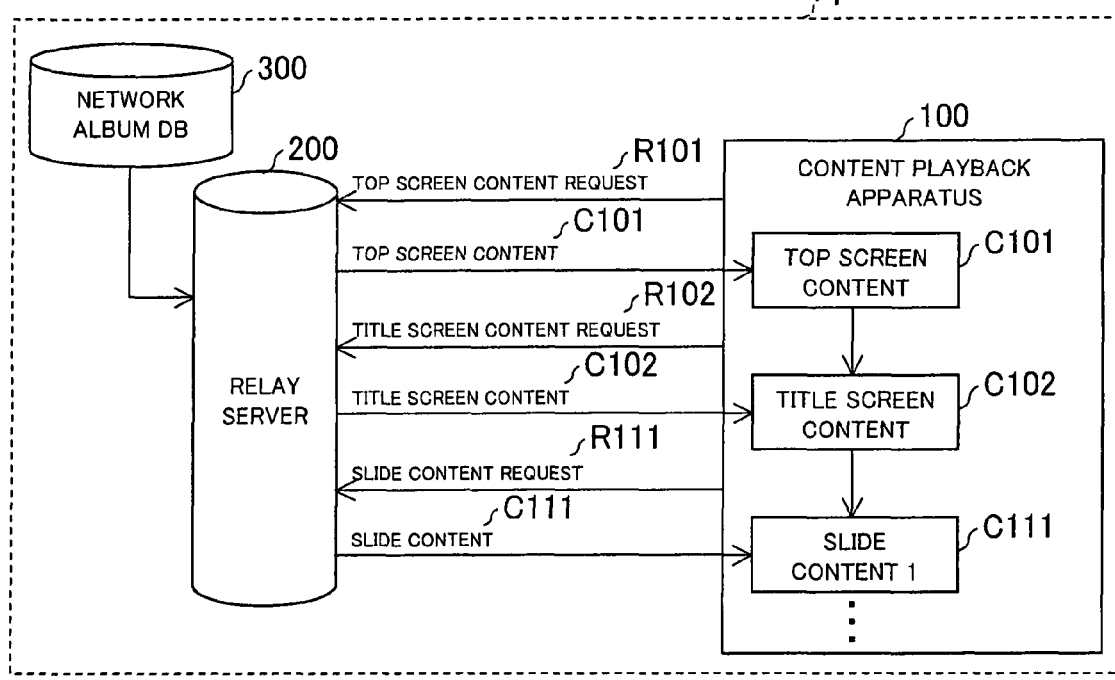
FIGS. 2(a) through 2(c) show an embodiment of the present invention, and are explanatory diagrams schematically explaining how the content playback system operates in cases where no error has occurred.

As shown in FIG. 2(a), the content playback apparatus 100 sends a top screen content request R101 to the relay server 200 in order to start to reproduce content. Upon receiving the top screen content request R101, the relay server 200 synthesizes top screen content (reproduction target content data, first content data) C101. In so doing, the relay server 200 acquires, from the network album DB 300, various types of data necessary for synthesizing the top screen content C101. The relay server 200 transmits, to the content playback apparatus 100, the top screen content C101 thus synthesized. The content playback apparatus 100 acquires the top screen content C101, and then reproduces and displays a top screen I101 serving as main content of the top screen content C101.

Figure 2B:
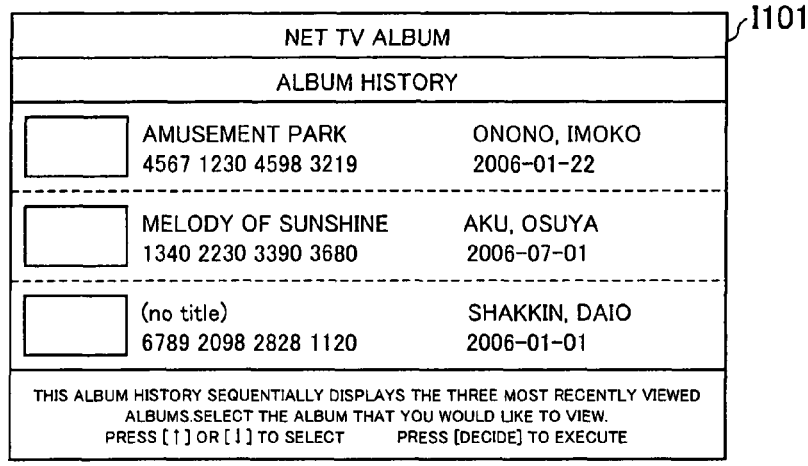

FIG. 2(b) is a screen structure diagram showing an example of the top screen I101 that is displayed by the content playback apparatus 100 reproducing the top screen content C101. The top screen I101 displays a list of a predetermined number (three in the example shown in FIG. 2(b)) of groups of albums through which the user has recently browsed with the content playback apparatus 100. The user can select a desired album from that list of the groups of albums which is displayed on the top screen I101.

After the user has selected an album, the content playback apparatus 100 sends a title screen content request R102 to the relay server 200 in order to display a title screen I102 of the selected album (see FIG. 2(a)). The title screen content request R102 contains an album ID that uniquely identifies the album selected by the user. The relay server 200 refers to the album ID contained in the title screen content request R102, and then synthesizes title screen content (acquisition target content data, second content data) C102 corresponding to the album ID. In so doing, the relay server 200 acquires, from the network album DB 300, various types of data necessary for synthesizing the title screen content C102. The relay server 200 transmits, to the content playback apparatus 100, the title screen content C102 thus synthesized. The content playback apparatus 100 reproduces the title screen content C102, thereby displaying the title screen I102 serving as next content.

Figure 2C:
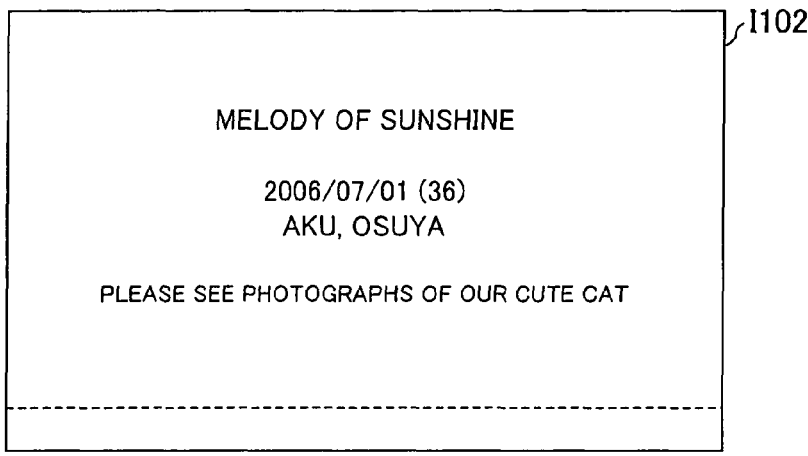

FIG. 2(c) is a screen structure diagram showing an example of the title screen I102 that is displayed by the content playback apparatus 100 reproducing the title screen content C102. The title screen I102 displays the title ("MELODY OF SUNSHINE" in the example shown in the figure) of the album selected by the user, the date of creation ("2006/07/01" in the example shown in the figure), the creator ("AKU, OSUYA" in the example shown in the figure), a comment ("PLEASE SEE PHOTOGRAPHS OF OUR CUTE CAT" in the example shown in the figure), and the like. This allows the user to see an overview of the album before instructing the content playback apparatus 100 to start to reproduce the slide show.

While waiting for the user to carry out an operation of instructing the content playback apparatus 100 to start to reproduce the slide show, the content playback apparatus 100 sends a first slide content request R111 to the relay sever 200 (see FIG. 2(a)). In response to the slide content request R111, the relay server 200 transmits slide content C111 (content data) to the content playback apparatus 100. The content playback apparatus 100 reproduces the slide content C111, thereby displaying a first slide containing a first photograph of the selected album. The content playback apparatus 100 repeats the same operation thereafter, thereby displaying second, third, and subsequent slides one after another at predetermined time intervals. This allows the user to browse a plurality of photographs of the selected album as slides that are displayed one after another.

Next, a case where an error has occurred in a communication process for acquiring the title screen content C102 is explained with reference to FIGS. 1 and 3 through 5.

While reproducing the top screen content C101 acquired from the relay server 200, the content playback apparatus 100 performs a communication process for acquiring the title screen content C102 that is to be reproduced next. When an error occurs in this communication process, the content playback apparatus 100 becomes unable to display the title screen I102.

In preparation for such an error, the top screen content C101 contains not only display control information for displaying the top screen I101 serving as main content, but also display control information for displaying an error screen E200 serving as sub-content. As shown in FIG. 1, when an error has occurred in the communication process for acquiring the title screen content C102, the content playback apparatus 100 reproduces the error screen E200 in accordance with the latter display control information.

Figure 3A:
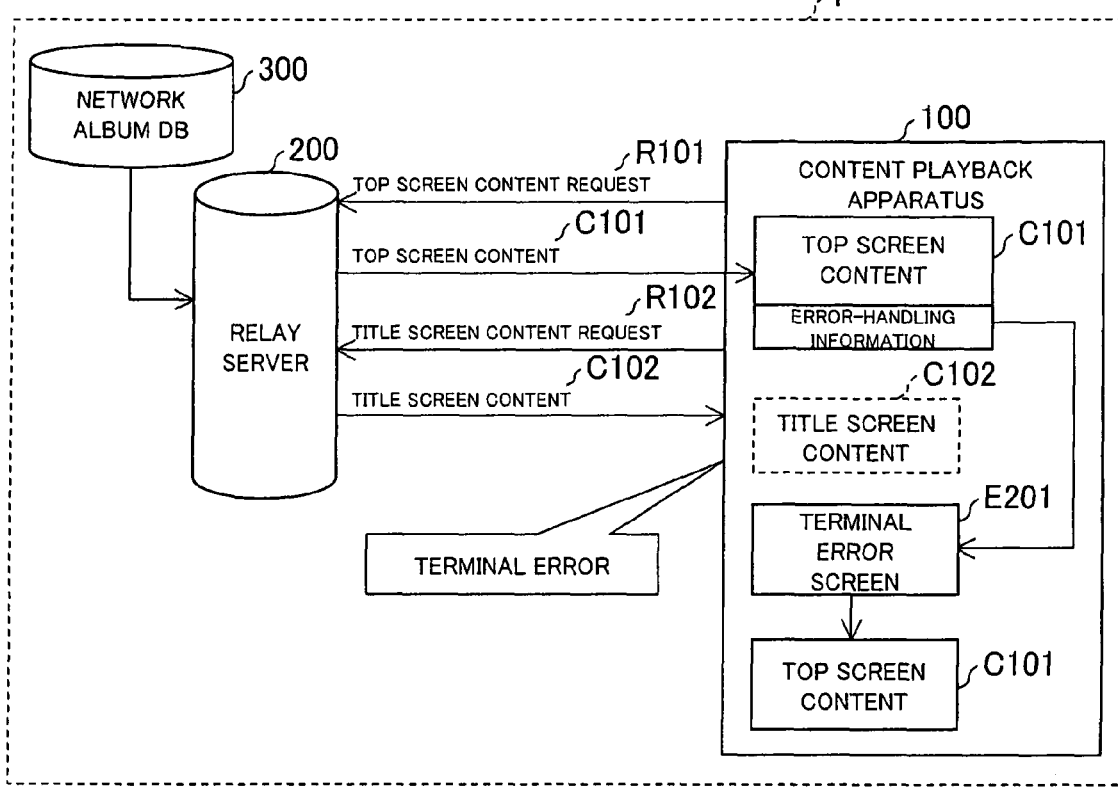
FIGS. 3(a) and 3(b) show an embodiment of the present invention, and are explanatory diagrams schematically explaining how the content playback system operates in cases where a terminal error has occurred.
Figure 3B:
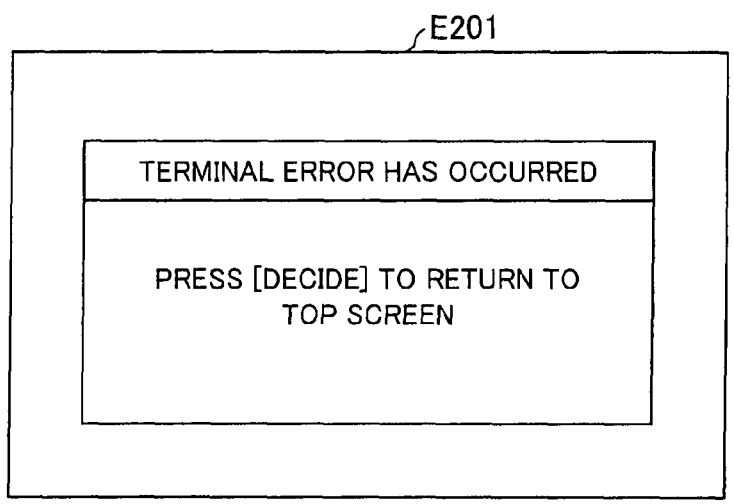

In particular, as shown in FIG. 3(a), when the content playback apparatus 100 detects an error having occurred therein, the content playback apparatus 100 displays a terminal error screen E201 serving as first sub-content contained in the content C101. As shown in FIG. 3(b), the terminal error screen E201 is an error image screen that shows the user that an error has occurred in the content playback apparatus 100 serving as a terminal, and is arranged so as to include a character string such as "TERMINAL ERROR HAS OCCURRED". The terminal error screen E201 also indicates that the user can return to the top screen by pressing a decision button. When the user responds to this by carrying out an operation of pressing the decision button, the content playback apparatus 100 re-reproduces, as substitute content that is displayed instead of the title screen I102, the content screen I101 serving as main content of the top screen content C101.

Figure 4A:
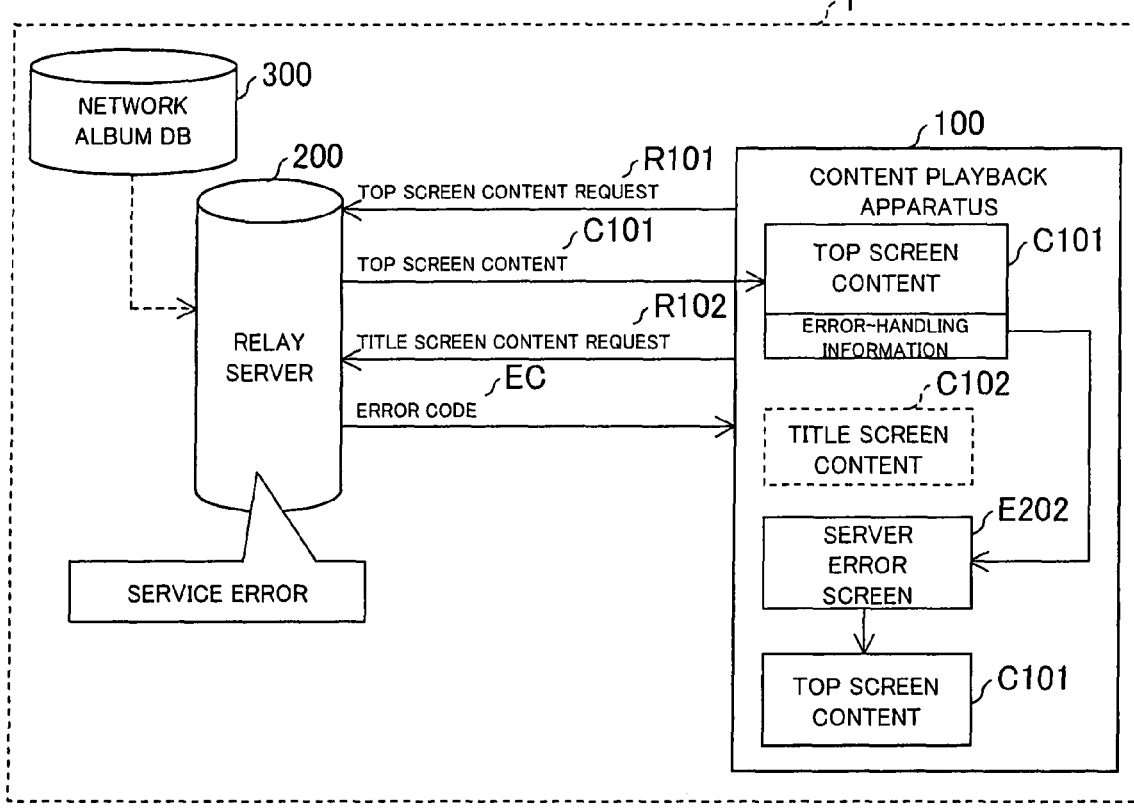
FIGS. 4(a) and 4(b) show an embodiment of the present invention, and are explanatory diagrams schematically explaining how the content playback system operates in cases where a sever error has occurred.
Figure 4B:
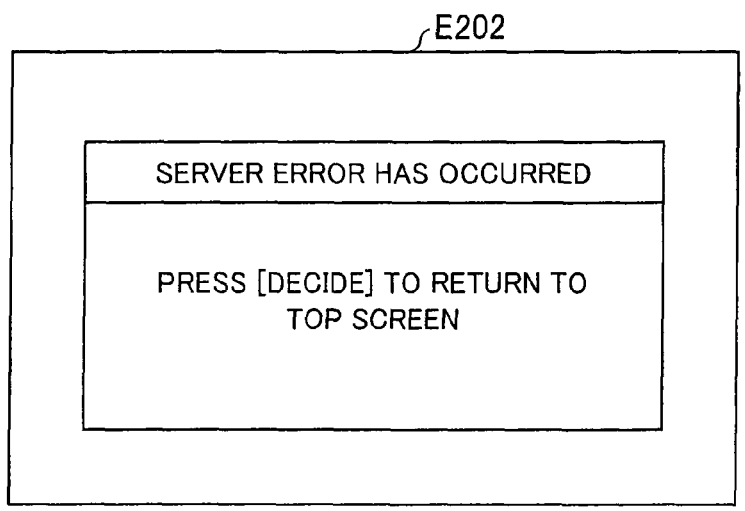

Further, as shown in FIG. 4(a), when the content playback apparatus 100 detects, by receiving an error code EC, an error having occurred in the relay server 200, the content playback apparatus 100 displays a server error screen E202 serving as second sub-content contained in the content C101. As shown in FIG. 4(b), the server error screen E202 is an error screen that shows the user that an error has occurred in the relay server 200, and is arranged so as to include a character string such as "SERVER ERROR HAS OCCURRED". The server error screen E202 indicates that the user can return to the top screen by pressing the decision button. When the user responds to this by carrying out an operation of pressing the decision button, the content playback apparatus 100 re-reproduces, as substitute content that is displayed instead of the title screen I102, the content screen I101 serving as main content of the top screen content C101.

The terminal error screen E201 and the server error screen E202 are generated in the content playback apparatus 100 in accordance with the display control information contained in advance in the top screen content C101. Therefore, both in cases where the content playback apparatus 100 detects an error having occurred therein and in cases where the content playback apparatus 100 detects an error having occurred in the relay server 200, the content playback apparatus 100 can display the terminal error screen E201 and the server error screen E202 in accordance with the top screen content C101, respectively. Moreover, the top screen content C101 has been surely acquired by the content playback apparatus 100 at a point of time where it becomes possible to start a communication process for acquiring the title screen content C102. Therefore, as soon as the content playback apparatus 100 detects a terminal error or a server error, the content playback apparatus 100 can starts a process for displaying the terminal error screen E201 or the server error screen E202.

Figure 5A:
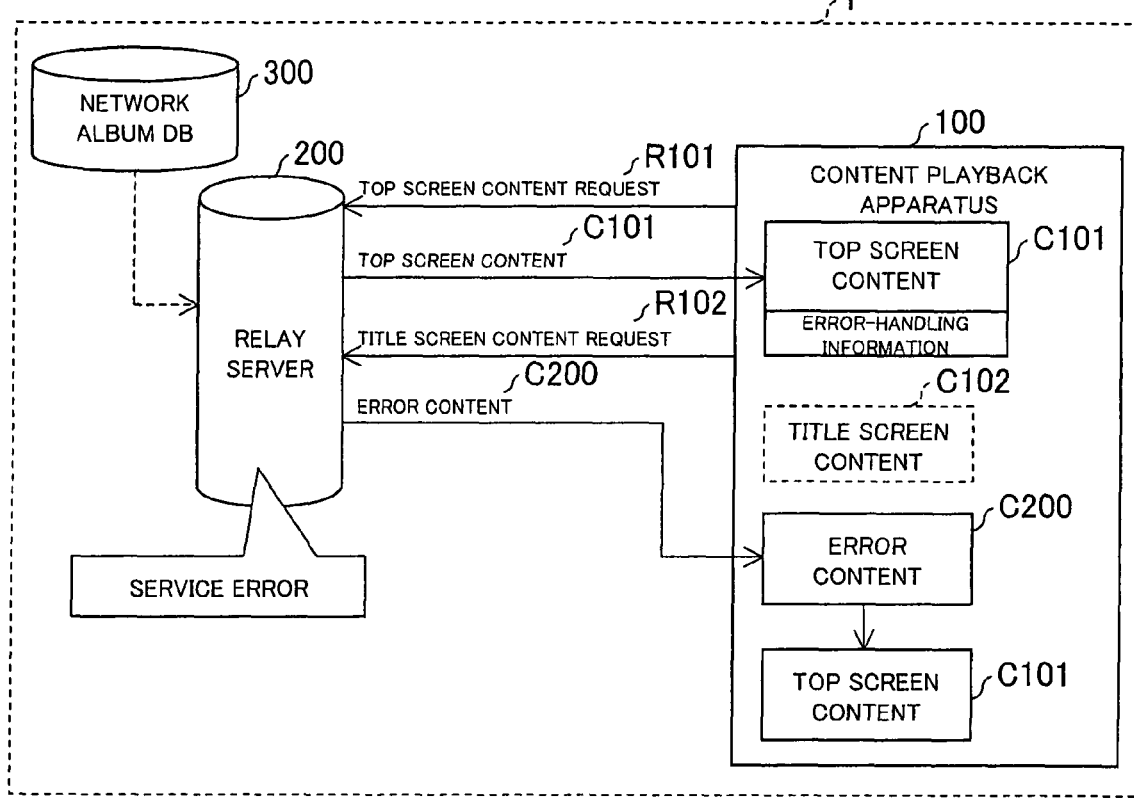
FIGS. 5(a) and 5(b) show an embodiment of the present invention, and are explanatory diagrams schematically explaining operation of a content playback system which is a modified example of the content playback system shown in FIG. 4(a).
Figure 5B:
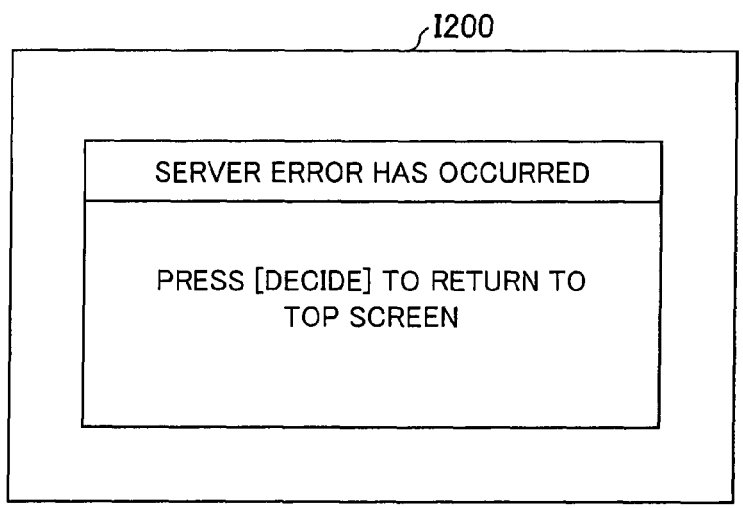

FIG. 4(a) shows the arrangement in which the relay server 200 sends the error code EC to the content playback apparatus 100. However, the arrangement can be changed so that, as shown in FIG. 5(a), the relay server 200 sends error content C200 to the content playback apparatus 100 when a server error has occurred. In this case, when the relay server 200 detects an error having occurred therein, the relay server 200 generates error content C200 for showing the user that the server error has occurred. Then, the content playback apparatus 100 reproduces the error content C200 received as a response to the title screen content request R102, thereby displaying a server error screen I200 (see FIG. 5(b)).

(Data Structure of Content Data)

In the following, content data that is reproduced by the content playback apparatus 100 is explained with reference to FIGS. 6 through 8.

Figure 6:
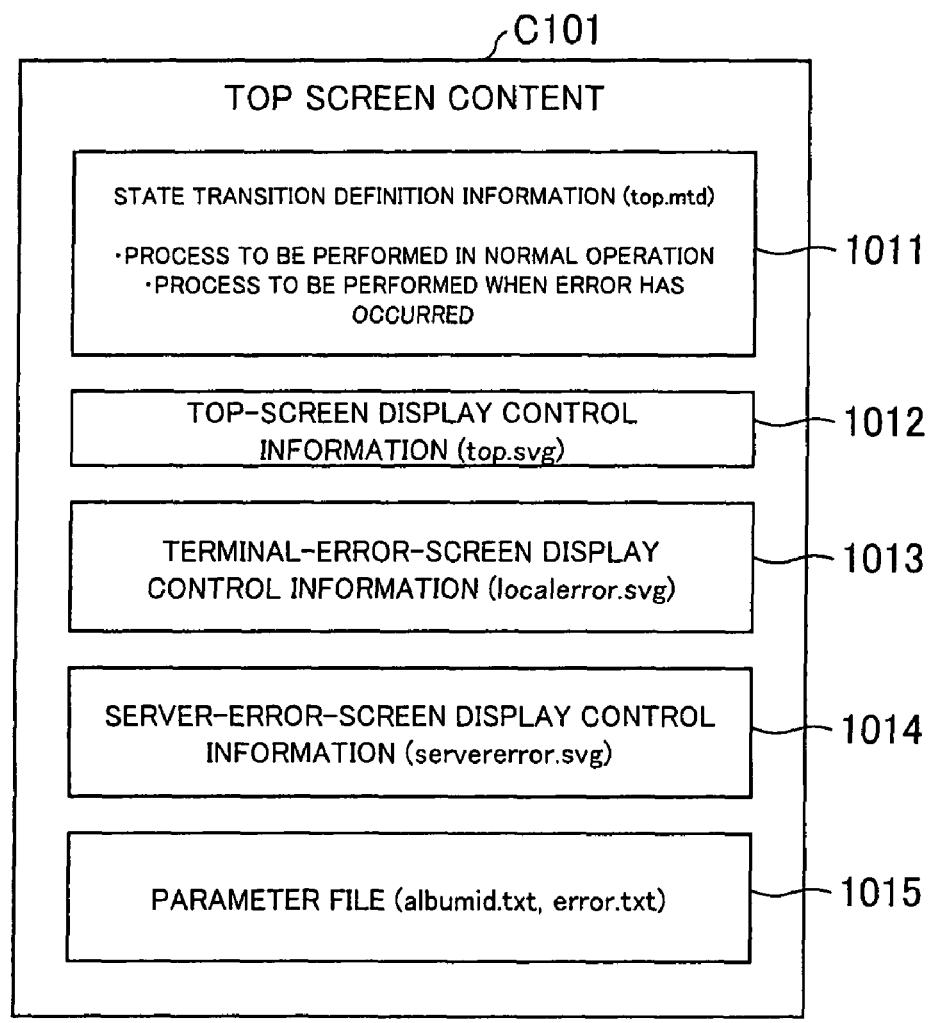
FIG. 6 shows an embodiment of the present invention, and is a data structure diagram showing a data structure of content data.

FIG. 6 is a data structure diagram showing a data structure of the content data that is reproduced by the content playback apparatus 100. Specifically, FIG. 6 shows a data structure of the top screen content C101 described above.

As shown in FIG. 6, the top screen content C101 serving as content data is arranged as an aggregate of a plurality of files. Specifically, the top screen content C101 contains: a file top-.mtd, in which state transition definition information (process specifying information) 1011 is stored; a file top.svg, in which top-screen display control information 1012 for displaying the top screen I101 serving as main content is stored; a file localerror.svg, in which terminal-error-screen display control information 1013 for displaying the terminal error screen E201 serving as first sub-content is stored; a file servererror.svg, in which server-error-screen display control information 1014 for displaying the server error screen E202 serving as second sub-content is stored; and a parameter file, in which various parameters 1015 are stored. In FIG. 6, examples of the parameter file are: a file albumid.txt, in which an album ID inputted by the user is stored; and a file error.txt, in which an error code for identifying the type of error that has occurred is stored.

In cases where the top screen I101 contains an image, the top screen content C101 may include image data for displaying the image. Further, the same is true both in cases where the terminal error screen E201 contains an image and in cases where the server error screen E202 contains an image.

The state transition definition information 1011 is arranged as a script specifying a process that the content playback apparatus 100 is to perform in order to reproduce the top screen I101 and a process that the content playback apparatus 100 is to perform in order to reproduce the title screen I102 after the top screen I101. The content playback apparatus 100 sequentially performs the processes specified by the state transition definition information 1011.

FIG. 7(a) is a diagram showing a specific example of the state transition definition information 1011 described according to MTD (Message Template Definition). The state transition definition information illustrated in FIG. 7(a) is constituted by commands 1011a to 1011d.

The command 1011a is a command (reproduction process specifying information) that specifies a process of reproducing the top screen I101 serving as main content of the top screen content C101. Specifically, the command 1011a specifies a process of displaying the top screen I101 generated in accordance with the file top.svg. In addition, the command 1011a specifies that a return value (album ID) of the process is stored in the parameter file albumid.txt.

The command 1011b is a command (acquisition process specifying information) that specifies a process of acquiring the title screen content C102 containing the title screen I102 that is to be reproduced after the top screen I101. Specifically, the command 1011b specifies a process of, in accordance with a method defined by method-getTitle.txt, transmitting the title screen content request R102 to a sever having a URI stored in @uri.txt. In addition, the command 1011b specifies that the album ID stored in the parameter file albumid.txt is transmitted together with the title screen content request R102, and that a return value (error code) of the process is stored in the parameter file error.txt. In cases where the process is finished normally by acquiring the title screen content C102, an error code 200 is stored in the parameter file error.txt. In cases where the error code EC is sent from the relay server 200 as a response to the title screen content request R102, an error code 400 is stored in the parameter file error.txt. In cases where the process is finished abnormally by detecting a terminal error, an error code 500 is stored in the parameter file error.txt.

The command 1011c is a command for causing the process to branch in accordance with the error code stored in the parameter file error.txt. Specifically, the command 1011c specifies that a transition to processing title.mtd is made in cases where the error code 200 is stored, that a transition to processing a command whose id is servererror is made in cases where the error code 400 is stored, and that a transition to processing a command whose id is localerror is made in cases where the error code 500 is stored. Note that the title.mtd is state transition definition information contained in the title screen content C102. In cases where the error code 200 is stored, i.e., in cases where the title screen content C102 has been normally acquired, a transition to processing the first command of the state transition definition information of the title screen content C102 is made.

The command 1011d is a group of commands (sub-content specifying information, substitute-content specifying information) for specifying, for each type of error, sub-content that is to be reproduced when an error has occurred. The first command whose id is servererror is a command that is executed in cases where the error code 400 is stored. Specifically, as a process to be performed when a server error has occurred, a process of displaying the server error screen E202 (i.e., sub-content) generated in accordance with the file servererror.svg is specified. Further, at the same time, the first command specifies that the top screen I101 is displayed as a display screen to which the server error screen E202 is changed, i.e., as content that is reproduced after the server error screen E202 instead of the title screen I102 that cannot be reproduced. Meanwhile, the second command whose id is localerror is a command that is executed when the error code 500 is stored. Specifically, as a process to be performed when a terminal error has occurred, a process of displaying the terminal error screen E201 (i.e., sub-content) generated in accordance with the file localerror.svg is specified. Further, the second command specifies that the top screen I101 is displayed as a display screen to which the terminal error screen E201 is changed, i.e., as content that is reproduced after the terminal error screen E201 instead of the title screen I102 that cannot be reproduced.

Each of the display control information 1012, the display control information 1013, and the display control information 1014 is constituted by (i) layout definition information specifying a method of drawing a screen and (ii) user's operation definition information specifying a process that is to be performed in accordance with an operation carried out by the user with respect to an object appearing on the screen. Specifically, the top-screen display control information 1012 contains layout definition information specifying a method of drawing the top screen I101 serving as main content. The terminal-error-screen display control information 1013 contains layout definition information specifying a method of drawing the terminal error screen E201 serving as first sub-content. The server-error-screen display control information 1014 contains layout definition information specifying a method of drawing the server error screen E202 serving as second sub-content.

FIG. 7(b) shows a modified example of the state transition definition information shown in FIG. 7(a), and is a diagram showing a structure of state transition definition information preferable in cases where the error content C200 is sent from the relay server 200 in response to the title screen content request R102.

The state transition definition information of FIG. 7(b) differs from that of FIG. 7(a) in that the command 1011c' specifies that a transition to processing the state transition definition information (error.mtd) of the acquired error content C200 is made in cases where the error code 300 is stored (i.e., in cases where the error content C200 has been received). With this, in cases where the content playback apparatus 100 has received the error content C200 as a response to the title screen content request R102, the content playback apparatus 100 can switch the reproduction target content to the error content C200, and can display the error screen I200 in accordance with the display control information contained in the error content.

FIG. 7(c) shows a modified example of the state transition definition information shown in FIG. 7(a), and is a diagram showing a structure of state transition definition information preferable in cases where there is a possibility that both the error code EC and the error content C200 are sent in response to the title screen content request R102.

The state transition definition information of FIG. 7(c) differs from that of FIG. 7(a) in that it is specified that (i) a transition to processing the state transition definition information (error.mtd) of the acquired error content C200 is made in cases where the error code 300 is stored (i.e., in cases where the error content C200 has been received), and that (ii) a transition to processing the command whose id is servererror is made in cases where the error code 400 is stored (i.e., in cases where the error code EC has been received). With this, in cases where the content playback apparatus 100 has received the error content C200 as a response to the title screen content request R102, the content playback apparatus 100 can switch the reproduction target content to the error content C200, and can display the error screen I200 in accordance with the display control information contained in the error content. Further, in cases where the content playback apparatus 100 has received the error code EC as a response to the title screen content request R102, the content playback apparatus 100 can display the server error screen E202 in accordance with the file servererror.svg.

FIG. 8 is a diagram showing, as an example of the layout definition information, the layout definition information contained in the sever-error-screen display control information 1014. The layout definition information shown in FIG. 8 is described according to SVG (Scalable Vector Graphics).

As shown in FIG. 8, the layout definition information is constituted by (i) an object that is drawn on the screen and (ii) a group of commands for specifying a layout of the object. In the layout definition information, the object that is drawn on the screen may be directly specified as a literal (especially in case of a character string or the like), or may be specified as a link to external data (especially in case of image data or the like). The layout definition information illustrated in FIG. 8 specifies the character string "SERVER ERROR HAS OCCURRED" that is displayed on the server error screen E202, the position where the character string is drawn, and the font size in which the character string is drawn.

Note that the content data such as the title screen content C102, the slide content C111, the slide content C112, and . . . are structured in the same manner as the top screen content C101 described above.

(Structure of the Content Playback Apparatus)

Figure 9:
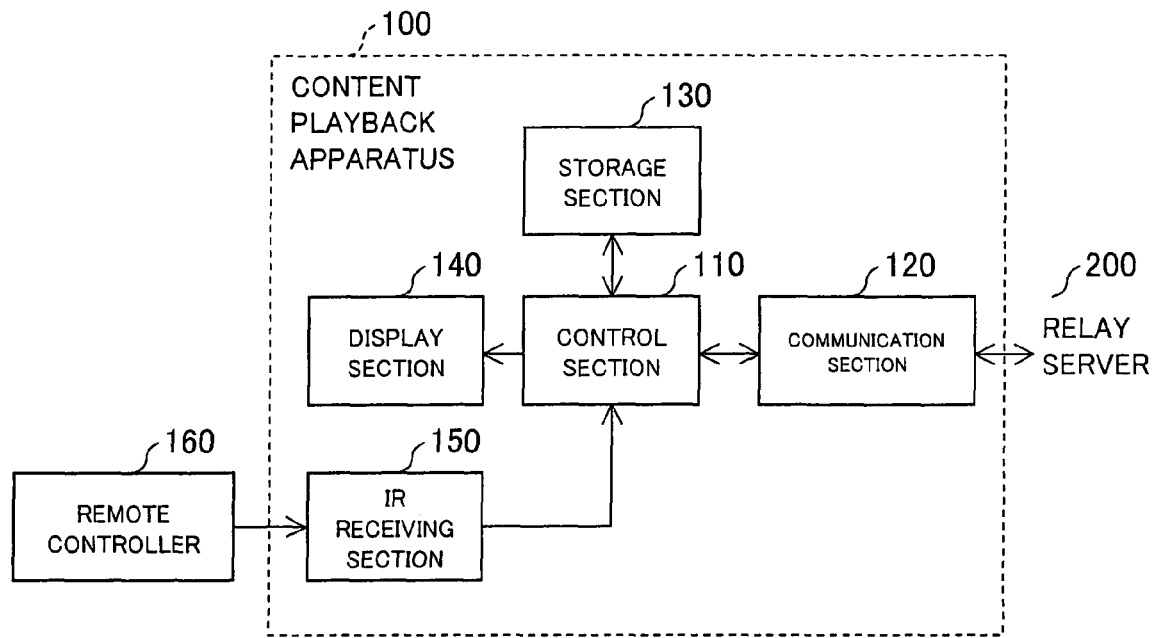
FIG. 9 shows an embodiment of the present invention, and is a block diagram schematically showing a structure of a content playback apparatus.
Figure 10:
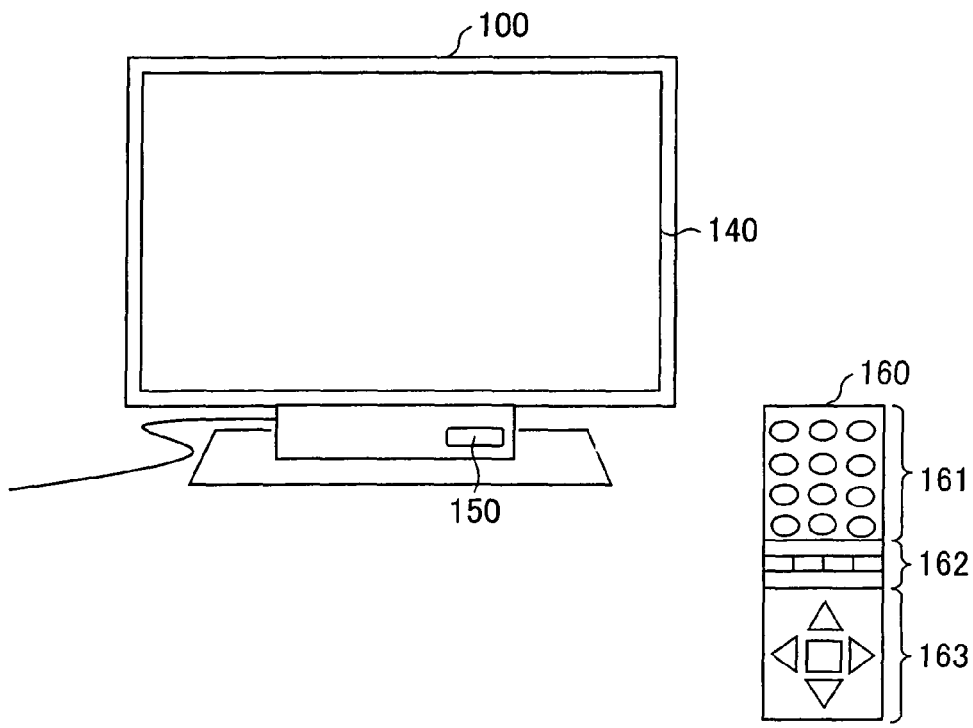
FIG. 10 shows an embodiment of the present invention, and is an overview diagram showing an overview of the content playback apparatus realized as a television receiver.
Figure 11:
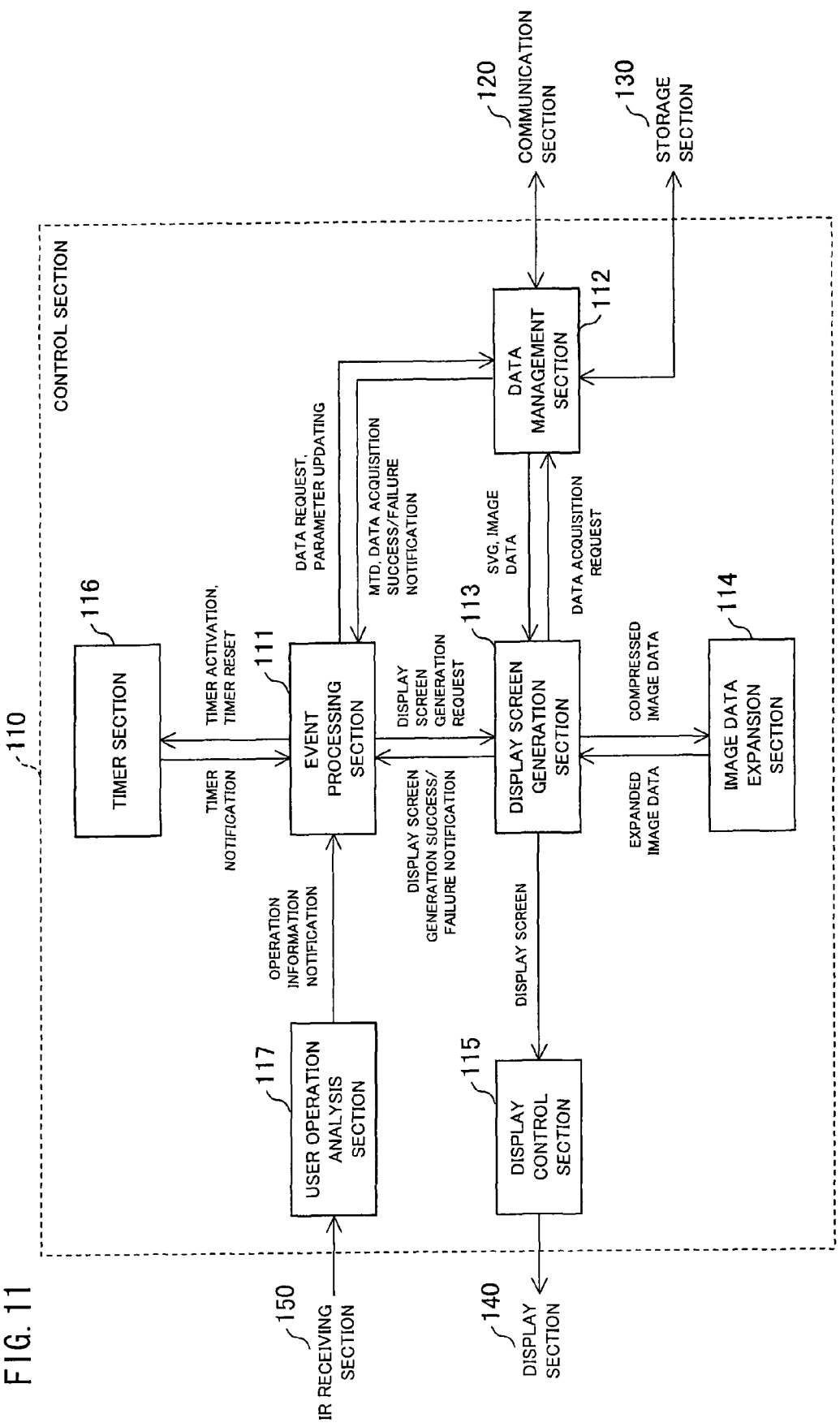
FIG. 11 shows an embodiment of the present invention, and is a block diagram showing a structure of a main part of a control section of the content playback apparatus.

The following schematically explains a structure of the content playback apparatus 100 with reference to FIGS. 9 through 11.

FIG. 9 is a block diagram showing a structure of a main part of the content playback apparatus 100.

As shown in FIG. 9, the content playback apparatus 100 is arranged so as to include a control section 110, a communication section 120, a storage section 130, a display section 140, and an IR receiving section 150.

The communication section 120 is a communication interface via which the content playback apparatus 100 and the relay server 200 exchange various types of data. The control section 110 can transmit a content request to the relay server 200 and receive content data from the relay server 200 via the communication section 120.

The storage section 130 is a storage device such as a memory. The control section 110 can store, in the storage section 130, the content data acquired from the relay server 200 via the communication section 120. Further, the control section 110 can store, in the storage section 130, a parameter necessary for reproducing the content data, and can refer to the parameter at any timing.

The display section 140 is a display device such as a liquid crystal display panel or a cathode-ray tube. The control section 110 causes the display section 140 to show the user an image obtained by reproducing the content data.

The IR receiving section 150 is a communication interface via which the content playback apparatus 100 communicates with a remote controller 160 in an infrared manner. The remote controller 160 imposes, on an infrared carrier wave, operation information indicating the content of an operation received from the user, thereby sending the operation information to the IR receiving section 150. The control section 110 can perform various types of process in accordance with the operation information acquired via the IR receiving section 150.

Note that the functions of the control section 110 will be explained later in detail with reference to FIG. 11.

FIG. 10 is an overview diagram showing an overview of the content playback apparatus 100.

As shown in FIG. 10, the content playback apparatus 100 can be realized, for example, as a television receiver. In cases where the content playback apparatus 100 is realized as a television receiver, the display section 140 is a display panel included in the television receiver. This makes it possible to reproduce a slide show of great power.

FIG. 10 also shows an example structure of the remote controller 160. In FIG. 10, the remote controller 160 is arranged so as to include a numerical button section 161, a command button section 162, and a cross button section 163.

The numerical button section 161 includes at least numerical buttons respectively corresponding to 0 to 9. The user can input a number of any digit by appropriately pressing these buttons. The numerical button section 161 allows the user to input a numerical value such as an album ID.

Further, the command button section 162 includes one or more command buttons. Each of the command buttons is related to a specific instruction either in advance or in accordance with the progress of a process. Pressing a command button allows the user to input an instruction related to the command button. For example, pressing a predetermined command button allows the user to provide the content playback apparatus 100 with an album browse start instruction to start a browse through an album.

Further, the cross button section 163 includes four buttons respectively corresponding to UP, DOWN, RIGHT, and LEFT and a decision button disposed in the center of an area surrounded by these four buttons. Pressing the UP, DOWN, RIGHT, and LEFT buttons allows the user to specify the position of a desired object from among a group of objects displayed by the display section 140, and pressing the decision button allows the user to select an object specified at that point of time. For example, the user can specify and select a desired image from among a displayed list of thumbnails. Further, pressing the RIGHT button when a slide displaying an image is displayed allows the user to input a next image display instruction to display an image subsequent to the currently displayed image.

FIG. 11 is a block diagram showing a structure of a main part of the control section 10 included in the content playback apparatus 100.

As shown in FIG. 11, the control section 110 is arranged so as to include an event processing section 111, a data management section 112, a display screen generation section 113, an image data expansion section 114, a display control section 115, a timer section 116, and a user operation analysis section 117.

The data management section 112 is a block for performing (i) a communication process for acquiring content data from the relay server 200 and (ii) management of the acquired content data. In accordance with instructions from the event processing section 111, the data management section 112 sends, to the relay server 200 via the communication section 120, a content request for acquiring content data. Then, when the data management section 112 succeeds in acquiring the content data, the data management section 112 stores the acquired content data in the storage section 130 and gives data acquisition success notification to the event processing section 111. Further, when the data management section 112 fails to acquire the content data, the data management section 112 gives data acquisition failure notification to the event processing section 111. Specifically, the data management section 112 gives server error occurrence notification to the event processing section 111 in cases where the data management section 112 receives an error code EC from the relay server 200 as a response to the content request, and the data management section 112 gives terminal error occurrence notification to the event processing section 111 in cases where the data management section 112 cannot complete the acquisition of the content data within a predetermined period of time having elapsed since the content request was transmitted.

The display screen generation section 113 is a block for generating, in accordance with display control information contained in the content data (esp., in accordance with layout definition information), a display screen that is displayed by the display section 140. Upon receiving, from the event processing section 111, a display screen generation request for generation of a display screen that is based on specific display control information, the display screen generation section 113 sends a data request for the display control information to the data management section 112. The data management section 112 reads out the requested display control information from the storage section 130, and then sends the display control information to the display screen generation section 113. Further, if there is image data specified by the display control information as an object that is to be displayed, the data management section 112 also reads out the image data from the storage section 130, and then sends the image data to the display screen generation section 113. Upon receiving the display control information from the data management section 112, the display screen generation section 113 generates a display screen in accordance with the received display control information. Then, the display screen generation section 113 sends the generated display screen to the display control section 115, and sends display screen generation success notification to the event processing section 111.

In cases where the display control information specifies that the image data is displayed and in cases where the image data is compressed image data that needs to be expanded, the display screen generation section 113 sends the compressed image data to the image data expansion section 114. The image data expansion section 114 expands the compressed image data so that the compressed image data become able to be displayed, and then returns the expanded image data to the display screen generation section 113. In cases where the display control information specifies that the image data is displayed, the display screen generation section 113 generates a display screen containing the expanded image data acquired from the image data expansion section 114, and then sends the generated display screen to the display control section 115. In cases where the process of generating the display screen in accordance with the display control information is not completed, e.g., in cases where the image data specified by the display control information is image data of a format that cannot be expanded by the image data expansion section 114, the display screen generation section 113 sends display screen generation failure notification to the event processing section 111.

The display control section 115 is a block for causing the display section 140 to display the display screen generated by the display screen generation section 113. The display control section 115 controls the display section 140 so that the display screen generated by the display screen generation section 113 is displayed at a timing specified by the event processing section 111.

The timer section 116 is a block for notifying the event processing section 111 of timings at which slides are switched from one after another for display in reproducing a slide show. When the display control section 115 starts to display a slide, the event processing section 111 instructs the timer section 116 to activate a timer. At this point of time, the timer section 116 activates the timer. Then, at a point of time where a predetermined slide display time has elapsed since the timer was activated, the timer section 116 sends timer notification to the event processing section 111. Upon receiving the timer notification, the event processing section 111 instructs the display control section 115 to display a slide subsequent to the currently displayed slide.

The user operation analysis section 117 is a block for notifying the event processing section 111 of the content of an operation carried out by the user. Upon detecting the occurrence of a user's operation via the IR receiving section 150, the user operation analysis section 117 gives, to the event processing section 111, operation information notification indicating the content of the operation.

The event processing section 111 is a block for controlling each of the above processing sections in accordance with state transition definition information (MTD) contained in content. The event processing section 111 reads out the state transition definition information from the storage section 130 via the data management section 112, and then causes any one of the above processing sections to execute a command contained in the state transition definition information thus read out.

(Processes in the Content Playback System)

Processes in the content playback system 1 will be described below with reference to FIGS. 12 to 15.

Figure 12:
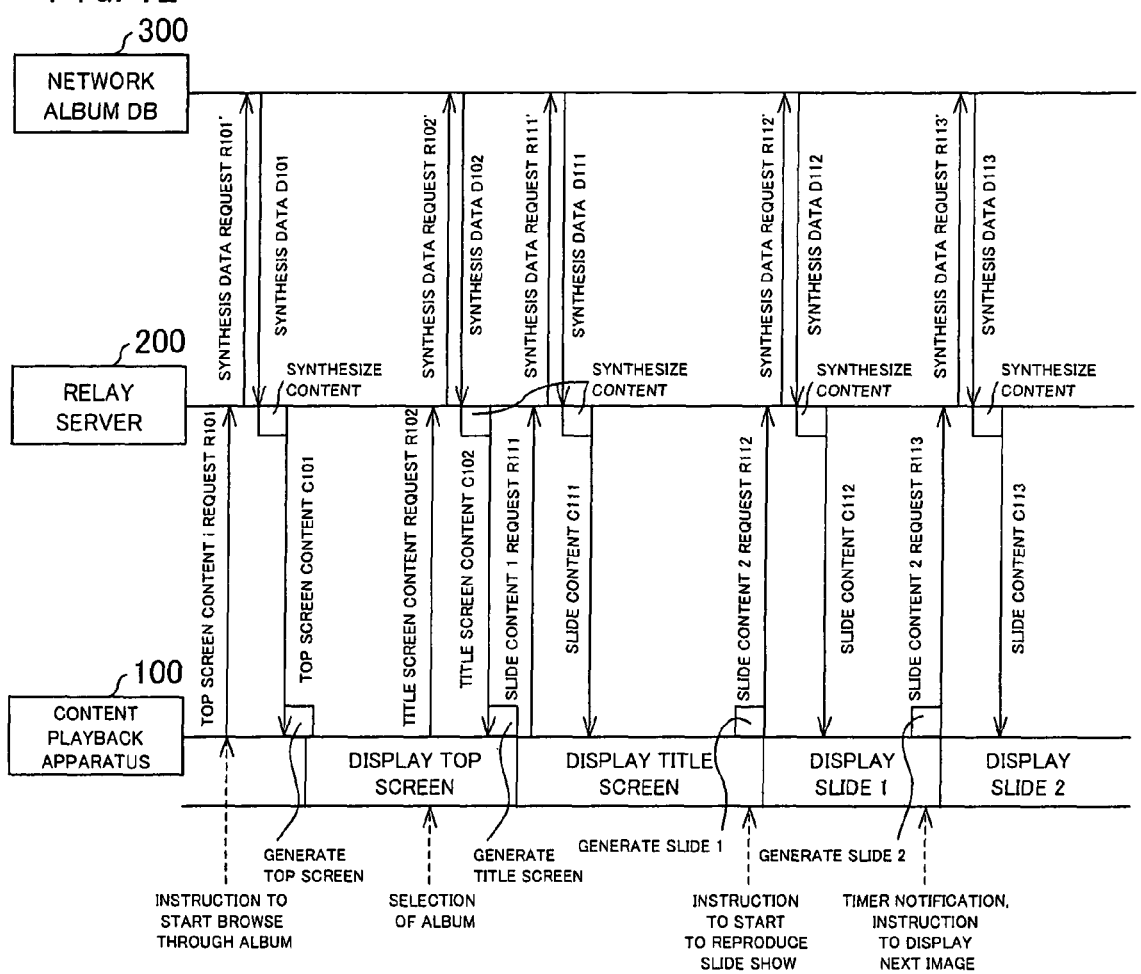
FIG. 12 shows an embodiment of the present invention, and is a sequence diagram showing a flow of a process that is performed in the content playback system in cases where the content playback system operates without error.

FIG. 12 is a sequence diagram showing a flow of a process that is performed in the content playback system in cases where the content playback system 1 operates properly without error.

The process in the content playback system 1 is started, for example, when the user provides the content playback apparatus 100 with an album browse start instruction to start a browse through an album. Upon receiving the album browse start instruction from the user, the content playback apparatus 100 transmits a top screen content request R101 to the relay server 200. Upon receiving the top screen content request R101, the relay server 200 requests, from the network album DB 300, synthesis data D101 necessary for synthesizing the top screen content C101. In response to the synthesis data request R101', the network album DB 300 provides the relay server 200 with the synthesis data D101 necessary for synthesizing the top screen content C101. The relay server 200 synthesizes the top screen content C101 by using the synthesis data D101 thus acquired. Then, when the synthesis of the top screen content C101 is completed, the top screen content C101 is transmitted to the content playback apparatus 100.

The transition definition information 1011 of the top screen content C101 contains a command specifying that the top screen I101, serving as main content, which is generated in accordance with the top-screen display control information 1012 contained in the top screen content C101 is displayed (see FIG. 6). In accordance with the instruction, the content playback apparatus 100, having acquired the top screen content C101, displays the top screen I101, serving as main content, which is generated in accordance with the top-screen display control information 1012. Further, the state transition definition information 1011 of the top screen content C101 contains a command specifying that a title screen content request R102 containing an album ID inputted by the user is transmitted to the relay server 200. At a point of time where an ID album is specified by the user, a title screen content request R102 containing the specified album ID is transmitted to the relay server 200 by the content playback apparatus 100 in accordance with the instruction.

Upon receiving the title screen content request R102, the relay server 200 requests, from the network album DB 300, synthesis data D102 necessary for synthesizing the title screen content C102 of an album specified by the album ID. In response to the synthesis data request R102', the network album DB 300 provides the relay server 200 with the synthesis data D102 necessary for synthesizing the title screen content C102. The relay server 200 synthesizes the title screen content C102 by using the synthesis data D102 thus acquired. Then, when the synthesis of the tile screen content C102 is completed, the title screen content C102 is transmitted to the content playback apparatus 100.

The state transition definition information of the title screen content C102 contains a command specifying that the title screen I102 generated in accordance with display control information contained in the title screen content C102 is displayed. In accordance with the instruction, the content playback apparatus 100, having acquired the title screen content C102, displays the title screen I102 generated in accordance with the display control information. At this point of time, the content playback apparatus 100 changes from displaying the top screen I101 to displaying the title screen I102. Further, the state transition definition information of the title screen content C102 contains a command specifying that a slide content request R111 for acquisition of the first slide content C111 is transmitted to the relay server 200. In accordance with the instruction, the content playback apparatus 100 transmits the slide content request R111 to the relay server 200, thereby requesting the first slide content C111.

Upon receiving the slide content request R111, the relay server 200 requests, from the network album DB 300, synthesis data D111 necessary for synthesizing the slide content C111. In response to the synthesis data request R111', the network album DB 300 provides the relay server 200 with the synthesis data D111 necessary for synthesizing the slide content C111. The relay server 200 synthesizes the first slide content C111 by using the synthesis data D111 thus acquired. Then, when the synthesis of the slide content C111 is completed, the slide content C111 is transmitted to the content playback apparatus 100.

The state transition definition information of the title screen content C102 further contains a command specifying that a transition to processing state transition definition information of the slide content C111 is made on receipt of an instruction to start to reproduce a slide show. Upon receiving the instruction to start to reproduce the slide show, the content playback apparatus 100 reads out the state transition definition information of the slide content C111 already acquired, and then starts to perform a process specified by the state transition definition information.

The state transition definition information of the slide content C111 contains a command specifying that a first slide generated in accordance with display control information of the slide content C111 is displayed. In accordance with the instruction, the content playback apparatus 100 displays the first slide generated in accordance with the display control information. At this point of time, the content playback apparatus 100 changes from displaying the title screen I102 to displaying the first slide. Further, the state transition definition information of the slide content C111 contains a command specifying that a slide content request R112 for acquisition of second slide content C112 is transmitted to the relay server 200. In accordance with the instruction, the content playback apparatus 100 transmits the slide content request R112 to the relay server 200, thereby requesting the acquisition of the second slide content C112.

Upon receiving the slide content request R112, the relay server 200 requests, from the network album DB 300, synthesis data D112 necessary for synthesizing the slide content C112. In response to the synthesis data request R112', the network album DB 300 provides the relay server 200 with the synthesis data D112 necessary for synthesizing the slide content C112. The relay server 200 synthesizes the second slide content C112 by using the synthesis data D112 thus acquired. Then, when the synthesis of the slide content C112 is completed, the slide content C112 is transmitted to the content playback apparatus 100.

The state transition definition information of the slide content C111 further contains a command specifying that a transition to processing state transition definition information of the slide content C112 is made when a predetermined slide display time has elapsed since the first slide started to be displayed or when a next image display instruction to display a slide subsequent to the first slide is received from the user. In accordance with the instruction, the content playback apparatus 100 reads out the state transition definition information of the slide content C112 at a point of time where a predetermined slide display time has elapsed since the first slide started to be displayed or at a point of time where a next image display instruction to display a slide subsequent to the first slide is received from the user, and then starts to perform a process specified by the state transition definition information thus read out. Note that the point of time where the predetermined slide display time elapsed since the first slide started to be displayed can be specified, for example, as a point of time where the event processing section 111 receives timer notification from the timer section 116. Further, the point of time where the next image display instruction is received from the user is specified, for example, as a point of time where the event processing section 111 receives next image display instruction notification from the user operation analysis section 117.

The state transition definition information of the slide content C112 contains a command specifying that a second slide generated in accordance with display control information contained in the slide content C112 is displayed. In accordance with the instruction, the content playback apparatus 100 displays the second slide generated in accordance with the display control information. At this point of time, the content playback apparatus 100 changes from displaying the first slide to displaying the second slide.

The content playback apparatus 100 repeats such a process with respect to third and subsequent slides, thereby switching the first to nth slides one after another for display at predetermined timings.

Figure 13:
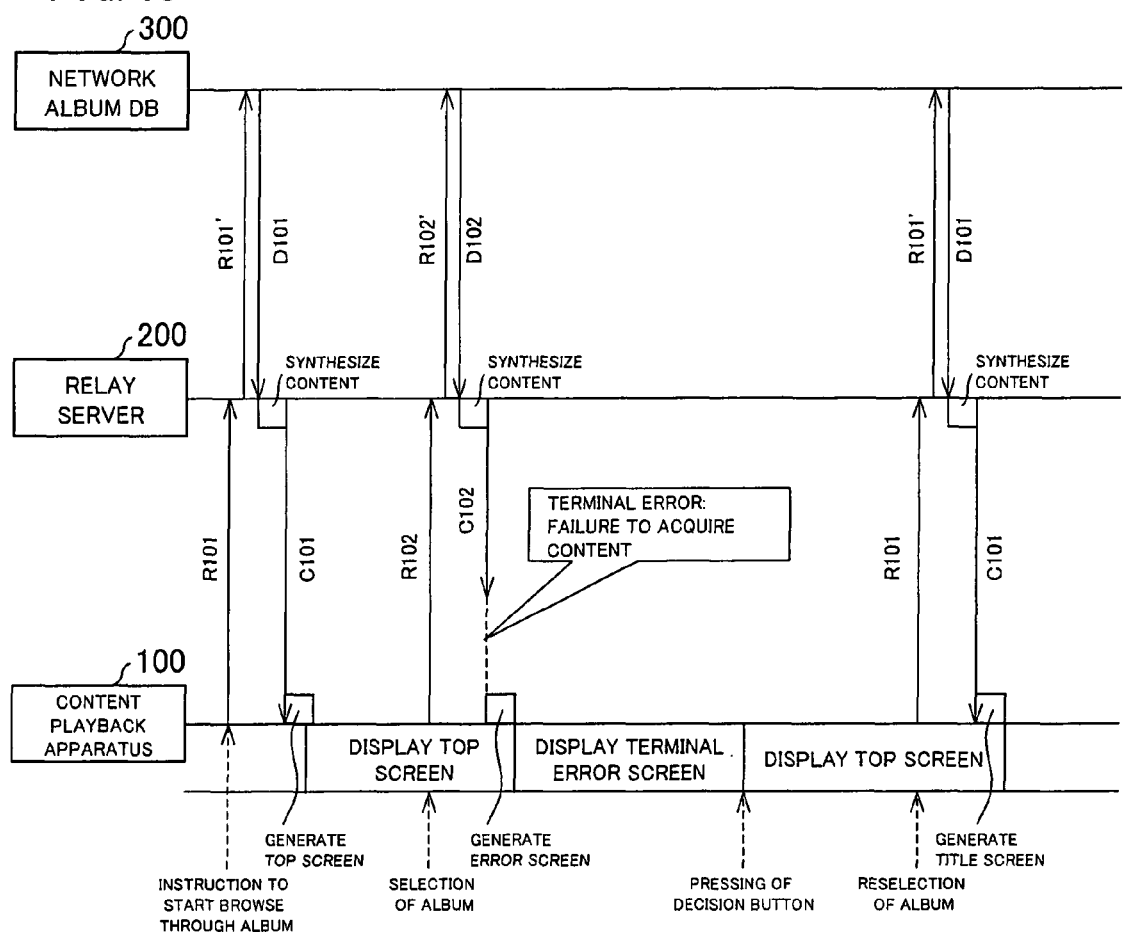
FIG. 13 shows an embodiment of the present invention, and is a sequence diagram showing a flow of a process that is performed in the content playback system in cases where a terminal error has occurred.

FIG. 13 is a sequence diagram showing a flow of a process that is performed in the content playback system 1 in cases where a terminal error has occurred.

In FIG. 13, attention should be paid to the occurrence of such a terminal error that the content playback apparatus 100 fails to acquire the title screen content C102. In cases where the acquisition of the title screen content C102 is not completed before a predetermined period of time has elapsed since the title screen content request R102 was transmitted, the content playback apparatus 100 judges that a terminal error has occurred.

The state transition information I011 of the top screen content C101 contains a command specifying that the terminal error screen E201 generated in accordance with the terminal-error-screen display control information contained in the top screen content C101 is displayed when a terminal error has occurred. Upon detecting a terminal error, the content playback apparatus 100 follows the instruction, thereby generating and displaying the terminal error screen E201 (see FIG. 3(b)). At this point of time, the content playback apparatus 100 changes from displaying the top screen I101 to displaying the terminal error screen E201. When an operation of pressing the decision button is received from the user while the terminal error screen E201 is being displayed, the content playback apparatus 100 changes to redisplaying the top screen I101 that displays a list of a plurality of albums (see FIG. 2(b)). While the top screen I101 is being redisplayed, the user can specify the desired album again.

Figure 14:
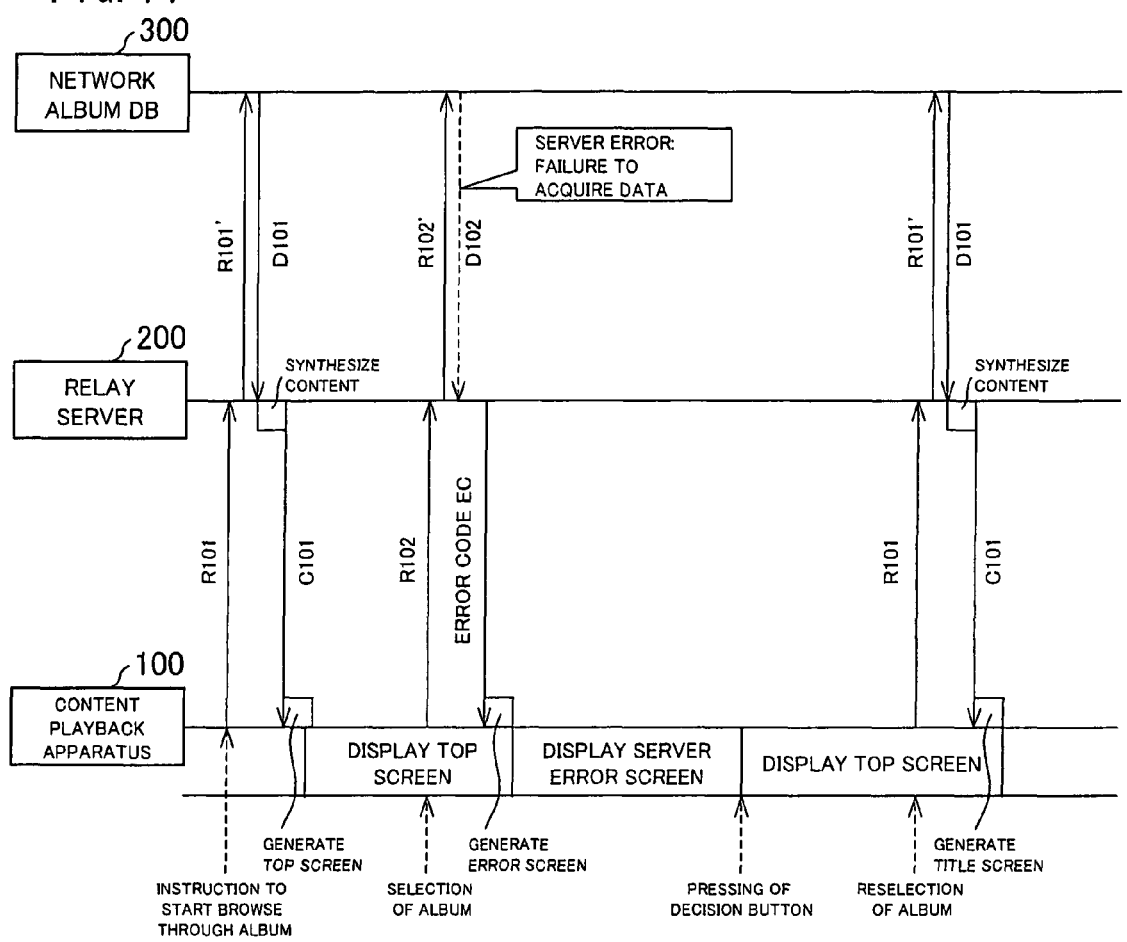
FIG. 14 shows an embodiment of the present invention, and is a sequence diagram showing a flow of a process that is performed in the content playback system in cases where a server error has occurred.

FIG. 14 is a sequence diagram showing a flow of a process that is performed in the content playback system 1 in cases where a server error has occurred.

In FIG. 14, attention should be paid to the fact that the error code EC is sent from the relay server 200 to the content playback apparatus 100 as a response to the title screen content request R102. In cases where the content playback apparatus 100 acquires the error code EC from the relay server 200 as a response to the title screen content request R102, the content playback apparatus 100 judges that a server error has occurred.

The state transition definition information 1011 of the top screen content C101 contains a command specifying that the server error screen E202 generated in accordance with the server-error-screen display control information 1014 contained in the top screen content C101 is displayed when a server error has occurred. Upon detecting a server error, the content playback apparatus 100 follows the instruction, thereby generating and displaying the server error screen E202 (see FIG. 4(b)). At this point of time, the content playback apparatus 100 changes from displaying the top screen I101 to displaying the server error screen E202. When an operation of pressing the decision button is received from the user while the server error screen E202 is being displayed, the content playback apparatus 100 changes to redisplaying the top screen I101 that displays a list of a plurality of albums (see FIG. 2(b)). While the top screen I101 is being redisplayed, the user can specify the desired album again.

Figure 15:
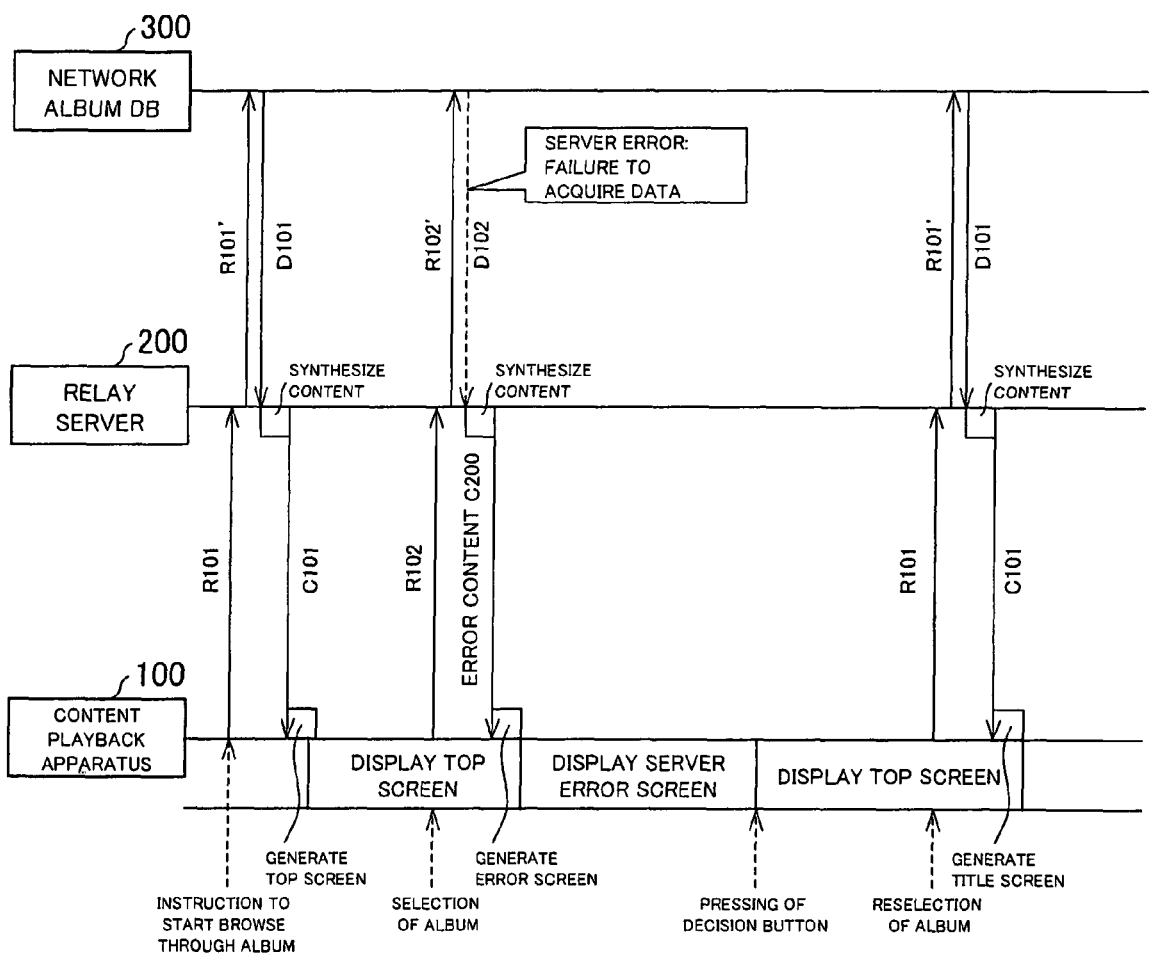
FIG. 15 shows an embodiment of the present invention, and is a sequence diagram showing a modified example of the process, shown in FIG. 14, which is performed in the content playback system.

FIG. 15 is a sequence diagram showing a flow another process that is performed in the content playback system 1 in cases where a server error has occurred.

In FIG. 15, attention should be paid to the fact that the error content C200 is sent from the relay server 200 to the content playback apparatus 100 as a response to the title screen content request R102. In cases where the content playback apparatus 100 acquires the error content C200 as a response to the title screen content request R102, the content playback apparatus 100 judges that a serve error has occurred.

When the process that is performed in cases where a server error has occurred is performed in accordance with the error content C200, the state transition definition information of the top screen content C101 needs to contain a command specifying that a transition to processing state transition definition information of the error content C200 is made when a server error has been detected. Upon detecting a server error, the content playback apparatus 100 reads out the state transition definition information of the error content C200 in accordance with the instruction, and then starts to perform a process specified by the state transition definition information thus read out.

The state transition definition information of the error content C200 contains a command specifying that the server error screen I200 generated in accordance with the display control information contained in the error content C200 is displayed. The content playback apparatus 100 displays the server error screen I200 generated in accordance with the display control information of the error content C200 (the display control information being identical to the server-error-screen display control information 1014 of the top screen content C101) (see FIG. 5(b)). At this point of time, the content playback apparatus 100 changes from displaying the top screen I101 to displaying the server error screen I200. Further, the state transition definition information of the error content C200 contains a command specifying that a transition to processing the state transition definition information of the top screen content C101 is made in cases where an operation of pressing the decision button is received from the user while the server error screen I200 is being displayed. Upon receiving an operation of pressing the decision button, the content playback apparatus 100 reads out the state transition definition information 1011 of the top screen content C101, and then starts to perform a process specified by the state transition definition information 1011 thus read out.

(Processes in the Content Playback Apparatus)

Processes in the content playback apparatus 100 will be described below with reference to FIGS. 16 to 18.

Figure 16:
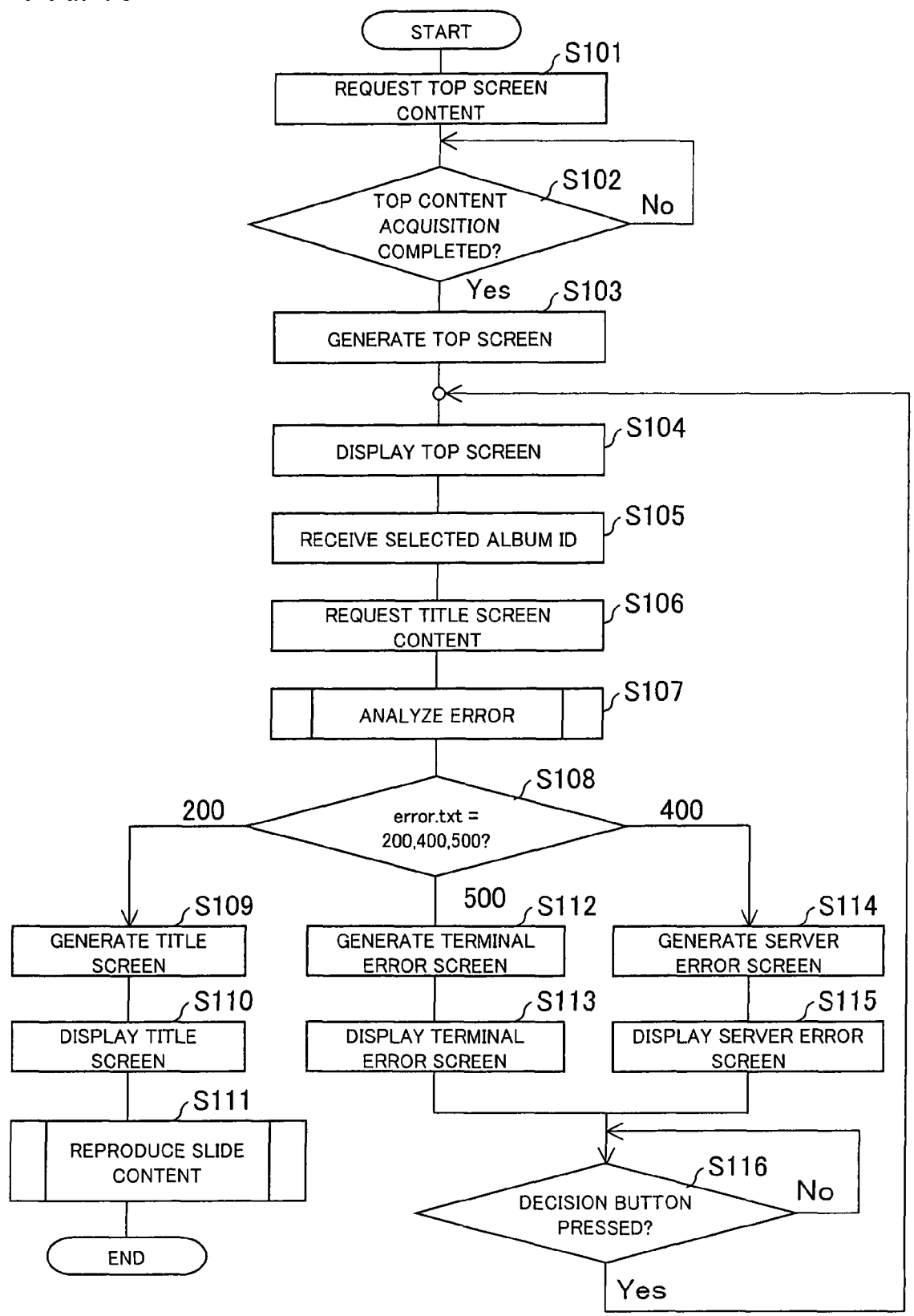
FIG. 16 shows an embodiment of the present invention, and is a flow chart showing a process that is preformed in the content playback apparatus.

FIG. 16 is a flow chart showing a flow of a process that is preformed in the content playback apparatus 100.

As soon as the content playback apparatus 100 starts the process, the data management section 112 sends a top screen content request R101 to the relay server 200 (S101). Then, the data management section 112 acquires the top screen content C101 as a response to the top screen content request R101 (S102). When the acquisition of the top screen content C101 is completed (S102: Yes), the data management section 112 stores the top screen content C101 in the storage section 130, and then sends data acquisition success notification to the event processing section 111.

Upon receiving the data acquisition success notification from the data management section 112, the event processing section 111 reads out the state transition definition information 1011 of the top screen content C101 from the storage section 130. The subsequent process is realized by executing the commands of the state transition definition information 1011 one after another.

The event processing section 111 requests the display screen generation section 113 to generate a top screen I101. The display screen generation section 113 reads out the display control information 1012 of the top screen content C101 from the storage section 130, and then generates a top screen I101 in accordance with the display control information 1012 (S103). The top screen I101 thus generated is sent to the display control section 115. Upon receiving the top screen I101, the display control section 115 causes the display section 140 to display the top screen I101 (S104).

The user operation analysis section 117 receives the user's selection of an album, and then returns an album ID of the selected album to the event processing section 111 (S105). The event processing section 111 requests the data management section 112 to acquire title screen content C102 of the album specified by the album ID. In response to the request, the data management section 112 sends a title screen content request R102 to the relay server 200 (S106).

In the communication process, after the title screen content request R102 has been transmitted, ANALYZE ERROR S107 is performed. In cases where it is judged in ANALYZE ERROR S107 that the title screen content C102 has been normally acquired, the error code 200 is stored in the parameter file error.txt. Further, in cases it is judged that the title screen content C102 cannot be acquired due to a server error, the error code 400 is stored in the parameter file error.txt. Further, in cases where it is judged that the title screen content C102 cannot be acquired due to a terminal error, the error code 500 is stored in the parameter file error.txt. The event processing section 111 determines the subsequent process with reference to the parameter file error.txt in which the error code is stored (S108).

In cases where the error code 200 is stored in the parameter file error.txt, i.e., in cases where the title screen content C102 has been normally acquired, the event processing section 111 reads out the state transition definition information 1011 of the title screen content C102 from the storage section 130. In accordance with the state transition definition information of the title screen content C102, the event processing section 111 requests the display screen generation section 113 to generate a title screen I102. The display screen generation section 113 reads out the display control information of the title screen content C102 from the storage section 130, and then generates a title screen I102 in accordance with the display control information thus read out (S109). The title screen I102 thus generated is sent to the display control section 115. Upon receiving the title screen I102, the display control section 115 causes the display section 140 to display the title screen I102 (S110). Thus, in cases where it is possible to cause the display section 140 to normally display the top screen I102, REPRODUCE SLIDE CONTENT S111 in which slides are displayed one after another is performed.

In cases where the error code 500 is stored in the parameter file error.txt, i.e., in cases where the title screen content C102 cannot be normally acquired due to a terminal error, the event processing section 111 requests, in accordance with the state transition definition information 1011 of the top screen content C101, the display screen generation section 113 to generate a terminal error screen E201. The display screen generation section 113 reads out the display control information 1013 of the top screen content C101 from the storage section 130, and then generates a terminal error screen E201 in accordance with the display control information 1013 (S112). The terminal error screen E201 thus generated is sent to the display control section 115. Upon receiving the terminal error screen E201, the display control section 115 causes the display section 140 to display the terminal error screen E201 (S113).

In cases where the error code 400 is stored in the parameter file error.txt, i.e., in cases where the title screen content C102 cannot be normally acquired due to a server error, the event processing section 111 requests, in accordance with the state transition definition information 1011 of the top screen content C101, the display screen generation section 113 to generate a server error screen E202. The display screen generation section 113 reads out the display control information 1014 of the top screen content C101 from the storage section 130, and then generates a server error screen E202 in accordance with the display control information 1014 (S114). The server error screen E202 thus generated is sent to the display control section 115. Upon receiving the server error screen E202, the display control section 115 causes the display section 140 to display the server error screen E202 (S115).

While the terminal error screen E201 or the server error screen E202 is being displayed, the user operation analysis section 117 waits for the user to press the decision button (S116). When the decision button is pressed by the user (S116: Yes), the user operation analysis section 117 notifies the event processing section 111 that the operation has occurred. Upon receiving the operation information notification, the event processing section 111 instructs the display control section 115 to redisplay the top screen I101. The display control section 115 causes the display section 140 to redisplay the top screen I101 (S104).

In the following, ANALYZE ERROR S107 described above will be explained in a little more detail with reference to FIG. 17.

Figure 17:
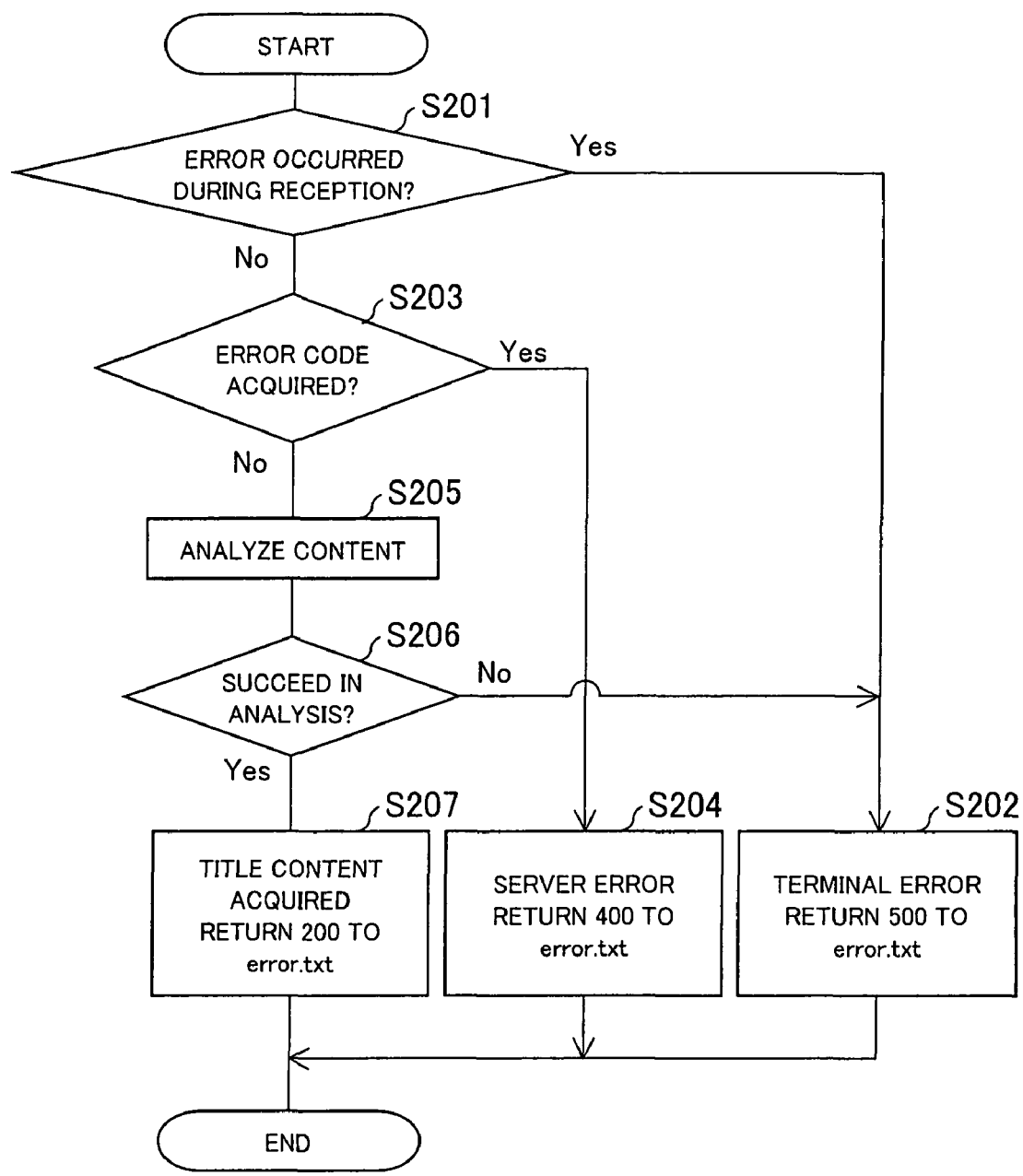
FIG. 17 shows an embodiment of the present invention, and is a flow chart showing an error analysis process contained in the process that is performed in the content playback apparatus. Specifically, the flow chart shows an error analysis process suitable for a case where an error code is transmitted from the relay server.

FIG. 17 is a flow chart showing a flow of a process that is performed in ANALYZE ERROR S107. Specifically, FIG. 17 shows a process suitable for a case where the error code EC is sent from the relay server apparatus 200 when a server error has occurred.

Upon receiving data from the relay server 200 as a response to the title screen content request R102, the data management section 112 verifies whether or not the received data is normal data (S201). Specifically speaking of a case where the acquisition of the title screen content C102 is realized according to HTTP, the data management section 112 makes a comparison between (i) the value of a Content-Length field contained in an HTTP header and (ii) the body length of the received data, and then verifies whether or not the acquired data is normal data free from defect. This allows the data management section 112 to detect a failure having occurred in a communication pathway extending from the relay server 200 to the content playback apparatus 100.

In cases where the data acquired from the relay server 200 as a response to the title screen content request R102 is abnormal, the data management section 112 judges that an error has occurred in the reception process (S201: Yes). In this case, the data management section 112 writes the error code 500 in the parameter file error.txt stored in the storage section 130 as part of the top screen content C101 (S202).

In cases where the data acquired from the relay server 200 as a response to the title screen content request R102 is normal data (S201: No), the data management section 112 judges whether or not the acquired data is an error code (S203). The judgment may be realized according to any method such as a pattern matching method of matching data to a predetermined error code pattern. This allows the data management section 112 to detect a server error having occurred in the relay server 200.

In cases where the data acquired from the relay server 200 is an error code (S203: Yes), i.e., in cases where it is discovered that a server error has occurred in the relay server 200, the data management section 112 writes the error code 400 in the parameter file error.txt (S204).

In cases where the data acquired from the relay server 200 is not an error code (S203: No), the data management section 112 performs content analysis with respect to the data further acquired (S205). Specifically, it is judged in ANALYZE CONTENT S205 whether or not the acquired data is content data (see FIG. 6) having a predetermined data structure; furthermore, in cases where the acquired data is content data (see FIG. 6) having a predetermined data structure, a syntax analysis of the content data (specifically, an XML syntax analysis of state transition definition information and display control information each contained in the content data) is performed.

In cases where it is judged that as a result of ANALYZE CONTENT S205 that the acquired data is not content data having a predetermined data structure, or in cases where a syntax error is found in the content data (S206: No), the data management section 112 writes the error code 500 in the parameter file error.txt (S202).

On the other hand, in cases where it is judged as a result of ANALYZE CONTENT S205 that the acquired data is content data having a predetermined data structure and does not contain a syntax error (S206: No), the error code 200 is written in the parameter file error.txt (S207). Further, data acquisition success notification is sent to the event processing section 111, and the successfully acquired content data is stored in the storage section 130.

Figure 18:
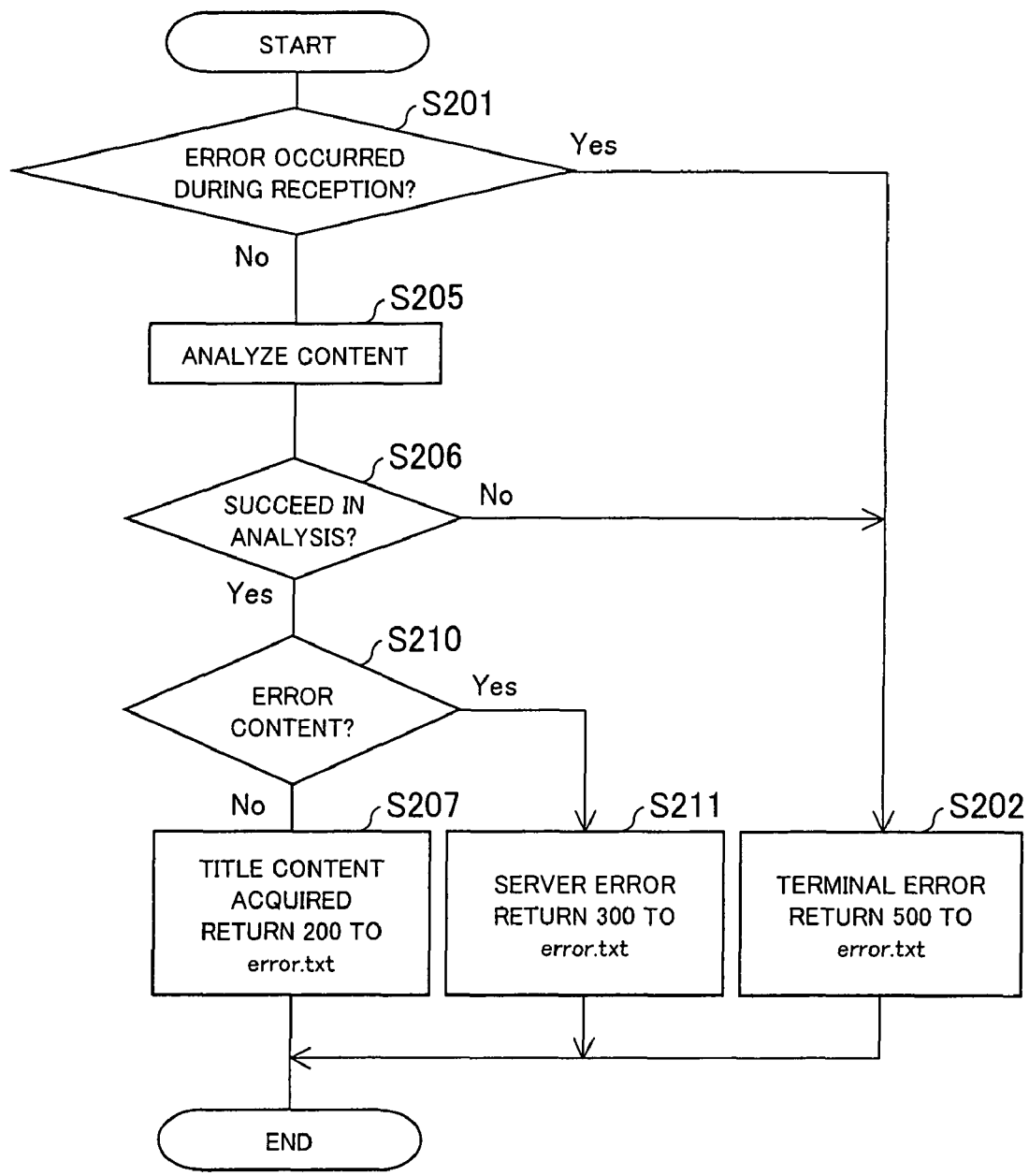
FIG. 18 shows an embodiment of the present invention, and is a flow chart showing another error analysis process. Specifically, the flow chart shows an error analysis process suitable for a case where error content is transmitted from the relay server.

FIG. 18 is a flow chart showing a modified example of the error analysis process shown in FIG. 17. Specifically, FIG. 18 shows a process suitable for a case where the error content C200 is sent from the relay server 200 when a server error has occurred.

The flow chart of FIG. 18 differs from that of FIG. 17 in that Step S203 of judging whether or not the acquired data is an error code EC is omitted, and that Step S210 is added. In Step S210, which is taken after it has been judged in ANALYZE CONTENT S205 that the data acquired is normal content data (S206: Yes), it is judged whether or not the content data is error content C200. Moreover, in cases where the acquired content data is error content C200 (S210: Yes), the data management section 112 writes the error code 300 in the parameter file error.txt (S211).

Figure 19:
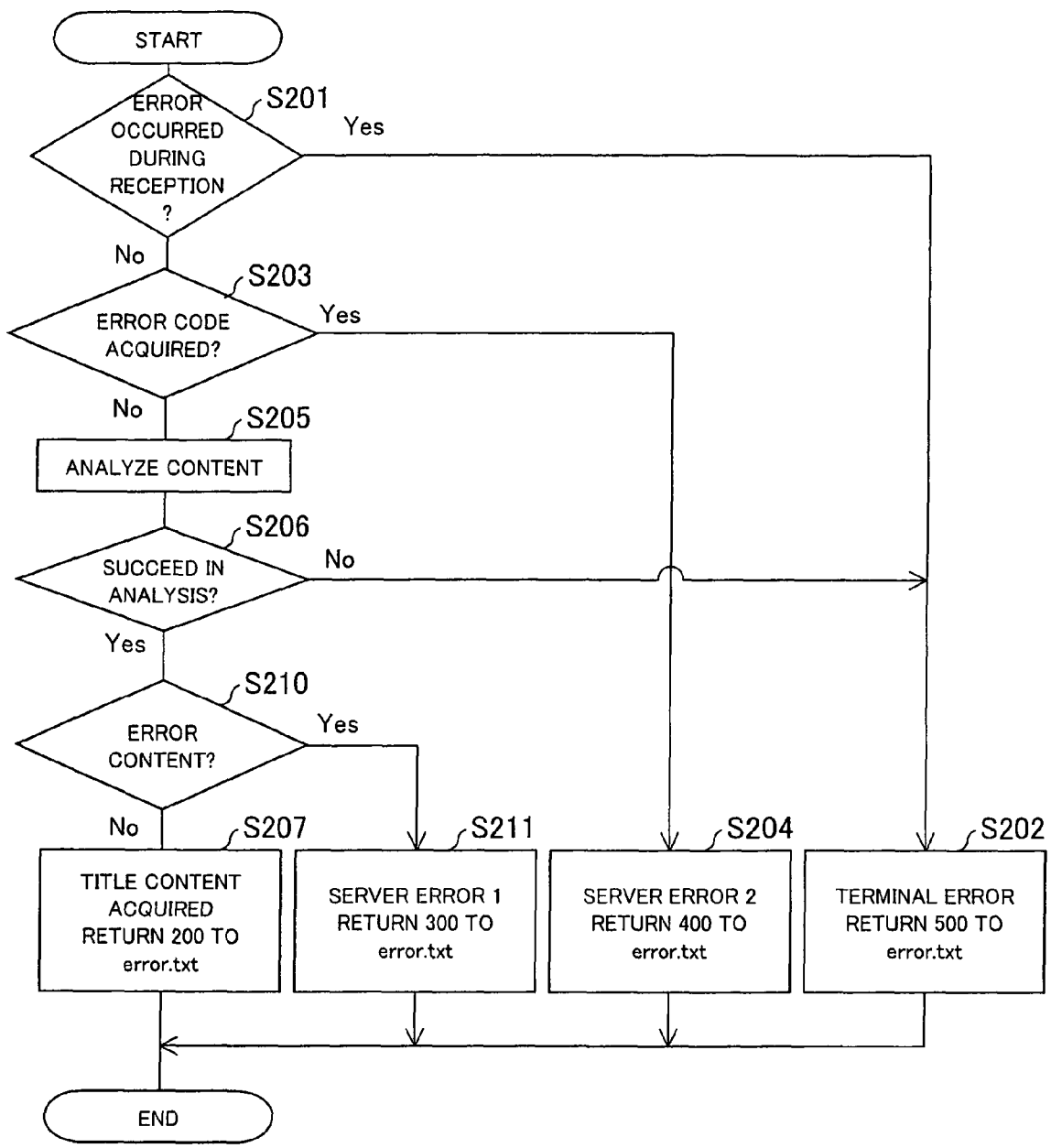
FIG. 19 shows an embodiment of the present invention, and us a flow chart showing another error analysis process. Specifically, the flow chart shows an error analysis process suitable for a case where both the error code and the error content are transmitted from the relay server.

FIG. 19 is a flow chart showing another modified example of the error analysis process shown in FIG. 17. Specifically, FIG. 19 shows a process suitable for a case where it is not predetermined which of the error code EC and the error content C200 is sent from the relay server 200 when a server error has occurred (i.e., in cases where there is a possibility that both of them are sent).

The flow chart of FIG. 19 differs from that of FIG. 17 in that that Step S210 is added. In Step S210, which is taken after it has been judged in ANALYZE CONTENT S205 that the data acquired is normal content data (S206: Yes), it is judged whether or not the content data is error content C200. Moreover, in cases where the acquired content data is error content C200 (S210: Yes), the data management section 112 writes the error code 300 in the parameter file error.txt (S211).

(Process in the Relay Server)

In the following, a process in the relay server 200 will be described with reference to FIG. 20.

Figure 20:
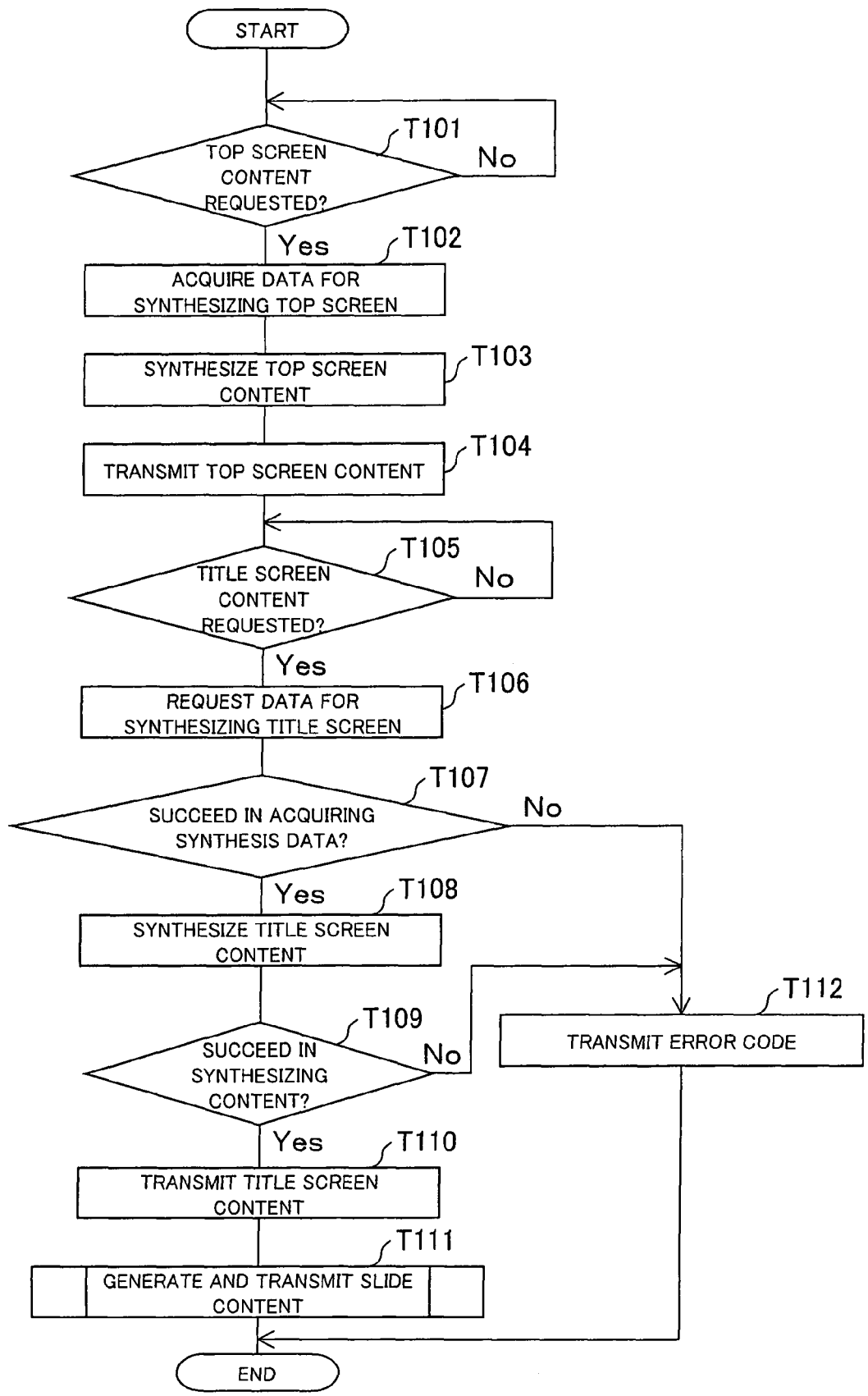
FIG. 20 shows an embodiment of the present invention, and is a flow chart showing a process that is preformed in the relay server. Specifically, the flow chart shows a process suitable for a case where an error code is transmitted to the content playback apparatus.

FIG. 20 is a flow chart showing a flow of a process that is performed in the relay server 200. Specifically, FIG. 20 shows a process suitable for a case where the relay server 200 is arranged so as to send the error code EC to the content playback apparatus 100 in cases where a server error has occurred.

The relay server 200 waits for a top screen content request R101 to be sent from the content playback apparatus 100 (T101). Then, upon receiving the top screen content request R101, the relay server 200 acquires, from the network album DB 300, the synthesis data D101 necessary for synthesizing the top screen content C101 (T102), and then synthesizes the top screen content C101 in accordance with the synthesis data D101 thus acquired (T103). When the synthesis of the top screen content C101 is completed, the relay server 200 transmits the top screen content C101 to the content playback apparatus 100 (T104).

Next, the relay server 200 waits for a title screen content request R102 to be sent from the content playback apparatus 100 (T105). Upon receiving the title screen content request R102, the relay server 200 requests, from the network album DB 300, the synthesis data D102 necessary for synthesizing the title screen content C102 (T106). When the relay server 200 succeeds in acquiring the synthesis data D102 from the network album DB 300 (T107: Yes), the relay server 200 starts to synthesize the title screen content C102 (T108). Then, when the relay server 200 succeeds in synthesizing the title screen content C201 (T109: Yes), the relay server 200 transmits the title screen content C102 to the content playback apparatus 100 (T110). Thereafter, upon request of the content playback apparatus 100, the relay server 200 performs Process T111 of sequentially generating and transmitting slide content.

On the other hand, in cases where the relay server 200 fails to acquire the synthesis data D102 from the network album DB 300 (T107: No) or in cases where the relay server 200 fails to synthesize the title screen content (T109: No), the relay server 200 transmits, to the content playback apparatus 100, an error code EC indicating that it is impossible to transmit the title screen content C102 (T112).

Examples of the case where it is judged in Step T107 that the relay server 200 has failed to acquire the synthesis data D102 include (1) a case where the network album DB 300 has been turned off or crashed, (2) a case where a communication error has occurred between the relay server 200 and the network album DB 300, (3) a case where a processing error has occurred in the relay server 200, and (4) a case where the relay server 200 has made an improper request to the network album DB 300 in accordance with a wrong title screen content request R102 sent from the content playback apparatus 100.

In cases where the relay server 200 is arranged so as to provide the error content C200 to the content playback apparatus in cases where an server error has occurred, it is only necessary that the flow chart shown in FIG. 20 be changed so that Step T112 of transmitting the error code EC is replaced by Step T112' of transmitting the error content.

In cases where the error content C200 that is provided to the content playback apparatus 100 in cases where a server error has occurred is synthesized by the relay server 200, there is a possibility that the relay server 200 fails to synthesize the error content C200. For this reason, it is preferable that the relay server 200 be arranged so as to (i) send the error content C200 to the content playback apparatus 100 in cases where the relay server 200 succeeds in synthesizing the error content C200 and (ii) send the error content EC to the content playback apparatus 100 in cases where the relay server 200 fails to synthesize the error content C200.

Figure 21:
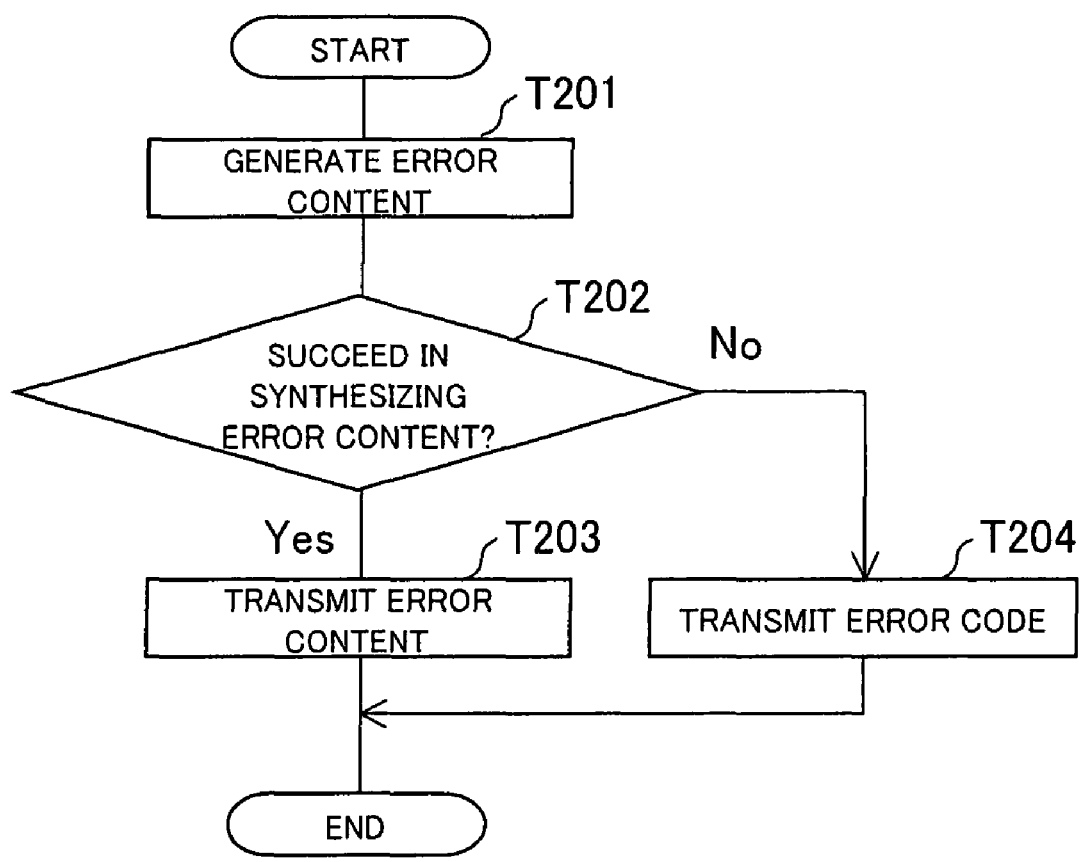
FIG. 21 shows an embodiment of the present invention, and is a flow chart showing a process, contained in the process that is performed in the relay server, which is performed in cases where error content is transmitted to the content playback apparatus.

FIG. 21 is a flow chart showing the details of Step T112' of transmitting the error content C200, Step T112' being taken in cases where the relay server 200 is arranged as described above.

In cases where the relay server 200 fails to acquire the synthesis data for synthesizing the title screen content C102 (T107: No) or in cases where the relay server 200 fails to synthesize the title screen content C102 (T109: No), the relay server 200 synthesizes the error content C200 (T201). When the relay server 200 succeeds in synthesizing the error content C200 (T202: Yes), the relay server 200 transmits the error content C200 to the content playback apparatus 100 (T203). Alternatively, when the relay server 200 fails to synthesize the error content C200, the relay server 200 transmits the error code EC to the content playback apparatus 100 (T204).

The relay server 200 may synthesize the error content C200 by reading out the synthesis data from the storage section provided therein, or may synthesize the error content C200 by acquiring the synthesis data from the network album DB 300. In the latter case, the relay server 200 may be arranged so as to transmit the error code EC to the content playback apparatus even in cases where the relay server 200 fails to acquire the synthesis data for synthesizing the error content C200.

(Handling of an Error Having Occurred in a Process Other than a Communication Process)

The foregoing explains a process for handling a communication error having occurred in a communication process for acquiring the top screen content C101 serving as content data. However, an error having occurred in a process other than a communication process can be effectively handled by using the data structure of the top screen content C101.

For example, the content playback apparatus 100 can be arranged so as to display, when an error has occurred in a process of reproducing the top screen I101, a reproduction error screen that notifies the user that the reproduction error has occurred. Examples of an error that can occur in the process of reproducing the top screen I101 include (i) a misdescription of the top-screen display control information 1012, (ii) a processing error caused in performing a process specified by the top-screen display control information 1012, (iii) incompatibility of image data referred to by the top-screen display control information 1012, and (iv) a processing error caused in a process of expanding image data or in a process of drawing image data.

The following briefly explains a process that is performed when a reproduction error has occurred in a content reproduction process of displaying a display screen generated in accordance with main-content display control information.

FIG. 22 is a diagram showing an example of state transition definition information specifying a process for handling the occurrence of a reproduction error.

Referential mark 1901 refers to a command specifying that a display screen generated in accordance with display control information stored in test.svg is displayed. In accordance with the command, the display screen generation section 113 generates a display screen in accordance with the display control information stored in test.svg, and then causes the display control section 115 to display the display screen. When the display screen generation section 113 succeeds in generating the display screen, the display screen generation section 113 returns the error code 200 to the event processing section 111. Further, when an error has occurred in process of executing each command contained in test.svg, the display screen generation section 113 returns the error code to the event processing section 111. Specifically, when the image data referred to by the display control information is image data that cannot be expanded by the image data expansion section 114, the error code 400 indicating a format error is returned to the event processing section 111. Further, when a size error has been detected, the error code 300 is returned to the event processing section 111. The event processing section 111 stores the returned error code in the parameter file error.txt.

Referential mark 1902 refers to a command for causing the process to branch in accordance with the error code stored in the parameter file error.txt. Specifically, the command specifies that: a transition to processing a command whose id is success is made in cases where the error code 200 is stored; and a transition to processing a command whose id is sizerror is made in cases where the error code 300 is stored; and a transition to processing a command whose id is fomaterror is made in cases where the error code 400 is stored.

Referential mark 1903 refers to a group of commands specifying processes that are to be respectively performed with respect to the error codes. The first command whose id is success is a command that is executed in cases where the error code 200 is stored, and specifies that a display screen generated in accordance with display control information stored in success.svg is displayed. The second command whose id is sizerror is a command that is executed in cases where the error code 300 is stored, and specifies that a display screen generated in accordance with display control information stored in sizerror.svg is displayed. The third command whose id is fomaterror is a command that is executed in cases where the error code 400 is stored, and specifies that a display screen generated in accordance with display control information stored in fomaterror.svg is displayed.

By embedding such state transition definition information in the content data, various errors other than a communication error can be handled in the same manner as the communication error is handled.

(Screen to Which the Error Screen is Changed After the Error Screen is Displayed)

The foregoing explains an example in which, after the error screen generated in accordance with the error-screen display control information contained in the top screen content C101 serving as content data is displayed, the display screen is changed to the top screen I101. However, the screen to which the error screen is changed after the error screen is displayed is not limited to the top screen I101, but can be optionally specified in the content data. In the following, slide content reproduction performed by making use of the characteristics of the content data will be described with reference to FIGS. 23 and 24.

Figure 23A:
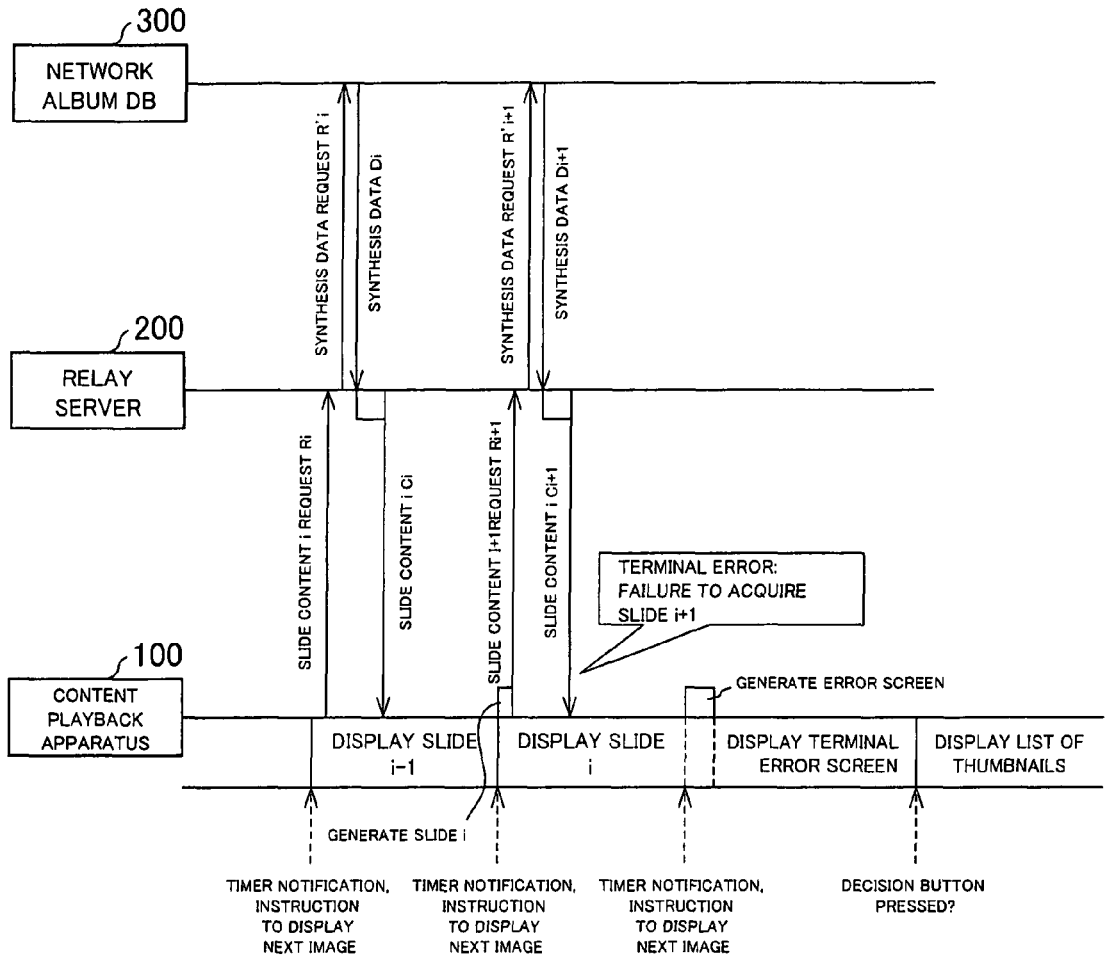
FIG. 23(a) shows an embodiment of the present invention, and is a sequence diagram showing a slide content reproduction process that is performed in the content playback system in cases where a terminal error has occurred.

FIG. 23(a) is a sequence diagram showing a flow of slide content reproduction that is performed in the content playback system 1 in cases where a terminal error has occurred.

The following description begins with a state in which the content playback apparatus 100 is reproducing i−1th slide content Ci−1. On this occasion, the content playback apparatus 100 is displaying a slide i−1 serving as main content of the slide content Ci−1. The slide content Ci−1 contains state transition definition information that contains a command specifying that a slide content request Ri for next slide content Ci is sent to the relay server 200. In accordance with this command, the content playback apparatus 100 sends the slide content request Ri to the relay server 200. The relay server 200 acquires synthesis data Di from the network album DB 300, synthesizes the slide content Ci, and sends the slide content Ci to the content playback apparatus 100.

After having acquired the slide content Ci, the content playback apparatus 100 reads out state transition definition information from the slide content Ci at a point of time where a predetermined slide display time has elapsed since the slide i−1 started to be displayed or at a point of time where a next image display instruction is received from the user, and then starts a process that is based on the state transition definition information of the slide content Ci.

The state transition definition information of the slide content Ci contains a command specifying that a slide i, serving as main content, which is generated in accordance with display control information contained in the slide content Ci is displayed. The content playback apparatus 100 reads out the display control information of the slide content Ci, and then displays the slide i generated in accordance with the display control information thus read out.

The state transition definition information of the slide content Ci further contains a command specifying that a slide content request Ri+1 for next slide content Ci+1 is sent to the relay server 200. In accordance with this command, the content playback apparatus 100 sends a slide content request Ri+1 to the relay server 200. The relay server 200 acquires synthesis data Di+1 from the network album DB 300, synthesizes the slide content Ci+1, and sends the slide content Ci+1 to the content playback apparatus 100.

FIG. 23(a) assumes that a terminal error occurs after the slide content Ci+1 is sent out from the relay server 200. In cases where the acquisition of the slide content Ci+1 is not completed even when a predetermined period of time has elapsed since the slide content request Ri+1 was sent, the content playback apparatus 100 judges that a terminal error has occurred. In cases where such a terminal error has occurred, the content playback apparatus 100 cannot display the next slide i+1 even when it is time to display the next slide content i+1.

Figure 23B:
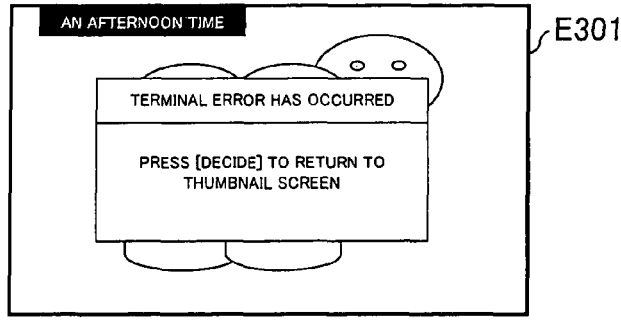
FIG. 23(b) is a screen structure diagram illustrating a structure of a terminal error screen.

In the state transition definition information of the slide content Ci, it is specified that a terminal error screen E301 (see FIG. 23(b)) serving as sub-content of the slide content Ci is generated and displayed in cases where a terminal error has been detected. In accordance with this, the content playback apparatus 100 reads out terminal-error-screen display control information from the slide content Ci. Then, the content playback apparatus 100 displays the terminal error screen E301 generated in accordance with the terminal-error-screen display control information thus read out. Note that the terminal error screen E301 may be generated and displayed at a point of time where the terminal error has occurred or at a point of time where the slide i+1 should start to be displayed after the slide i being displayed. FIG. 23(a) shows the latter case; however, the present invention is not limited to this.

In the state transition definition information of the slide content Ci, it is specified that a thumbnail list display screen I301 is displayed in cases where the user presses the decision button while the terminal error screen E300 is being displayed.

Figure 23C:
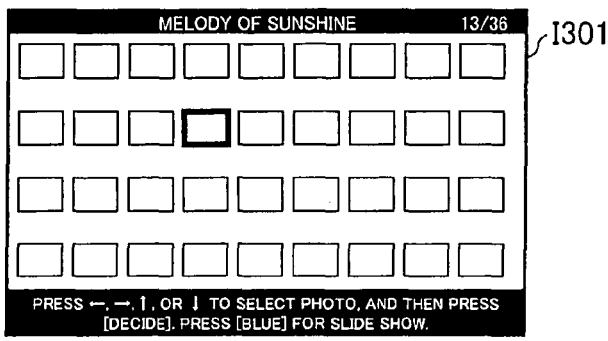
FIG. 23(c) is a screen structure diagram illustrating a structure of a thumbnail list display screen that is displayed in the content playback apparatus.

FIG. 23(c) is a screen structure diagram illustrating a structure of the thumbnail list display screen I301 that is displayed in the content playback apparatus 100 on this occasion. As evidenced by FIG. 23(c), the thumbnail list display screen I301 lists and displays a group of thumbnails, disposed in a matrix manner, each of which is obtained by reducing an image contained in the currently browsed album. This makes it possible for the user to, for example, select a desired image from the thumbnail list display screen I301.

The reason why the screen to which the terminal error screen E301 is changed is especially set to be the thumbnail list display screen I301 is as follows: The relay server 200 per se normally functions even in cases where a terminal error has occurred, so that there is a high possibility that the slide content Ci is acquired if it is re-requested.

Figure 24A:
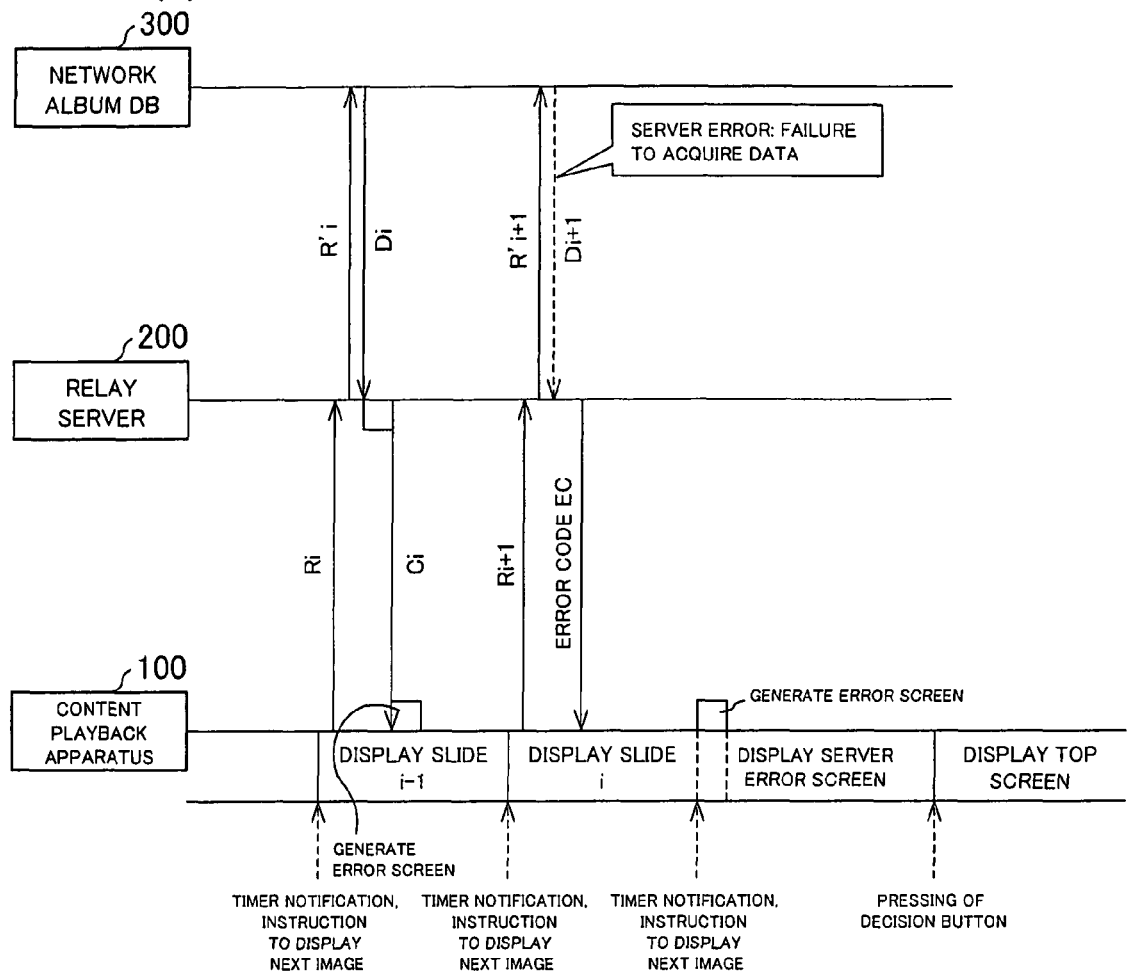
FIG. 24(a) shows an embodiment of the present invention, and is a sequence diagram showing a slide content reproduction process that is performed in the content playback system in cases where a server error has occurred.

FIG. 24(a) is a sequence diagram showing a flow of slide content reproduction that is performed in the content playback system 1 in cases where a server error has occurred.

In FIG. 24, attention should be paid to the fact that such a server error occurs that the relay server 200 fails to acquire the synthesis data Di+1 from the network album DB 300 and therefore cannot synthesize the slide content Ci+1. In cases where such a server error occurs, the relay server 200 sends the error code EC back to the content playback apparatus 100 in response to the content request Ri+1. Upon acquiring the error code EC, the content playback apparatus 100 judges that a server error has occurred.

Figure 24B:
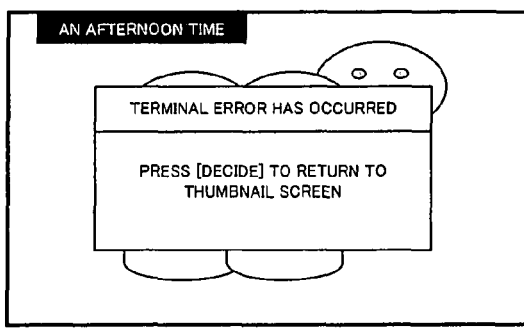
FIG. 24(b) is a screen structure diagram illustrating a structure of a server error screen.

In the state transition definition information of the slide content Ci, it is specified that a server error screen E302 (see FIG. 24(b)) serving as sub-content of the slide content Ci is generated and displayed in cases where it is judged that a server error has occurred. In accordance with this, the content playback apparatus 100 reads out server-error-screen display control information from the slide content Ci. Then, the content playback apparatus 100 displays the server error screen E302 generated in accordance with the server-error-screen display control information thus read out. Note that the server error screen E302 may be generated and displayed at a point of time where the error code has been detected or at a point of time where the slide i+1 should start to be displayed after the slide i being displayed. FIG. 24(a) shows the latter case; however, the present invention is not limited to this.

The state transition definition information of the slide content Ci contains a command specifying that the top screen I101 is displayed in cases where the user presses the decision button while the server error screen E302 is being displayed.

The reason why the screen to which the server error screen E302 is changed is especially set to be the top screen I101 is as follows: In cases where a server error occurs, there is only a low possibility that the slide content Ci is acquired even if it is re-requested, so that it is preferable that the user be allowed to reselect the album that is to be browsed.

FIG. 25 is a diagram illustrating state transition definition information for realizing such slide content reproduction as described above. FIG. 25 shows state transition definition information contained in the first slide content.

Referential mark 2201 refers to a command specifying that a slide content request for second slide content as next slide content is sent to the relay server 200. The command referred to by referential mark 2201 is a command for causing the process to branch in accordance with the type of communication error that has occurred, and is arranged in the same manner as the command 1101c shown in FIG. 7. Referential mark 2203 refers to a command specifying that a server error screen serving as sub-content of the first slide content is generated and displayed in cases where a server error has been detected. At the same time, the top screen is specified as a display screen to which the server error screen is changed. Referential mark 2204 refers to a command specifying that a terminal error serving as sub-content of the first slide content is generated and displayed in cases where a terminal error has been detected. At the same time, the thumbnail list display screen is specified as a display screen to which the server error screen is changed.

Figure 26:
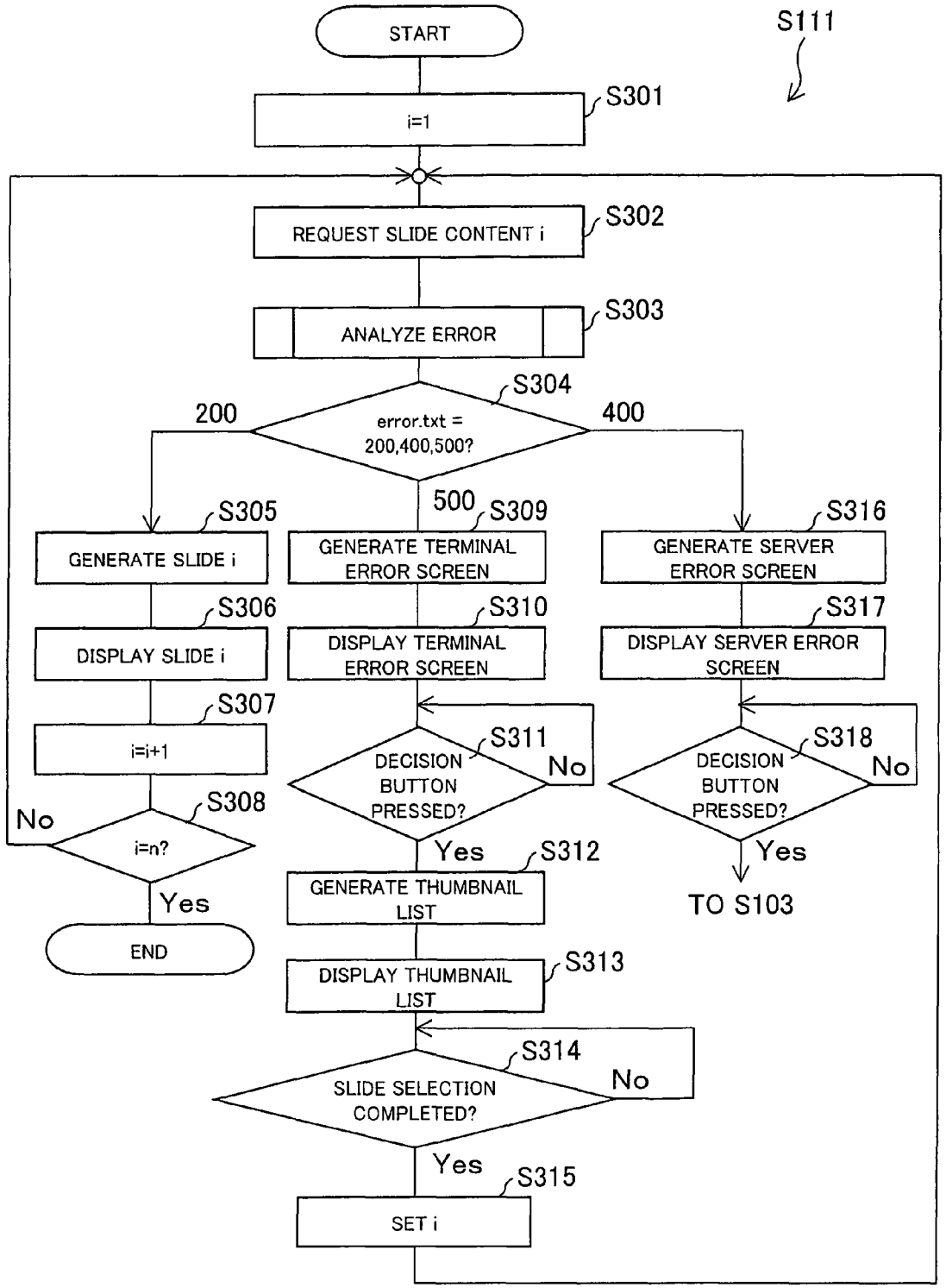
FIG. 26 shows an embodiment of the present invention, and is a flow chart showing a slide content reproduction process that is performed in the content playback apparatus.

FIG. 26 is a flow chart showing a flow of such a slide content reproduction process as described above. Note that REPRODUCE SLIDE CONTENT S111 shown in FIG. 16 can be realized as a process shown in this flow chart.

At the start of slide content reproduction, the variable i is initialized to be 1. The variable i is a variable that indicates the ordinal number of the currently processed slide content, and the process is repeated until the variable i reaches the ordinal number n of slide content that is to be reproduced.

The ith slide content is processed in the following manner. First, the data management section 112 sends the content request Ri for the slide content Ci to the relay server 200 (S302). Then, ANALYZE ERROR S303 of detecting an error that occurs in the communication process for acquiring the slide content Ci is performed.

Figure 27:
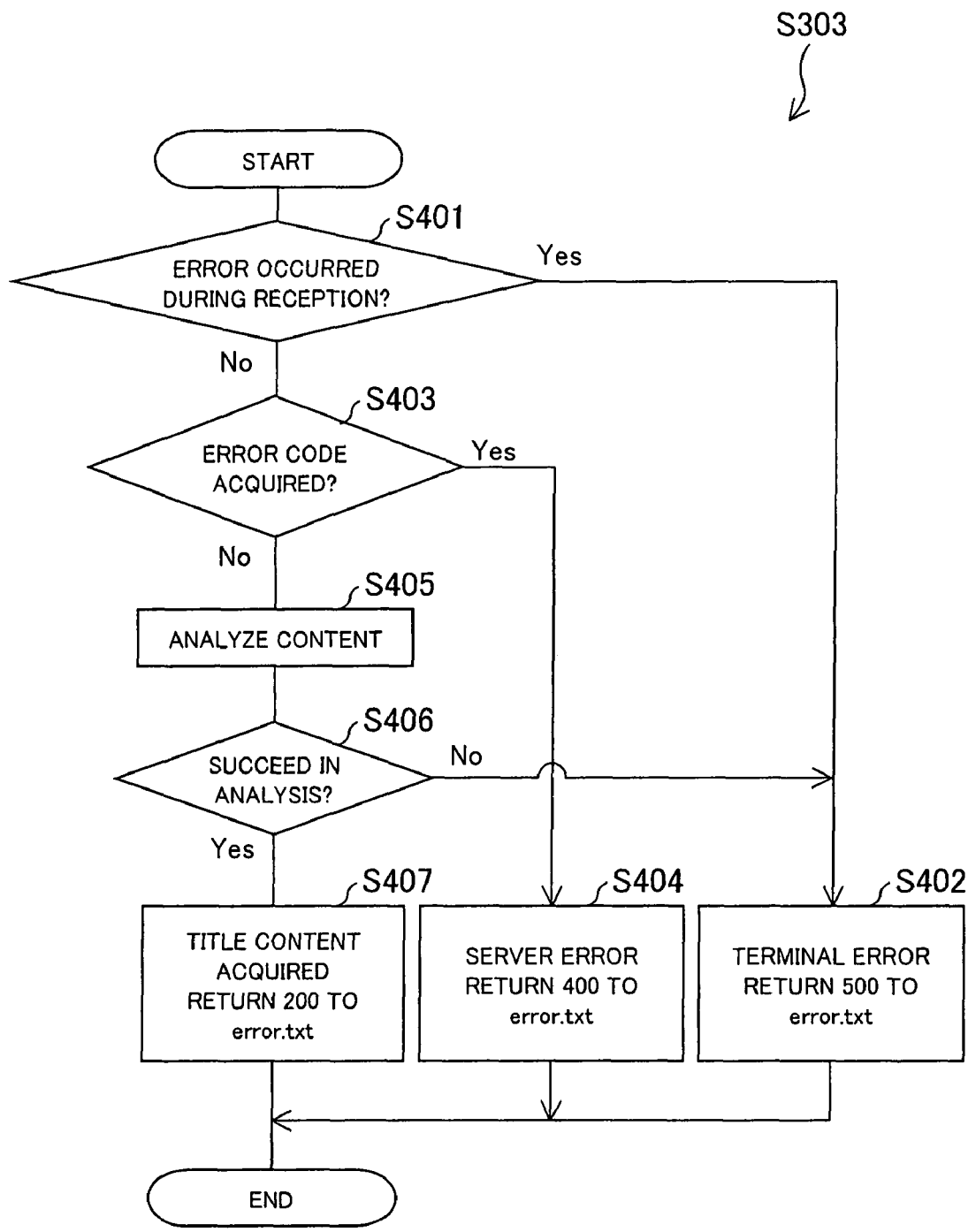
FIG. 27 shows an embodiment of the present invention, and is a flow chart showing an error analysis process contained in the slide content reproduction process that is performed in the content playback apparatus.

As shown in FIG. 27, ANALYZE ERROR S303 is realized in exactly the same manner as ANALYZE ERROR S107 shown in FIG. 17.

In cases where it is judged in ANALYZE ERROR S303 that the slide content Ci has been normally acquired, the error code 200 is stored in the parameter file error.txt. Further, in cases where it is judged that the slide content Ci cannot be normally acquired due to a server error, the error code 400 is stored in the parameter file error.txt. Further, in cases where it is judged that the slide content Ci cannot be normally acquired due to a terminal error, the error code 500 is stored in the parameter file error.txt. The event processing section 111 determines the subsequent process with reference to the parameter file error.txt in which the error code is stored (S304).

In cases where the error code 200 is stored in the parameter file error.txt, i.e., in cases where the slide content Ci has been normally acquired, the event processing section 111 reads out the state transition definition information of the slide content Ci from the storage section 130. In accordance with the state transition definition information of the slide content Ci, the event processing section 111 requests the display screen generation section 113 to generate a slide i. The display screen generation section 113 reads out the display control information of the slide content Ci from the storage section 130, and then generates a slide i in accordance with the display control information thus read out (S305). The slide i thus generated is sent to the display control section 115. Upon receiving the slide i, the display control section 115 causes the display section 140 to display the slide i (S306). In cases where the display section 140 is thus caused to normally display the slide i, the variable i is increased by 1 (S307). When the slide content Ci is the last slide content (S308: Yes), the process is ended. Otherwise (S308: No), the next slide content Ci+1 starts to be processed.

In cases where the error code 500 is stored in the parameter file error.txt, i.e., in cases where the slide content Ci cannot be normally acquired due to a terminal error, the event processing section 111 requests, in accordance with the state transition definition information of the slide content Ci−1 (the title screen content C102 when i=1), the display screen generation section 113 to generate the terminal error screen E301. The display screen generation section 113 reads out the terminal-error-screen display control information of the slide content Ci−1 from the storage section 130, and then generates the terminal error screen E301 in accordance with the terminal-error-screen display control information thus read out (S309). The terminal error screen E301 thus generated is sent to the display control section 115. Upon receiving the terminal error screen, the display control section 115 causes the display section 140 to display the terminal error screen (S310).

While the terminal error screen E301 is being displayed, the user operation analysis section 117 waits for the user to press the decision button (S311). When the decision button is pressed by the user (S311: Yes), the user operation analysis section 117 notifies the event processing section 111 of the occurrence of the operation. Upon receiving the operation information notification, the event processing section 111 reads out state transition definition information of thumbnail list display screen content, in accordance with which state transition definition information the thumbnail list display screen I301 is generated. Then, in accordance with the state transition definition information, the event processing section 111 instructs the display control section 115 to display the thumbnail list display screen I301. The display control section 115 reads out display control information from the thumbnail list display screen content, and then generates the thumbnail list display screen I301 in accordance with the display control information thus read out (S312). The display control section 115 causes the display section 140 to display the thumbnail list display screen I301 (S313).

While the thumbnail list display screen I301 is being displayed, the user operation analysis section 117 waits for the user to select a desired slide (S314). When the user selects a desired slide, the variable i is set to be the number of the selected slide (S315). Then, the process returns to Step S302.

In cases where the error code 400 is stored in the parameter file error.txt, i.e., in cases where the slide content Ci cannot be normally acquired due to a server error, the event processing section 111 requests, in accordance with the state transition definition information of the slide content Ci−1 (the title screen content C102 when i=1), the display screen generation section 113 to generate the server error screen E302. The display screen generation section 113 reads out the server-error-screen display control information of the slide content Ci−1 from the storage section 130, and then generates the server error screen E302 in accordance with the server-error-screen display control information thus read out (S316). The server error screen E302 thus generated is sent to the display control section 115. Upon receiving the server error screen E30, the display control section 115 causes the display section 140 to display the server error screen E302 (S317).

While the server error screen E302 is being displayed, the user operation analysis section 117 waits for the user to press the decision button (S318). When the decision button is pressed by the user (S311: Yes), the process shifts to Step S103 shown in FIG. 16, so that the top screen I101 is displayed.

(Use of Display Control Information Stored in Other Content Data)

The content playback apparatus 100 described above includes: the event processing section 111 (error detecting means) for detecting an error having occurred during a process specified by process specifying information (state transition definition information) contained in reproduction target content data; and the display screen generation section 113 (sub-content reproducing means) for reproducing error-screen display control information (sub-content) contained in the reproduction target content data. However, upon error detection, the content playback apparatus 100 may reproduce not only (i) the error-screen display control information contained in the reproduction target content data but also (ii) error-screen display control information contained in other content data already stored in the content playback apparatus 100.

This will be described below in a little more detail with reference to FIGS. 28(a) through 28(d).

FIGS. 28(a) through 28(d) are explanatory diagrams for explaining variations of content data to which the reproduction target content data can be changed upon error detection.

FIGS. 28(a) through 28(d) respectively show four examples, in each of which the content playback apparatus 100 sequentially acquires first content data TP1, second content data TP2, and third content data TP3 from the relay server 200 and sequentially reproduces the content data TP1 to TP3 thus acquired. Parameter content PP1 is content data containing a parameter to which the content playback apparatus refers while reproducing the content data TP1 to TP3.

Figure 28A:
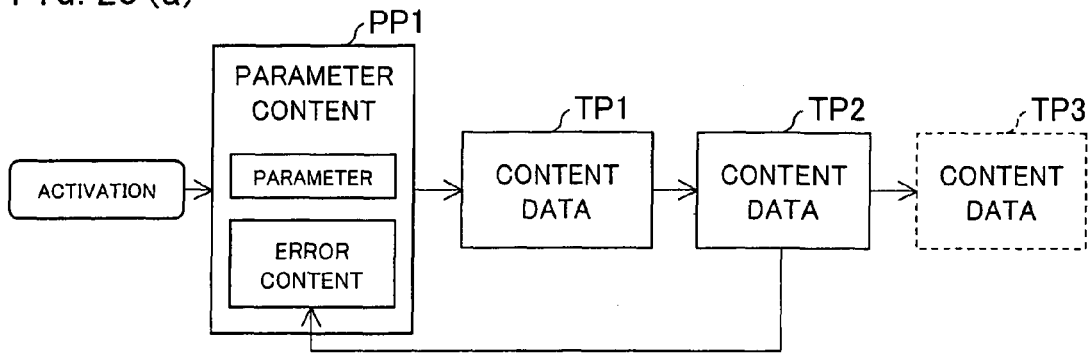
FIGS. 28(a) through 28(d) show an embodiment of the present invention, and are explanatory diagrams explaining variations of content data to which reproduction target content data can be changed upon error detection.

In the example shown in FIG. 28(a), the parameter content PP1 contains error content in advance. The content data TP2 contains state transition definition information specifying the error content of the parameter content PP1 as content to switch to upon error detection. For this reason, when the content playback apparatus 100 detects an error while performing a process specified by the state transition definition information, the content playback apparatus 100 reproduces the error content contained in the parameter content PP1.

Figure 28B:
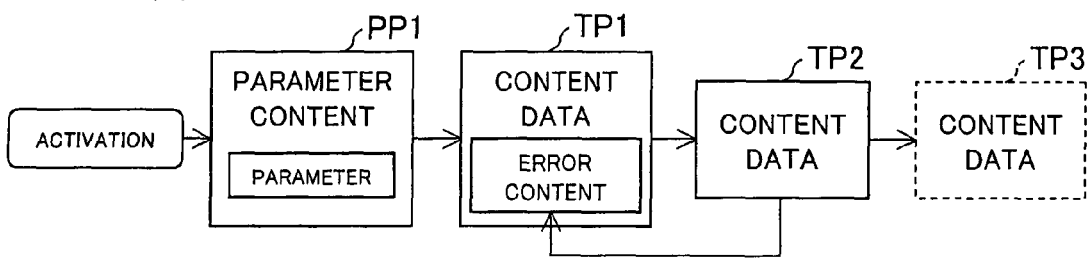

In the example shown in FIG. 28(b), the content data TP1 stored in the storage section 130 as reproduced content data contains error content. The state transition definition information of the content data TP2 specifies the error content of the content data TP1 as content to switch to upon error detection. When the content playback apparatus 100 detects an error while performing a process specified by the state transition definition information, the content playback apparatus 100 reproduces, in accordance with the state transition definition information, the error content contained in the content data TP1.

Figure 28C:
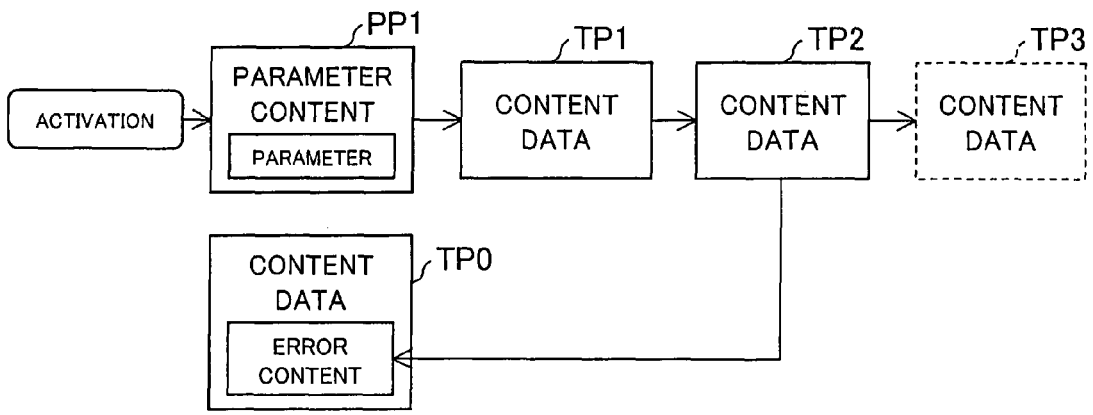

In the example shown in FIG. 28(c), content data TP0 stored in the storage section 130 contains error content. The content data TP0 is acquired together with the parameter content PP1 immediately after activation, and continues to be retained in the storage section 130 until the reproduction of a series of content data is finished. The state transition definition information of the content data TP2 specifies the error content of the content data TP0 as content to switch to upon error detection. When the content playback apparatus 100 detects an error while performing a process specified by the state transition definition information, the content playback apparatus 100 reproduces, in accordance with the state transition definition information, the error content contained in the content data TP0.

Figure 28D:
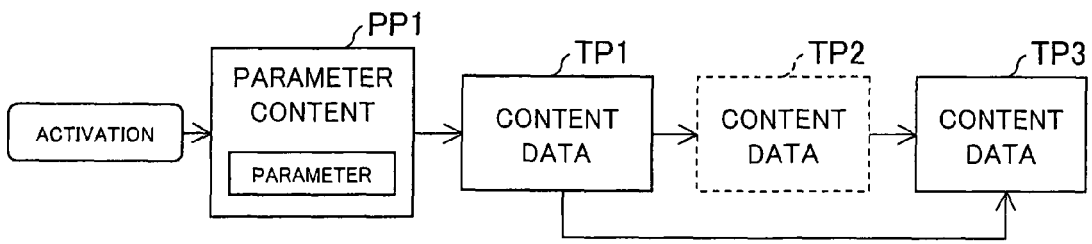

In the example shown in FIG. 28(d), the content data TP3 contains error content. The content data TP3 has not been acquired yet at a point of time where the content data TP1 (the reproduction target content data in this example) is being reproduced. When the content playback apparatus 100 detects an error while performing a process specified by state transition definition information, the content playback apparatus 100 acquires the content data TP3 in accordance with the state transition definition information, and then reproduces the error content contained in the content data TP3 thus acquired.

As described above, the error content that is reproduced by the content playback apparatus 100 upon error detection is not necessarily limited to the error content contained in the reproduction target content data, but may be contained in any content data that is specified by state transition definition information of the reproduction target content data.

This will be described below more in detail with reference to two specific example structures of state transition definition information.

FIG. 29 is a diagram showing an example of content transition that can be realized by the present invention.

In the state transition definition information of the content data TP2, it is specified that the content data TP3 is acquired. Accordingly, while reproducing content TP2c of the content data TP2, the content playback apparatus 100 attempts to acquire the content data TP3. Then, in cases where the content data TP3 is successfully acquired, content TP3c of the content data TP3 is reproduced. On the other hand, in cases where a server error has been detected, error content TP1e (server-error-screen display control information) of the content data TP1 is reproduced; and in cases where a terminal error has been detected, error content PP1e (terminal-error-screen display control information) of the parameter content PP1 is reproduced.

FIG. 30 shows an example of state transition definition information that realizes the example of content transition shown in FIG. 29. The state transition definition information shown in FIG. 30 is described according to MTD as with that shown in FIG. 7.

The state transition definition information of FIG. 30 differs from that of FIG. 7 only in terms of the execution target steps respectively defined by the error codes in the transition destination determining step. In the line indicated by referential mark 3001, it is specified that a transition to executing "tp3.mtd" is made in cases where the error code 200 is stored (i.e., in cases where the content data TP3 has been normally acquired). "tp3.mtd" indicates state transition definition information of the content data TP3. With this, in cases where the content data TP3 can be normally acquired, the content TP3c of the content data TP3 is reproduced.

Further, in the line indicated by referential mark 3002, it is specified that a transition to executing "tp1.mtd#servererror", i.e., a servererror step of state transition definition information of the content data TP1 is made in cases where the error code 400 is stored (i.e., in cases where a server error has been detected). With this, in cases where a server error has been detected while the content data TP3 is being acquired, the error content PP1e of the content data TP1 is reproduced.

Further, in the line indicated by referential mark 3003, it is specified that a transition to executing "parameter.mtd#localerror", i.e., a localerror step of state transition definition information of the parameter content PP1 is made in cases where the error code 500 is stored (i.e., in cases where a terminal error has occurred). With this, in cases where a terminal error has been detected while the content data TP3 is being acquired, the error content PP1e of the parameter content PP1 is reproduced.

Figure 31:
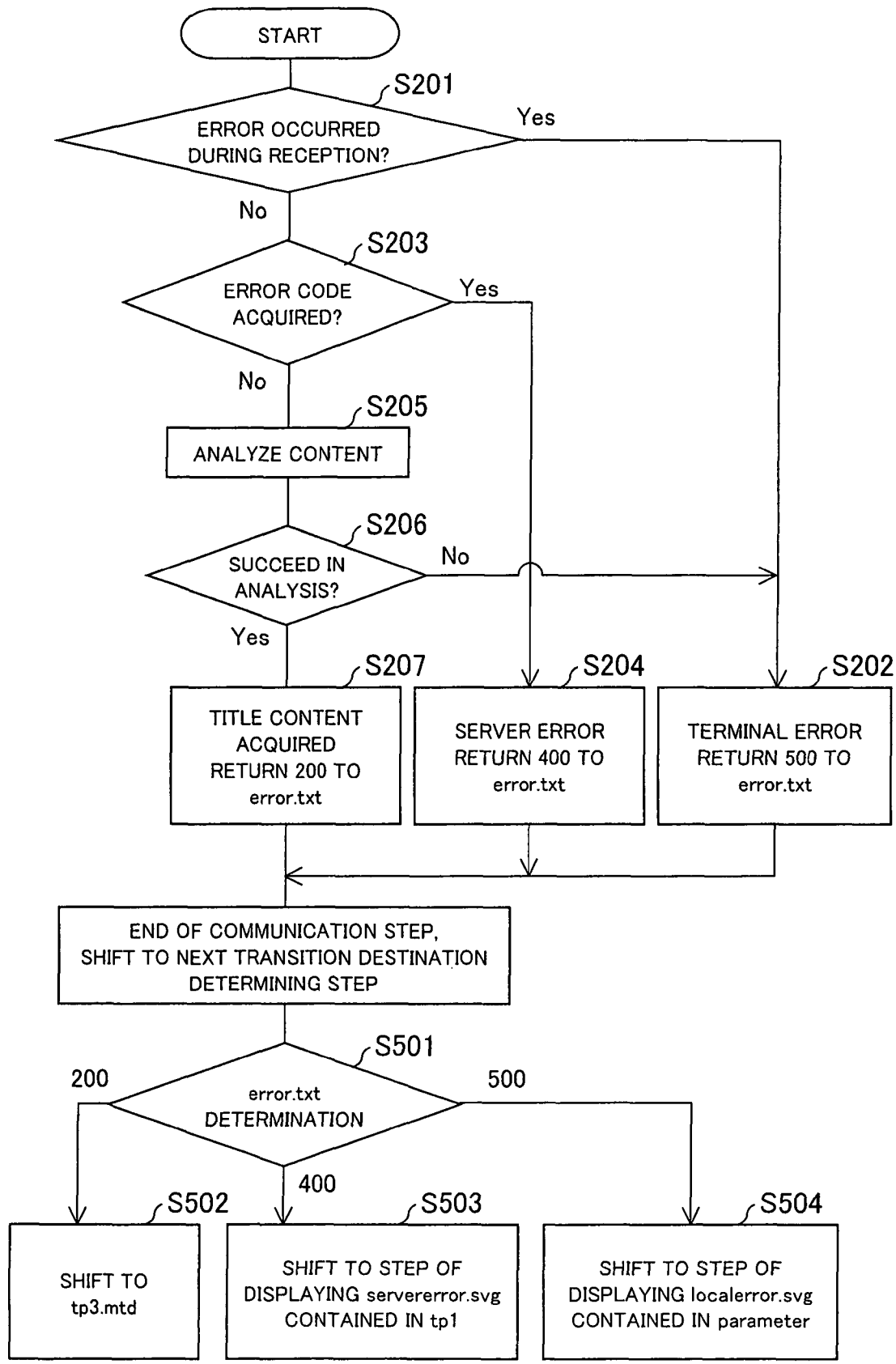
FIG. 31 shows an embodiment of the present invention, and is a flow chart showing a flow of a process that is performed in accordance with the state transition definition information shown in FIG. 30.

FIG. 31 is a flow chart showing a flow of a process that is performed between the start of a communication step and the end of the aforementioned transition destination determining step, which process is part of a process that is performed in accordance with the state transition definition information shown in FIG. 30. The steps in the communication step are identical to Steps S201 to S207 shown in FIG. 17, and therefore are given the same referential marks and will not be described below. Further, in the transition destination determining step, Step S501 of determining a transition destination and Processes S502 to S504 of shifting to an execution target step in accordance with a result of the determination made in S501 are the same as described above.

FIG. 32 is a diagram showing another example of content transition that can be realized by the present invention.

In state transition definition information of content data TP4, it is specified that content data TP5 is acquired. Accordingly, while reproducing content TP4c of the content data TP4, the content playback apparatus 100 attempts to acquire the content data TP5. Then, in cases where the content data TP5 is successfully acquired, content TP5c of the content data TP5 is reproduced. On the other hand, in cases where a server error has been detected using an error code sent from the relay server 200, error content TP4se (server-error-screen display control information (servererror4.svg)) of the content data TP4 per se is reproduced; in cases where a terminal error has been detected, error content TP41e (terminal-error-screen display control information (localerror4.svg)) of the content data TP4 per se is reproduced.

Meanwhile, in the example shown in FIG. 32, the content playback apparatus 100 can also detect a server error by receiving error content instead of receiving an error code from the relay server 200. When error content is received, the received error content per se can be reproduced as shown in FIG. 5. However, in the example shown in FIG. 32, error content is used solely for detecting an error, and error content to be reproduced is the error content PP1e (server-error-screen display control information).

FIG. 33 shows an example of state transition definition information that realizes the example of content transition shown in FIG. 32. The state transition definition information shown in FIG. 33 is described according to MTD as with the state transition definition information thus far illustrated.

The state transition definition information of FIG. 33 differs from that of FIG. 30 only in terms of the execution target steps respectively defined by the error codes in the transition destination determining step.

In the line indicated by referential mark 4001, it is specified that a transition to executing "tp5.mtd" is made in cases where the error code 200 is stored (i.e., in cases where the content data TP5 has been normally acquired). "tp5.mtd" indicates state transition definition information of the content data TP5. With this, in cases where the content data TP5 has been normally acquired, the content TP5c of the content data TP5 is reproduced.

Further, in the line indicated by referential mark 4002, it is specified that a transition to executing "parameter.mtd#servererror", i.e., a servererror step of the state transition definition information of the parameter content PP1 is made in cases where the error code 300 is stored (in cases where a server error has been detected using error content sent from the relay server 200). With this, in cases where a server error has been detected with error content while the content data TP5 is being acquired, the error content PP1e of the parameter content PP1 is reproduced.

Further, in the line indicated by referential mark 4004, it is specified that a transition to executing "#servererror", i.e., a servererror step of the state transition definition information per se is made in cases where the error code 400 is stored (i.e., in cases where a server error has been detected using an error code sent from the relay server 200). As evidenced by FIG. 33, it is specified in the servererror step that the error content TP4se is reproduced. With this, in cases where a server error has been detected using an error code, the error content TP4se of the content data TP4 per se is reproduced.

Further, in the line indicated by referential mark 4004, it is specified that a transition to executing "#localerror", i.e., a localerror step of the state transition definition information per se is made in cases where the error code 500 is stored (i.e., in cases where a terminal error has occurred). As evidenced by FIG. 33, it is specified in the localerror step that the error content TP41e is reproduced. With this, in cases where a terminal error has been detected, the error content TP41e of the content data TP4 per se is reproduced.

FIG. 34 is a flow chart showing a flow of a process that is performed between the start of a communication step and the end of the aforementioned transition destination determining step, which process is part of a process that is performed in accordance with the state transition definition information shown in FIG. 33. The steps in the communication step are identical to Steps S201 to S210 shown in FIG. 19, and therefore are given the same referential marks and will not be described below. Further, in the transition destination determining step, Step S505 of determining a transition destination and Processes S506 to S509 of shifting to an execution target step in accordance with a result of the determination made in S505 are the same as described above.

As described above, it depends on the state transition definition information of the reproduction target content data what error content is reproduced upon error detection, and the error content may be contained in content data other than the reproduction target content data. Moreover, the content data containing the error content that is reproduced may be content data unacquired at that point of time (see the example shown in FIG. 28(d)).

Obviously, a quicker transition to error content can be made upon error detection by reading out error content from content data already stored in the storage section 130 at a point of time where the reproduction target content starts to be reproduced. However, in case where error content is read out from content data already stored in the storage section 130, there arises a possibility that the targeted content data has been already erased when an error occurs. The reason for this is as follows: When the content playback apparatus 100 is realized as a television, the storage section 130 lacks in capacity, so that unnecessary content data needs to be deleted.

In view of this, finally, management of the content data stored in the storage section 130 will be briefly explained.

FIG. 35 is a diagram showing a content management table for use in management of the content data stored in the storage section 130 of the content playback apparatus 100. As shown in FIG. 35, the content management table is used for defining a save mode in which each content data is saved. Examples of the save mode includes at least a static save mode and a normal save mode.

The data management section 112 of the content playback apparatus 100 manages, in accordance with the content management table, the content data stored in the storage section 130. Specifically, when the remaining storage capacity of the storage section 130 becomes less than a predetermined value, content data saved in the normal save mode is deleted so that the storage capacity is kept at the predetermined value. In case where the deletion of content data is executed, a content name and a save mode each corresponding to the content data are also deleted from the content management table. With this, existing content data and a save mode in which the content data is saved can be confirmed simply by referring to the content management table.

As evidenced by the contents of the content management table shown in FIG. 35, the parameter content PP1 is saved in the static save mode, and therefore will not be deleted from the storage section 130. Therefore, error content can be surely displayed by storing the error content in the parameter content PP1 and by referring to the error content of the parameter content PP1 via each content.

Meanwhile, the content data TP1 (content name tp1), the content data TP2 (content name tp2), and the content data TP3 (content name tp3) are deleted at a point of time where the storage section 130 runs out of available storage capacity. In view of this, in referring to content data stored in such a normal save mode, it is only necessary to perform (i) a existence confirming step of confirming whether the content data exists in the storage section 130 and (ii) a transition destination determining step of, in cases where it is not confirmed that the content data exists in the storage section 130, switching the reference destination to the parameter content PP1. The existence confirming step is realized by the data management section 112.

FIG. 36(a) shows part of the state transition definition information contained in the content data TP2, i.e., an example of state transition definition information in which the existence confirming step of confirming the presence or absence of content data is incorporated into the transition destination determining step of determining a transition destination that is to be reached upon error detection.

In the line indicated by referential mark 5001, it is specified that the presence or absence of the content data TP1 defined by the lines indicated by referential mark 5002 is confirmed in cases where a server error has been detected (i.e., in cases where the error code 400 is stored).

In the lines indicated by referential mark 5002, it is specified that the presence or absence of the content data TP1 is confirmed. Specifically, the data management section 112 determines, in accordance with the aforementioned content management table, whether or not the content data TP1 is still stored in the storage section 130.

In the lines indicated by referential mark 5003, it is specified that a transition to processing a server error handling step (servererror) of the content data TP1 is made unless the content data TP1 has been deleted, and that a transition to processing an error content deletion handling step (deleteerror) of the parameter content PP1 is made if the content data TP1 has been deleted.

FIG. 36(b) shows that part of the state transition definition information of the content data TP1 which corresponds to the server error handling step. In this part, it is specified that error content contained in the content data TP1 per se is reproduced.

Figure 37:
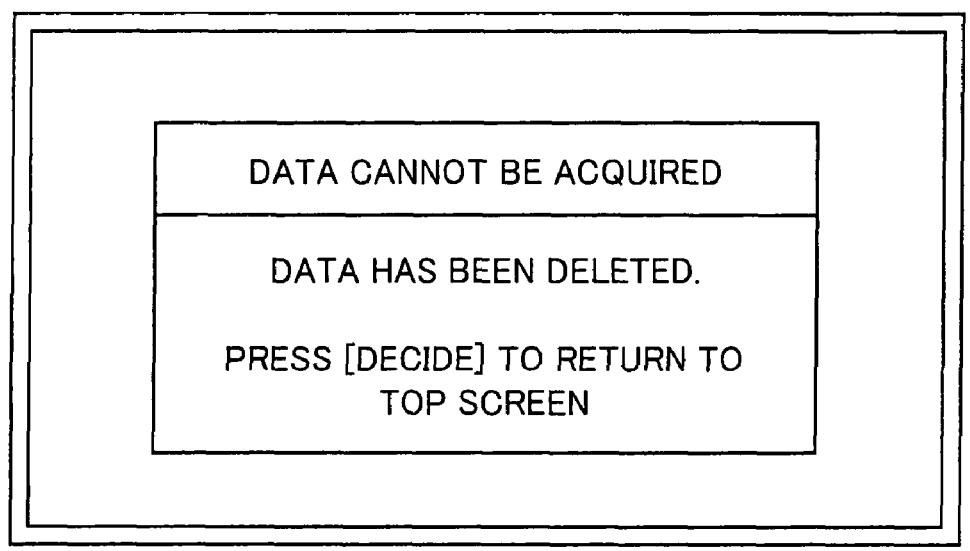
FIG. 37 shows an example structure of a display screen that is displayed in cases where content data containing error content is unavailable due to deletion.

Meanwhile, FIG. 36(c) shows that part of the state transition definition information of the parameter content PP1 which corresponds to the deletion handling step. In this part, it is specified that such an error screen whose example screen structure is shown in FIG. 37 is displayed. The error screen to be displayed here is a display screen that notifies the user that the process cannot be continued because necessary content data has been deleted.

(Additional Descriptions)

The present invention is not limited to the description of the embodiments above, but may be altered by a skilled person within the scope of the claims. An embodiment based on a proper combination of technical means disclosed in different embodiments is encompassed in the technical scope of the present invention.

Finally, each of the blocks included in the control section 110 of the content playback apparatus 100 may be constituted by hardware logic, or by software with the use of a CPU as follows.

That is, the content playback apparatus 100 has: (i) the CPU (central processing unit) for executing an instruction of a control program realizing various functions; (ii) a ROM (read only memory) storing the program; (iii) a RAM (random access memory) for expanding the program; (iv) a storage device (storage medium) such as a memory storing the program and various data; and (v) the like. The object of the present invention also can be achieved by (i) providing, for the content playback apparatus 100, a storage medium storing, in a computer readable manner, a program code (executable program; intermediate code; source program) of the control program for the content playback apparatus 100, and (ii) causing a computer (CPU or MPU) to read and execute the program code stored in the storage medium, the program code being the software realizing the aforementioned functions.

Examples of the storage medium are: (i) tapes such as a magnetic tape and a cassette tape; (ii) magnetic disks such as a Floppy® disk and a hard disk; (iii) optical disks such as a CD-ROM, an MO, an MD, a DVD, and a CD-R; (iv) cards such as an IC card (inclusive of a memory card) and an optical card; and (v) semiconductor memories such as a mask ROM, an EPROM, an EEPROM, and a flash ROM.

The content playback apparatus 100 may be connectable to the communication network, and the program code may be supplied via the communication network. The communication network is not particularly limited. Specific examples thereof are: the Internet, Intranet, Extranet, LAN, ISDN, VAN, CATV communication network, virtual private network, telephone network, mobile communication network, satellite communication network, and the like. Further, the transmission medium constituting the communication network is not particularly limited. Specific examples thereof are: (i) a wired channel using an IEEE 1394, a USB, a power-line communication, a cable TV line, a telephone line, an ADSL line, or the like; or (ii) a wireless communication using IrDA, infrared rays used for a remote controller, Bluetooth®, IEEE 802.11, HDR, a mobile phone network, a satellite connection, a terrestrial digital network, or the like. Note that, the present invention can be realized by a form of a computer data signal embedded in a carrier wave realized by electronic transmission of the program code.

Further, each of the blocks included in the control section 230 of the relay server 200 may be constituted by hardware logic, or by software with the use of a CPU as with the above descriptions of the content playback apparatus 100.

As described above, a content playback apparatus according to the present invention includes: main-content reproducing means for reproducing main content contained in reproduction target content data; error detecting means for detecting an error having occurred during a process specified by process specifying information, contained in the reproduction target content data, which specifies the process that is to be performed in the content playback apparatus; and sub-content reproducing means for, when the error detecting means has detected an error, reproducing sub-content contained in the reproduction target content data.

Further, as described above, a content playback method according to the present invention includes: a main-content reproducing step of reproducing main content contained in reproduction target content data; an error detecting step of detecting an error having occurred during a process specified by process specifying information, contained in the reproduction target content data, which specifies the process that is to be performed in the content playback apparatus; and a sub-content reproducing step of, when an error has been detected in the error detecting step, reproducing sub-content contained in the reproduction target content data.

Therefore, a provider who provides the reproduction target content data to the content playback apparatus can flexibly change, by changing the sub-content contained in the reproduction target content data, the content (e.g., an error screen) that is reproduced by the content playback apparatus upon error detection. Further, the content playback apparatus can immediately reproduce, without needing to spend time newly acquiring external data upon error detection, the sub-content (e.g., an error screen) contained in the reproduction target content data.

A content data providing apparatus according to the present invention is a content data providing apparatus for providing content data to a content playback apparatus, and includes: first content data providing means for providing a content playback apparatus with first content data containing main content that is to be reproduced by the content playback apparatus; and second content data providing means for providing the content playback apparatus with second content data containing next content that is to be reproduced by the content playback apparatus after the main content, the first content data containing sub-content that is to be reproduced by the content playback apparatus when the content playback apparatus is unable to reproduce the next content contained in the second content data.

Further, a content data providing method according to the present invention is a method for providing content data to a content playback apparatus, and includes: a first content data providing step of providing the content playback apparatus with first content data containing main content that is to be reproduced by the content playback apparatus; and a second content data providing step of providing the content playback apparatus with second content data containing next content that is to be reproduced by the content playback apparatus after the main content, the first content data containing sub-content that is to be reproduced by the content playback apparatus when the content playback apparatus is unable to reproduce the next content contained in the second content data.

Therefore, by providing the content playback apparatus with the first content data containing desired content, it is possible to allow the content playback apparatus to reproduce the desired content when the next content cannot be reproduced. For example, by providing the content playback apparatus with first content data containing content for displaying a desired error screen, it is possible to allow the content playback apparatus to reproduce the desired error screen when the next content cannot be reproduced.

The content playback apparatus according to the present invention is preferably arranged such that the process specifying information contains acquisition process specifying information specifying a process of acquiring, from an external apparatus, acquisition target content data containing next content that is to be reproduced after the main content, the content playback apparatus further including content data acquiring means for acquiring the acquisition target content data from the external apparatus in accordance with the acquisition process specifying information, wherein the error detecting means detects an error having occurred while the content data acquiring means is performing the process of acquiring the acquisition target content data.

According to the foregoing arrangement, the process of acquiring the acquisition target content data containing the next data that is to be reproduced after the main content is performed in accordance with the acquisition process specifying information contained in the reproduction target content data. Moreover, when an error has occurred during the acquisition process, the error is detected by the error detecting means. That is, the content playback apparatus can detect a communication error having occurred during the process of acquiring the acquisition target content data.

Therefore, by causing the reproduction target content data to contain sub-content for displaying a communication error screen that notifies the user that a communication error has occurred, such a further effect is brought about that the communication error screen can be shown to the user when a communication error has occurred.

The content playback apparatus according to the present invention is preferably arranged such that the error detecting means detects an error having occurred in the content playback apparatus while the content data acquiring means is performing the process of acquiring the acquisition target content data.

According to the foregoing arrangement, the content playback apparatus detects an error having occurred in therein, i.e., a terminal error, and reproduces the sub-content contained in the reproduction target content data. Therefore, by causing the reproduction target content data to contain in advance sub-content for displaying a terminal error screen that notifies the user that a terminal error has occurred, such a further effect is brought about that the terminal error can be shown to the user when a terminal error has occurred.

Note that examples of the error having occurred in the content playback apparatus include a failure having occurred in a communication path via which the external apparatus and the content playback apparatus are connected (excluding a failure having occurred in the external apparatus) and a failure having occurred inside the content playback apparatus. Examples of the failure having occurred in the communication path include such a time-out error that the acquisition of the acquisition target content data cannot be completed within a predetermined period of time.

The content playback apparatus according to the present invention is preferably arranged such that the error detecting means detects, in accordance with error information which is provided from the external apparatus and which indicates that the acquisition target content data is not transmittable, an error having occurred in the external apparatus.

According to the foregoing arrangement, the content playback apparatus detects, in accordance with the error information, an error having occurred in the external apparatus, i.e., a server error, and reproduces the sub-content contained in the reproduction target content data. Therefore, by causing the reproduction target content data to contain in advance sub-content for displaying a sever error screen that notifies the user that a server error has occurred, such a further effect is brought about that the server error can be shown to the user when a server error has occurred.

The content playback apparatus according to the present invention is preferably arranged such that: the process specifying information contains reproduction process specifying information specifying a process of reproducing the main content; and the error detecting means detects an error having occurred while the main-content reproducing means is performing, in accordance with the reproduction process specifying information, the process of reproducing the main content.

According to the foregoing arrangement, the process of reproducing the main content is performed in accordance with the reproduction process specifying information contained in the reproduction target content data. Moreover, when an error has occurred during the reproduction process, the error is detected by the error detecting means. That is, the content playback apparatus can detect a reproduction error having occurred during the process of reproducing the main content.

Therefore, by causing the reproduction target content data to contain in advance sub-content for displaying a reproduction error screen that notifies that user that a reproduction error has occurred, such a further effect is brought about that the reproduction error screen is shown to the user when a reproduction error has occurred.

Note that examples of the reproduction error that can be detected by the error detecting means include (i) an error based on a misdescription of display control information for displaying the reproduction error screen, (ii) a processing error caused in drawing the reproduction error screen in accordance with the display control information, (iii) incompatibility of image data for displaying an image contained in the reproduction error screen, and (iv) a processing error caused in drawing the image data.

The content playback apparatus according to the present invention is preferably arranged such that: the process specifying information contains sub-content specifying information specifying sub-content that is to be reproduced for each type of error that is able to be detected by the error detecting means; and the sub-content reproducing means reproduces, in accordance with the sub-content specifying information, sub-content which is included in a plurality of sub-content contained in the reproduction target content data and which corresponds to a type of error detected by the error detecting means.

The foregoing arrangement brings about such a further effect of making it possible to reproduce the sub-content corresponding to the type of error detected.

For example, the reproduction process specifying information can be arranged so as to specify that: (i) first sub-content is reproduced in cases where the error detecting means has detected an error having occurred in the content playback apparatus during the process of acquiring the acquisition target content data; and (ii) second sub-content is reproduced in cases where the error detecting means has detected an error having occurred in the external apparatus during the process of acquiring the acquisition target content data. On this occasion, when the reproduction target content data contains in advance (a) first sub-content for displaying a terminal error screen that notifies the user that a terminal error has occurred and (b) second sub-content for displaying a server error screen that notifies the user that a server error has occurred, the terminal error screen can be shown to the user in cases where a terminal error has occurred and the server error screen can be shown to the user in cases where a server error has occurred.

The content playback apparatus according to the present invention is preferably arranged such that the process specifying information contains substitute content reproduction process specifying information specifying a process of reproducing a specific substitute content instead of the next content, the content playback apparatus further including substitute-content reproducing means for reproducing the substitute content in accordance with the substitute content reproduction process specifying information after the sub-content reproducing means has reproduced the sub-content.

According to the foregoing arrangement, when an error has been detected during the process being performed in accordance with the process specifying information contained in the reproduction target content data, the sub-content contained in the reproduction target content data is reproduced. Furthermore, after the sub-content has been reproduced, the substitute content is reproduced in accordance with the substitute content reproduction process specifying information.

That is, the foregoing arrangement brings about such a further effect of making possible to, in addition to reproducing the sub-content upon error detection, reproduce the substitute content after the sub-content.

The present invention can be applied to content playback apparatuses for reproducing externally-acquired content, and can be suitably applied in particular to a content playback apparatus for performing slide show reproduction, i.e., for reproducing a plurality of content externally acquired in sequence.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A content playback apparatus comprising:
    main-content reproducing means for reproducing main content contained in reproduction target content data;
    error detecting means for detecting an error having occurred during a process specified by process specifying information, which is contained in the reproduction target content data and which specifies the process to be performed in the content playback apparatus; and
    sub-content reproducing means for, when the error detecting means has detected that an error has occurred during the process specified by the process specifying information, reproducing sub-content contained in the reproduction target content data.

2. The content playback apparatus as set forth in claim 1, wherein the process specifying information contains acquisition process specifying information specifying a process of acquiring, from an external apparatus, acquisition target content data containing next content to be reproduced after the main content,
    said content playback apparatus further comprising content data acquiring means for acquiring the acquisition target content data from the external apparatus in accordance with the acquisition process specifying information, wherein
    the error detecting means detects an error having occurred while the content data acquiring means is performing the process of acquiring the acquisition target content data.

3. The content playback apparatus as set forth in claim 2, wherein the error detecting means detects an error having occurred in the content playback apparatus while the content data acquiring means is performing the process of acquiring the acquisition target content data.

4. The content playback apparatus as set forth in claim 2, wherein the error detecting means detects, in accordance with error information which is provided from the external apparatus and which indicates that the acquisition target content data is not transmittable, an error having occurred in the external apparatus.

5. The content playback apparatus as set forth in claim 2, wherein the process specifying information contains substitute content reproduction process specifying information specifying a process of reproducing a specific substitute content instead of the next content,
    said content playback apparatus further comprising substitute-content reproducing means for reproducing the substitute content in accordance with the substitute content reproduction process specifying information after the sub-content reproducing means has reproduced the sub-content.

6. The content playback apparatus as set forth in claim 1, wherein:
    the process specifying information contains reproduction process specifying information specifying a process of reproducing the main content; and
    the error detecting means detects an error having occurred while the main-content reproducing means is performing, in accordance with the reproduction process specifying information, the process of reproducing the main content.

7. The content playback apparatus as set forth in claim 1, wherein:
    the process specifying information contains sub-content specifying information specifying sub-content to be reproduced for each type of error capable of being detected by the error detecting means; and
    the sub-content reproducing means reproduces, in accordance with the sub-content specifying information, sub-content which is included in a plurality of sub-content contained in the reproduction target content data and which corresponds to a type of error detected by the error detecting means.

8. A content playback apparatus comprising:
    content reproducing means for reproducing content contained in reproduction target content data;
    error detecting means for detecting an error having occurred during a process specified by process specifying information, which is contained in the reproduction target content data and which specifies the process to be performed in the content playback apparatus; and
    error-content reproducing means for, when the error detecting means has detected that an error has occurred during the process specified by the process specifying information, reproducing error content specified by error-content specifying information, which is contained in the reproduction target content data and which specifies the error content to be reproduced upon error detection.

9. A content playback method for causing a content playback apparatus to reproduce content, the method comprising:
    a main-content reproducing step of reproducing main content contained in reproduction target content data;
    an error detecting step of detecting an error having occurred during a process specified by process specifying information, which is contained in the reproduction target content data and which specifies the process to be performed in the content playback apparatus; and
    a sub-content reproducing step of, when an error has been detected in the error detecting step as having occurred during the process specified by the process specifying information, reproducing sub-content contained in the reproduction target content data.

10. A content playback method for causing a content playback apparatus to reproduce content, the method comprising:
    a content reproducing step of reproducing content contained in reproduction target content data;
    an error detecting step of detecting an error having occurred during a process specified by process specifying information, contained in the reproduction target content data, which specifies the process to be performed in the content playback apparatus; and an error-content reproducing step of, when an error has been detected in the error detecting step, reproducing error content specified by error-content specifying information, contained in the reproduction target content data, which specifies the error content to be reproduced upon error detection.

11. A content playback program which, when executed by a computer, causes the computer to operate as a content playback apparatus, the apparatus comprising:

main-content reproducing means for reproducing main content contained in reproduction target content data; error detecting means for detecting an error having occurred during a process specified by process specifying information, contained in the reproduction target content data, which specifies the process to be performed in the content playback apparatus; and sub-content reproducing means for, when the error detecting means has detected an error, reproducing sub-content contained in the reproduction target content data.

12. A content playback program which, when executed by a computer, causes the computer to operate as a content playback apparatus, the apparatus comprising:

content reproducing means for reproducing content contained in reproduction target content data; error detecting means for detecting an error having occurred during a process specified by process specifying information, contained in the reproduction target content data, which specifies the process to be performed in the content playback apparatus; and error-content reproducing means for, when the error detecting means has detected an error, reproducing error content specified by error-content specifying information, contained in the reproduction target content data, which specifies the error content to be reproduced upon error detection.

13. A computer-readable storage medium for storing a content playback program which, when executed by a computer, causes the computer to operate as a content playback apparatus, the apparatus comprising:

main-content reproducing means for reproducing main content contained in reproduction target content data; error detecting means for detecting an error having occurred during a process specified by process specifying information, contained in the reproduction target content data, which specifies the process to be performed in the content playback apparatus; and sub-content reproducing means for, when the error detecting means has detected an error, reproducing sub-content contained in the reproduction target content data.

14. A computer-readable storage for storing a content playback program which, when executed by a computer, causes the computer to operate as a content playback apparatus, the apparatus comprising:

content reproducing means for reproducing content contained in reproduction target content data; error detecting means for detecting an error having occurred during a process specified by process specifying information, contained in the reproduction target content data, which specifies the process to be performed in the content playback apparatus; and error-content reproducing means for, when the error detecting means has detected an error, reproducing error content specified by error-content specifying information, contained in the reproduction target content data, which specifies the error content to be reproduced upon error detection.

* * * * *